US005986564A

United States Patent [19]

Fraser

[11] Patent Number: 5,986,564

[45] Date of Patent: Nov. 16, 1999

[54] MICROCOMPUTER CONTROLLED LOCKING SYSTEM

[75] Inventor: Stephen George Fraser, Troy, Mich.

[73] Assignee: Computerized Security Systems, Inc., Troy, Mich.

[21] Appl. No.: 08/102,707

[22] Filed: Aug. 5, 1993

Related U.S. Application Data

[63] Continuation of application No. 07/980,120, Nov. 23, 1992, abandoned, which is a continuation of application No. 07/773,780, Oct. 10, 1991, abandoned, which is a continuation of application No. 07/426,502, Oct. 23, 1989, abandoned, which is a continuation of application No. 07/040,739, Apr. 15, 1987, abandoned, which is a continuation of application No. 06/740,040, May 31, 1985, abandoned, which is a continuation-in-part of application No. 06/641,792, Aug. 17, 1984, abandoned, which is a continuation-in-part of application No. 06/594,471, Mar. 28, 1984, abandoned.

[51] Int. Cl.[6] ........................ G06F 7/04

[52] U.S. Cl. ........................ 340/825.32; 340/825.3; 340/825.31; 340/825.34; 340/542; 70/278

[58] Field of Search ........................ 340/825.3, 825.31, 340/825.32, 825.34, 528, 542; 455/603; 70/277, 278; 361/172

[56] References Cited

U.S. PATENT DOCUMENTS

| | | | |
|---|---|---|---|
| 3,786,471 | 1/1974 | Hochman et al. | 340/542 |
| 3,821,704 | 6/1974 | Sabsay | 340/825.31 |
| 3,906,447 | 9/1975 | Crafton | 340/825.31 |
| 3,969,584 | 7/1976 | Miller et al. | 340/542 |
| 4,148,092 | 4/1979 | Martin | 70/278 |
| 4,177,657 | 12/1979 | Aydin | 70/278 |
| 4,232,353 | 11/1980 | Mosciatti et al. | 361/172 |

OTHER PUBLICATIONS

M. M. Mano, "Computer System Architecture," Prentice–Hall, Inc., Englewood Cliff, N.J., 1982, pp. 137, 138, 292.

*Primary Examiner*—Bipin H. Shalwala
*Assistant Examiner*—Kent Chang
*Attorney, Agent, or Firm*—Reising, Ethington, Barnes, Kisselle, Learman & McCulloch, P.C.

[57] ABSTRACT

A locking system is disclosed which comprises a microcomputer controlled lock with multiple level keying, i.e. multiple keys having different functions in the locking system. A key reader, for example punch card or magnetic type, reads key code into the microcomputer. A read/write memory has a predetermined number of assigned key codes stored therein and a read-only memory has a control program stored therein for control of the microcomputer. An electrically controlled actuator for the locking means is coupled with an unlocking output of the microcomputer. The control program comprises a main program and a plurality of subroutines each stored at a different location in the read-only memory. A function table has a number of pointers each of which points to the memory address of one of the subroutines. The number of pointers in the function table is equal to the number of locations in the key code memory. Decoding means operative under program control in conjunction with a control code on the key points to selected locations in the key code memory and the function table corresponding to the control code. The microcomputer, under control of the main program, compares the primary and secondary key codes from the selected key with the assigned key code at the location in the key code memory. If there is a match, the microcomputer then operates under the control of the subroutine at the memory address pointed to by the function table to execute the function of the selected key.

32 Claims, 33 Drawing Sheets

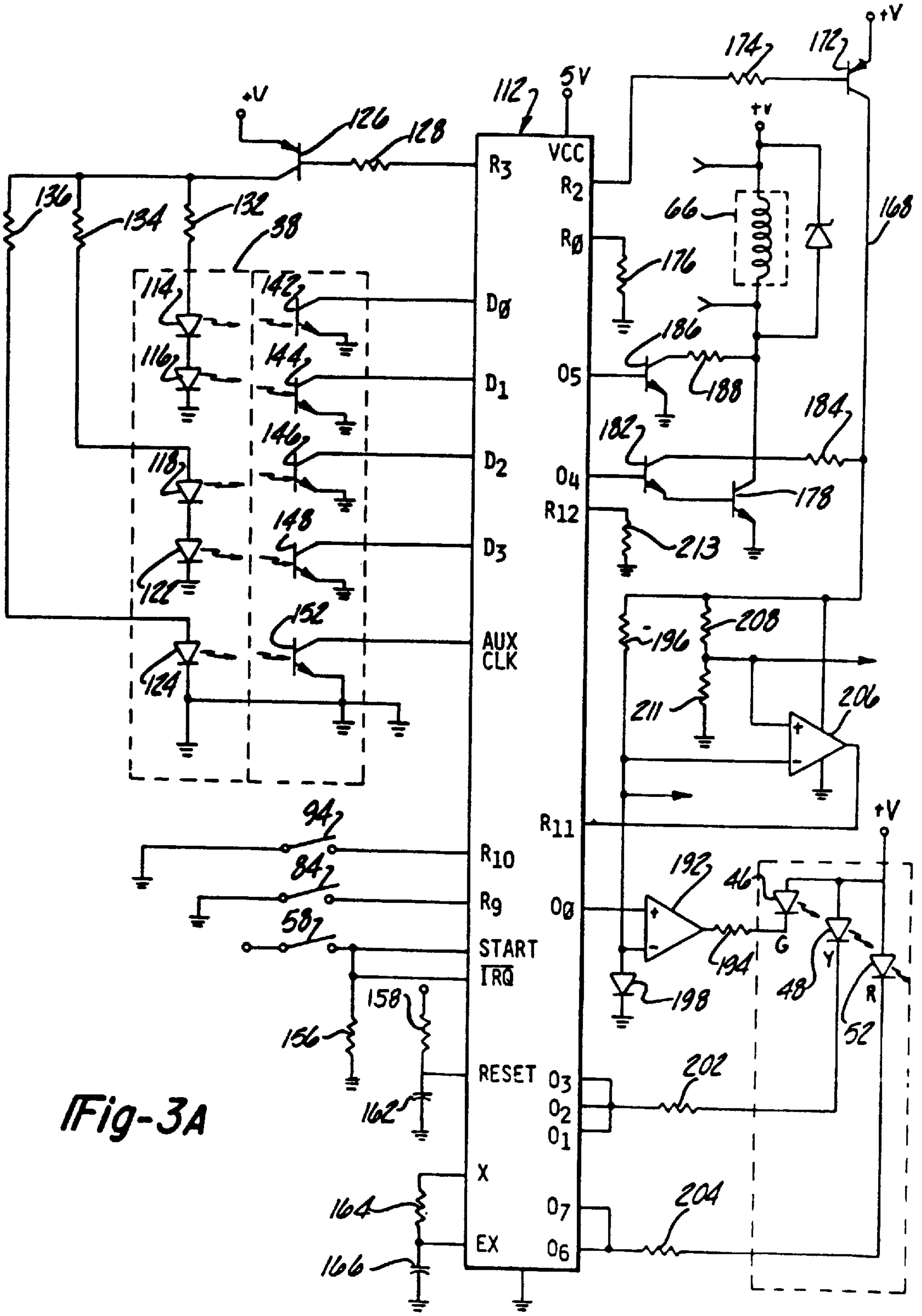
IFig-3A

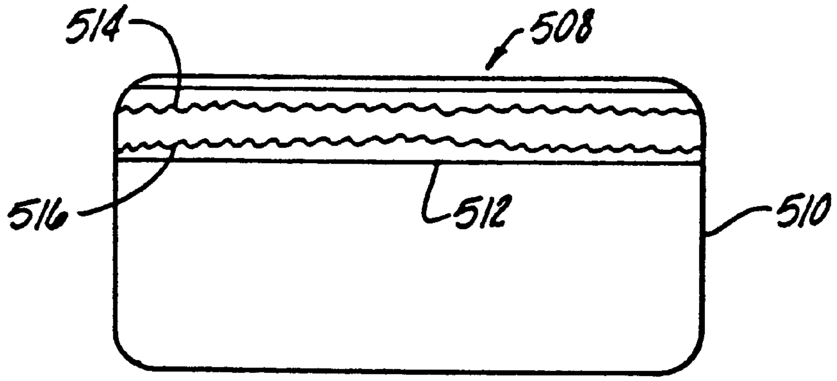
Fig-15
Fig-16
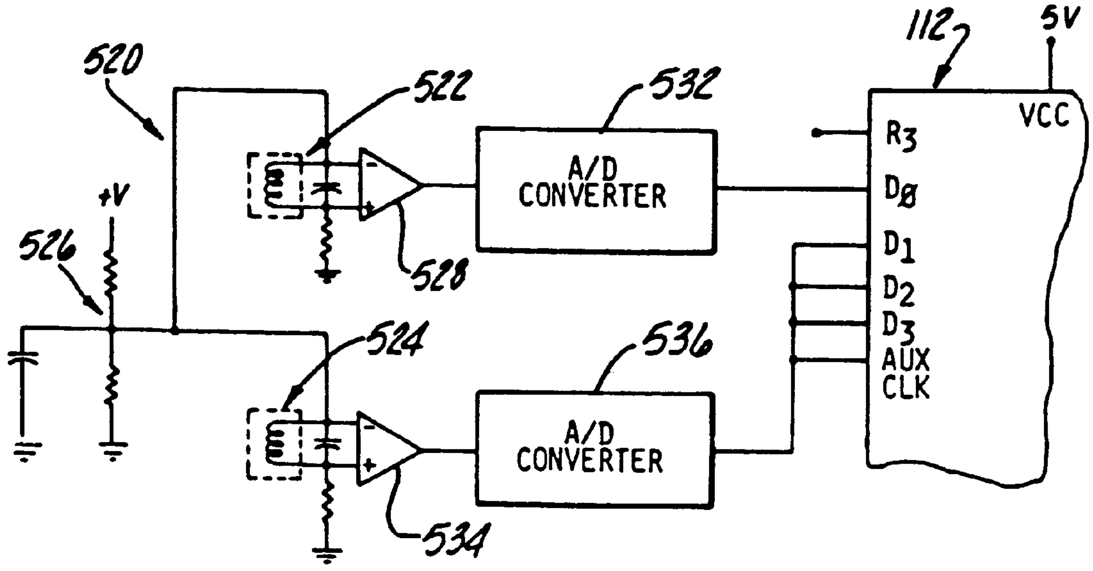

MICROCOMPUTER CONTROLLED LOCKING SYSTEM

This application is a continuation of application Ser. No. 07/980,120, filed Nov. 23. 1992, now abandoned, which is a continuation of application Ser. No. 07/773,780, filed Oct. 10, 1991, now abandoned, which is a continuation of application Ser. No. 07/426,502, filed Oct. 23, 1989, now abandoned, which is a continuation of application Ser. No. 07/040,739, filed Apr. 15, 1987, now abandoned, which is a continuation of Ser. No. 06/740,040, filed May 31, 1985, now abandoned, which is a Continuation-in-Part of U.S. Ser. No. 641,792 filed Aug. 17, 1984, now abandoned, which is a Continuation-In-Part of U.S. Ser. No. 594,471 filed Mar. 28, 1984 now abandoned.

FIELD OF THE INVENTION

This invention relates to security devices; more particularly, it relates to a computer controlled locking system especially adapted for use as a door lock.

BACKGROUND OF THE INVENTION

Hotels, office buildings and the like require door locks on a large number of individual rooms. In a hotel, for example, the door lock of each guest room should have a different key for successive guests. Also, at a given time, a guest room door lock must be operable by different keys assigned to hotel personnel, such as the maid, housekeeper and other levels of hotel management. For security purposes, the keys for each lock must be readily changeable.

In the prior art, locking systems for hotels and the like have been developed which utilize electronic code responsive logic circuits for operation of a lock mechanism.

The Aydin U.S. Pat. No. 4,177,657 granted Dec. 11, 1979 discloses an electronic lock system which senses code on a key and compares it to a code stored in a memory. When the key code matches the stored code, the lock activates a clutch operated bolt and may also change the stored code to a new code. The Aydin patent discloses a microcomputer control system for the lock. Each key has a control code, a primary key code and a secondary key code stored thereon. A read/write memory stores a predetermined number of assigned key codes and a read-only memory has a control program stored therein for control of the microcomputer. A key reader is coupled with the microcomputer and is adapted to coact with any of the keys to read the code stored thereon into the microcomputer. Different keys are used for different access levels in accordance with the control code on the key. The access levels are designated as guest key, floor master, section master, security master, etc. If a code match is obtained, the system performs two major functions, namely, enabling the clutch to permit door opening and changing of the stored code in the memory. In addition, there are certain auxiliary functions, namely, inhibiting opening to permit the change of code, a special key which can be used once only and a double lock function.

The Sabsay U.S. Pat. No. 3,821,704 discloses an electronic locking system suitable for hotels and the like and having multiple levels of master keys. Each lock mechanism is controlled by a decoding circuit having a changeable binary memory. A key has two decodable information fields, namely, a key field and an authorization field. When the key field matches the combination stored in the decoding circuit memory the lock opens. If there is not a match, the authorization field and the combination field are compared and if they are equal the key field is stored in the memory and the lock is opened.

The Dimitriadis U.S. Pat. No. 3,797,936 discloses an electronic lock which is provided with an optically encoded key. If the code on the key corresponds to the stored code, the circuit activates a mechanism which opens the lock. The Astin U.S. Pat. No. 4,396,914 discloses a microprocessor controlled lock. In this system an electronic circuit compares the content of the memory with the combination code and enables the lock device if a match is found. If the key card is a new one the circuit calculates a new combination code and if it matches that on the key card the memory is loaded with the new combination code.

A general object of this invention is to provide an improved security device which is especially adapted for use in controlling a door lock mechanism and which overcomes certain disadvantages of the prior art.

SUMMARY OF THE INVENTION

In accordance with this invention, an electronic locking system is provides which affords a high degree of security and which is simple in use and operation and yet affords a high degree of flexibility in different applications; it is also economical to manufacture and install. The locking system of this invention provides multiple level keying, i.e. multiple keys having different functions in the locking system. A set or library of key function programs may be installed in each locking system. An operating set of selected key functions is programmable in the locking system according to the particular application. A different coded key is issued for each key function. The locking system may be used in many different applications and is especially suited for use for hotel door locks.

The locking system of this invention comprises a lock under the control of a microcomputer, a key reader coupled with the microcomputer and a plurality of coded keys of different types, each type serving a different function in the locking system. A read/write memory has a predetermined number of assigned key codes stored therein and a read-only memory has a control program stored therein for program control of the microcomputer. An electrical actuator for the locking means is coupled with an unlocking output of the microcomputer. The control program comprises a main program and a plurality of subroutines each stored at a different location in the read-only memory. A function table stored in one of the memories has a number of pointers each of which points to the memory address of one of the subroutines. The number of pointers in the function table is equal to the number of locations in the key code memory. Decoding means operative under program control points to selected locations in the key code memory and the function table corresponding to a control code on the selected key. The microcomputer is operative under program control of the main program to compare primary and secondary key codes from the selected key with the assigned code at the location in said key code memory pointed to by said decoding means. If there is a match, the microcomputer is operative under the control of the subroutine at the memory address pointed to by the function table whereby the locking system is operated in accordance with the function of the selected key.

Further, according to the invention, the microcomputer operates under the control of a start-up program to establish or program said function table and to store key codes corresponding thereto in the key code memory. The system includes means for assigning a pointer corresponding to the desired key function to each location in the function table, a start-up phase-in key having code thereon for controlling the microcomputer in the phase-in sequence of the start-up program whereby the microcomputer accepts input from the key reader of successive key-types and stores the key code thereon at the locations in key code memory corresponding to the control code thereon. The means for assigning the pointers to the function table, in one form, is a default routine in the start-up program. Alternatively, any desired programming of the function table may be accomplished by use of a programming key having key having a pointer to be stored at each different location in the function table.

Further, according to this invention, the locking system may be used with a conventional mortise lock having a locking means in the form of a regular lock bolt and a dead bolt; the locking system is also provided with a logical dead bolt in the microcomputer for providing enhanced security. Further, the microcomputer receives inputs from a locking means detector for determining whether the locking means is actuated, e.g. whether the regular bolt has been actuated by turning of the knob. Also, the microcomputer receives an input from a physical dead bolt detector for determining whether the physical dead bolt is thrown, i.e. in a locked condition. Also, the microcomputer receives an input from a battery voltage sensor so that an appropriate warning of a low battery condition may be exhibited. These inputs are utilized by the microcomputer under program control for executing different key functions according to the program subroutines corresponding to the different functions.

Further, according to this invention, a library of key function subroutines is stored in the read-only memory of the computer and any one of a selected set of the subroutines is run by the microcomputer according to the function table assignments and the corresponding keys. Such key function subroutines include the following: a guest key is operative to unlock the door unless the logical dead bolt is set or the physical dead bolt is thrown, subject however, to being inhibiter by an inhibit bit set by the housekeeper key. A housekeeper key may be an opening or a nonopening key; if an openinq key, it is subject to the logical dead bolt and the physical dead bolt. If it is a nonopening key, it may be used to inhibit opening by the last guest key. If the inhibit bit is set, then the currently issued guest key, being a new key, will clear the inhibit bit and will open the door. The maid key is an opening key, subject to the logical dead bolt and physical dead bolt. However, the subroutine for the maid key checks the battery and if it is low and has been low for the last four uses of the maid key, it will not unlock the door unless the key is inserted twice in succession. A one-shot key is an opening key subject to the logical and physical dead bolts and will unlock the door only if it is a new key, i.e. being used for the first time. An emergency key functions to set the logical dead bolt and will unlock the door regardless of the dead bolt status; if the knob is turned, it will clear the logical dead bolt. A rephase key sets the logical dead bolt, extends the remaining cycle time and sets up the rephase procedure whereby a new code may be stored in the key code memory by insertion of another key. A combination of first security and second security keys provides for an enhanced level of security; the first security key must be used first and is operative to set the logical dead bolt and, if the next key is the second security key, it unlocks the lock if it is an opening key. A hotel pass key is provided with a hotel code and is operative to unlock certain doors to provide access to prescribed hotel areas such as swimming pool, game room, etc.

Further, according to this invention, means are provided to assure that a new key code will be stored in memory for a new key even though the previously issued key has never been used. This is provided by use of a primary code, secondary code and a link code on the key. Further, means are provided for on-line reprogramming of the lock. Further, according to the invention, a time base is provided for recording successive operations of the lock. Further, additional key function subroutines are stored in the read-only memory. Such additional key functions include: an office key function with latch, unlatch and toggle operations especially adapted for an office door lock, a security key function using a single key sequence, and a lock-out function which permits keys at a level above or below a predetermined level to be rendered temporarily inoperative.

A complete understanding of this invention will be obtained from the detailed description that follows taken with the accompanying drawings.

DESCRIPTION OF THE DRAWINGS

FIG. 3A shows the microcomputer and the electronic control circuit;

FIG. 15 represents a magnetically encoded key for use with a second embodiment of the invention;

FIG. 16 shows an electronic circuit for the second embodiment of the invention;

BEST MODE FOR CARRYING OUT THE INVENTION

Figure 1:
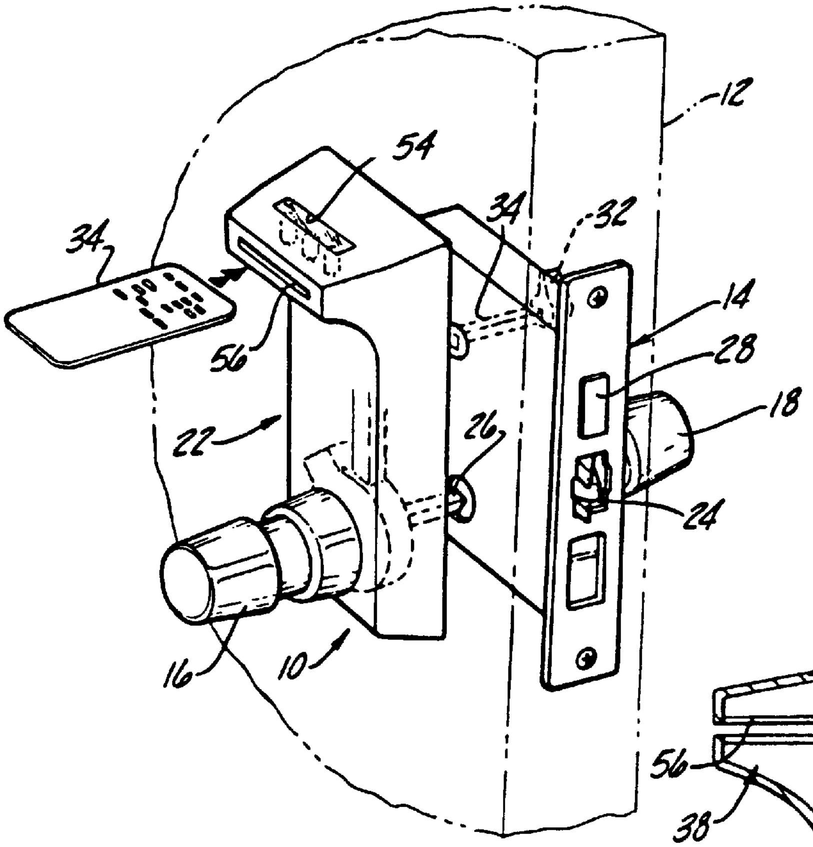
FIG. 1 shows a door lock embodying this invention installed on the door.

Referring now to the drawings, there is shown an illustrative embodiment of the invention in the microcomputer lock control system for use in the door locks of a hotel. It will be appreciated as the description proceeds that the invention is useful in many other applications and may be utilized in different embodiments.

A first embodiment of the invention which uses a punch card key will be described first. Then, a second embodiment using a magnetically coded key will be described. Finally, a third embodiment will be described which includes a time base for recording lock operations, on-line reprogramming and additional key functions.

FIG. 1 shows the locking system or control system of this invention installed in a door lock as used in a hotel. The door lock 10 is installed on a door 12. It comprises, in general, a conventional mortise lock 14 installed in the door, an outside doorknob 16, an inside doorknob 18, and a lock control system 22. The lock is provided with a locking means in the form of a conventional retractable bolt 24 which is operable by the doorknob shaft 26 which may be actuated directly by the inside doorknob 18 or may be operated through the lock control system 22 by the outside doorknob 16. The lock also includes a dead bolt 28 which is actuable by a dead bolt handle 32 on the inside of the door through the dead bolt shaft 34. Also, as provided in the conventional lock 14, the dead bolt 28 is retracted concurrently with the retraction of the bolt 24 by actuation of the inside or outside doorknob. A key 34, in the form of a punch card, is a part of the lock control system 22 for initiating the manual control of the lock, as will be described in detail subsequently.

Figure 2A:
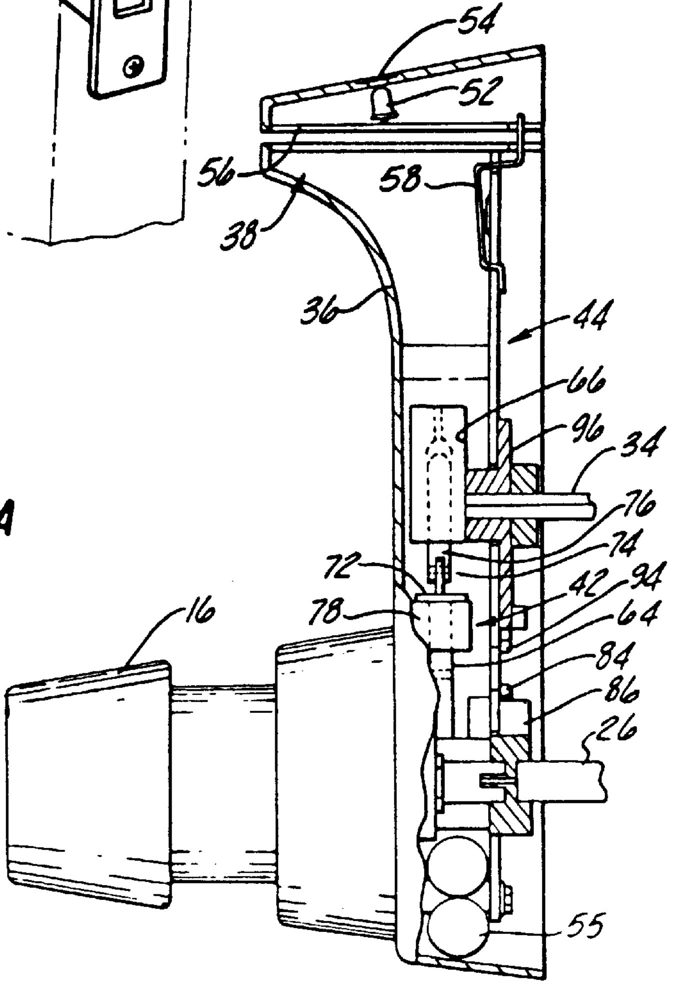
FIG. 2A is a side view, partially in section, of a doorknob and lock housing which encloses the microcomputer controlled lock.
Figure 2B:
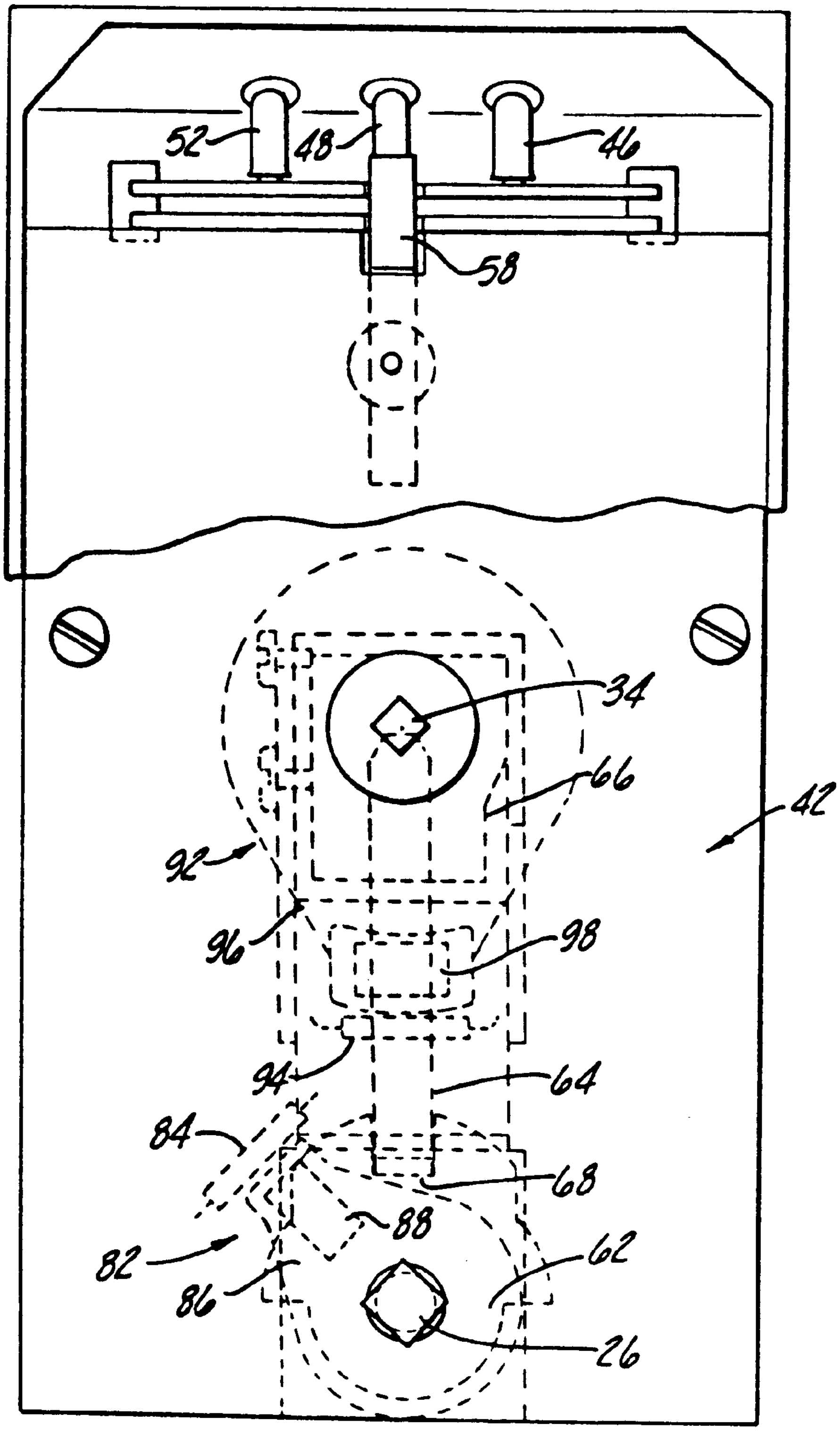
FIG. 2B is a rear elevation view showing parts of the lock control mechanism.

The lock control system 22 is shown in greater detail in FIGS. 2A and 2B. In general, it comprises a lock body 36 which houses a key reader 38, an electrically controlled actuator or a lock control mechanism 42 and a microcomputer circuit board 44. It also houses a set of indicator lamps comprising green LED 46, a yellow LED 48 and a red LED 52 which are viewable through a window 54 in the lock body. A pair of batteries 55 are installed in the body 36.

The key reader 38 includes a slot 56 adapted to receive the key 34 and a key switch 58 which is actuated to a closed condition upon full insertion of the key and it is actuated to an open condition upon withdrawal of the key. The key reader 38 is an optical reader adapted to detect the presence or absence of punched holes in the key 34 and will be described in greater detail subsequently.

The lock control mechanism 42 comprises a lock pin receiver 62, a reciprocable lock pin 64 and a solenoid 66 for actuating the lock pin. The lock pin receiver 62 is a disk-like member non-rotatably mounted on the doorknob shaft 26. The upper half of the lock pin receiver 62, as viewed in FIG. 2B is of enlarged radius and is provided with a circular recess 68 in alignment with the lock pin 64 with the doorknob in its neutral position. When the lock pin 64 is extended or dropped into the recess 68, the doorknob shaft 26 cannot be turned by the doorknob and hence the bolt 24 cannot be retracted and the door remains locked. The lock pin 64 is cylindrical with a head 72 at the upper end and is connected by a pivot coupling 74 with the armature 76 of the solenoid 66. The lock pin 64 extends through a guide bracket 78 which is mounted on the lock body and the head 72 of the lock pin rests on the bracket when the lock pin is dropped. The lock control mechanism 42 also includes locking means detector in the form of a doorknob detector 82 which is adapted to provide a signal when the doorknob is turned. The doorknob detector 82 comprises a reed switch 84 mounted on the circuit board 44. It also includes a switch actuator comprising an arm 86 rotatable with the doorknob shaft 26 and carrying a permanent magnet 88. When the doorknob 16 is rotated, the arm 86 moves with the shaft 26 to position the magnet 88 remotely from the reed switch 84 so that the reed switch 84, which is normally open, is thereby closed. The lock control mechanism also includes a dead bolt detector 92 which is adapted to develop a signal indicative of whether the dead bolt is thrown or retracted. It comprises a reed switch 94 which is mounted on the circuit board 44. It also comprises an arm 96 which is mounted for rotation with the dead bolt shaft 34. The arm 96 carries a permanent magnet 98 which is positioned thereby adjacent the reed switch 94 when the dead bolt is in its retracted position. The reed switch 94 is normally open and the dead bolt is thrown by rotating the shaft 34 and the magnet 98 away from the reed switch 94 which is thereby actuated to the closed condition.

Figure 2C:
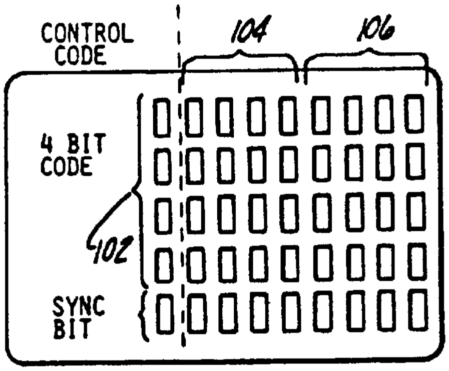
FIG. 2C shows a typical code arrangement on a key.

The key 34 referred to above, will be described in greater detail with reference to FIG. 2C. Multiple keys of the type shown in FIG. 2C may be issued for use with the same lock and some will be used with more than lock, as will be described subsequently. In a hotel locking system, several personnel in addition to the guests require keys for different operations of a given lock. In the illustrative system, there are eight different types of keys which are designated as follows: guest key, maid key, housekeeper key, suite key, one-shot key, fail-safe key, master zone key, and emergency/rephase key. Each key is an opaque card and is provided with three different code fields 102, 104 and 106. Each small rectangle on the card in FIG. 2C represents a bit position. If the bit position is a punched hole it is a one bit; if not punched, it is a zero bit. Code field 102 is encoded with a control code comprising a nibble or four bit character. The top three bits represent the level or function of the key. The fourth bit is called the opening bit and when it is a one the key is an opening key and when it is a zero it is a non-opening key. The code field 104 contains a sixteen bit key code or character arranged in four columns of nibbles and represents the primary key code for the lock. The code field 106 contains a sixteen bit key code or character, also arranged in four columns of nibbles, and represents the secondary code on the lock. The bottom row of bits are referred to as sync bits for self-clocking of the key reader. A one bit is used in a sync bit positions only if there is no one bit in that particular column. Before describing the function and operation of the different types of keys, the microcomputer control circuit will be described.

Referring now to FIG. 3A, the microcomputer lock control circuit will be described. The microcomputer 112 is a single chip, four bit microcomputer; in the illustrative embodiment, it is a series MB88400 and MB88500 made by Fujitsu, Limited of Japan. The key reader 38 is controlled by and provides input to the microcomputer 112 as follows. The key reader 38 is an optical reader provided with a first pair of infrared LEDs 114 and 116 for use in reading the first and second rows of data bits, respectively, of the code fields on the key. A second pair of LEDs 118 and 122 are positioned for use in reading the third and fourth rows of data bits. An LED 124 is positioned for reading the sync data bits of the code field on the key. The LEDs just mentioned, are energized through a switching transistor 126 which has its base connected through a resistor 128 to the pin R3 of the computer. The emitter of the transistor 126 is connected to the positive terminal of the battery and the collector is connected to the three sets of LEDs through the resistors 132, 134 and 136. The key reader 38 includes the set of five phototransistors 142, 144, 146, 148 and 152. Phototransistors 142 and 144 are optically aligned with LEDs 114 and 116, respectively, and are connected with data pins D0 and D1 on the microcomputer. Phototransistors 146 and 148 are optically aligned with LEDs 118 and 122 and the collectors thereof are connected with data pins D2 and D3, respectively. The phototransistor 152 is aligned with the LED 124 and its collector is connected with the auxiliary clock pin of the microcomputer.

The dead bolt detector switch 94 is connected between ground and the pin R10. The doorknob detector switch 84 is connected between ground and the pin R9. The key switch 58 is connected between the voltage source and the start pin and the IRQ pin across a resistor 156 to ground. The reset pin of the microcomputer is connected to the junction of a resistor 158 and a capacitor 162 which are serially connected across the voltage source. A resistor 164 is connected between the clock generator external pins X and EX and a capacitor 166 is connected between the pin EX and ground.

A supply voltage line 168 is connected through a switching transistor 172 to the battery voltage. The base of the switching transistor 172 is connected to the pin R2 through a resistor 174. The pin R0 is connected through a resistor 176 to ground. The solenoid 66 is controlled by the microcomputer through an unlocking output comprising pins 04 and 05. For this purpose, the upper terminal of the solenoid 66 is connected to the battery and the lower terminal is connected through a switching transistor 178 to ground. The switching transistor 178 is controlled by a switching transistor 182 which has its collector connected through a resistor 184 to the supply voltage line 168 and its emitter connected to the base of transistor 178. The base of transistor 182 is connected to the pin 04. When pin 04 goes high, both transistors 182 and 178 are turned on and a pull-in current is supplied to the solenoid 66 sufficient to retract the lock pin 64 to unlock the door. The lower terminal of the solenoid 66 is also connected through a switching transistor 186 to the pin 05. In particular, the solenoid is connected through a resistor 188 to the collector of the transistor 186 which has its emitter connected to ground and its base connected with the pin 05. When the pin 05 goes high, the transistor 186 is turned on and the solenoid draws a holding current sufficient to maintain the lock pin 64 in the retracted position.

The green, yellow and red indicator LEDs 46, 48 and 52, respectively, are controlled through the O-port as will now be described. The green LED 46 is controlled by the pin 0O through a comparator 192. In particular, the green LED is connected between the battery and the output of the comparator through a resistor 194. The pin 0O is connected to the noninverting input of the comparator 192. The voltage supply line 168 is connected across a resistor 196 and a series diode 198 and the voltage across the diode is applied as a reference voltage to the inverting input of comparator 192. The yellow LED 48 is controlled by the pins 01, 02 and 03 which are connected in parallel with each other for increased current capacity through a series resistor 202 to the LED 48. The red LED 52 is controlled by pins 06 and 07 which are connected in parallel with each other and through a resistor 204 to LED 52.

The low battery detector for sensing low battery voltage is controlled by pin R11 of the microcomputer and comprises a comparator 206. In particular, a pair of voltage divider resistors 208 and 211 are connected between the voltage supply line 168 and ground. The junction of the voltage divider resistors is connected to the noninverting input of the comparator 206. The inverting input is connected to the reference voltage derived across the diode 198. The pin R12 is connected to ground through a resistor 213. When the voltage at the noninverting input of the comparator 206 falls below the reference voltage on the inverting input, the output of the comparator 206 goes low and the output thereof is applied to pin R11.

Figure 3B:
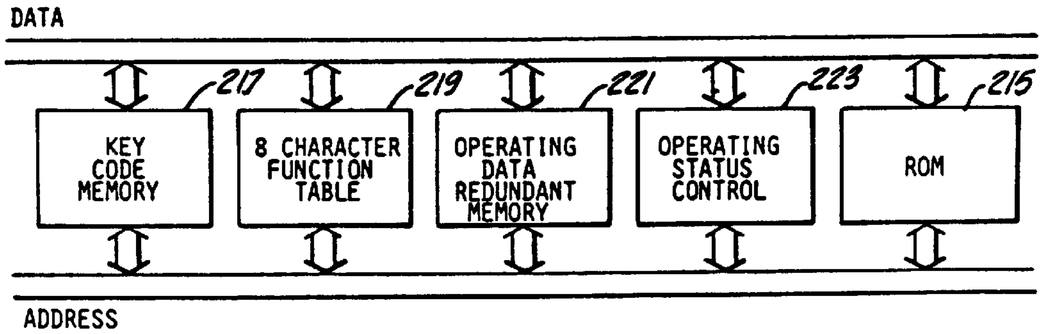
FIGS. 3B and 3C show functional block diagrams of a portion of the microcomputer.

The microcomputer 112 will be further described with reference to FIGS. 3B and 3C. The microcomputer includes a read-only memory (ROM) 215 which stores the operating program for the locking system as represented by the flow charts shown in the drawings. The ROM 215 is shown in greater detail in FIG. 22 which will be described subsequently. Additionally, the microcomputer has a read/write memory, i.e. a random access memory (RAM), which is utilized for various registers, counters and memory blocks. In particular, as shown in FIG. 3B, the RAM includes a key code memory 217 which contains 32 characters separated into eight different levels with four characters per level. This memory stores a key code at each level corresponding with each of the eight different levels of keys. When either the primary code or the secondary code on a key matches the key code for the particular level of the key, the lock is operative to respond to that key. The RAM also includes a function table 219 which comprises eight characters which are pointed to in accordance with the control code on the key to address the appropriate level for the key in the key code memory 217. A redundant memory block 221 is used to memorize operating data as a back-up memory. It stores key code memory, the function table, the opening bit, etc. The operating status control memory 223 is provided in RAM and includes cycle timers and state registers. The state registers include the flashing of the red, green and yellow indicator LEDs and the solenoid.

Figure 3C:
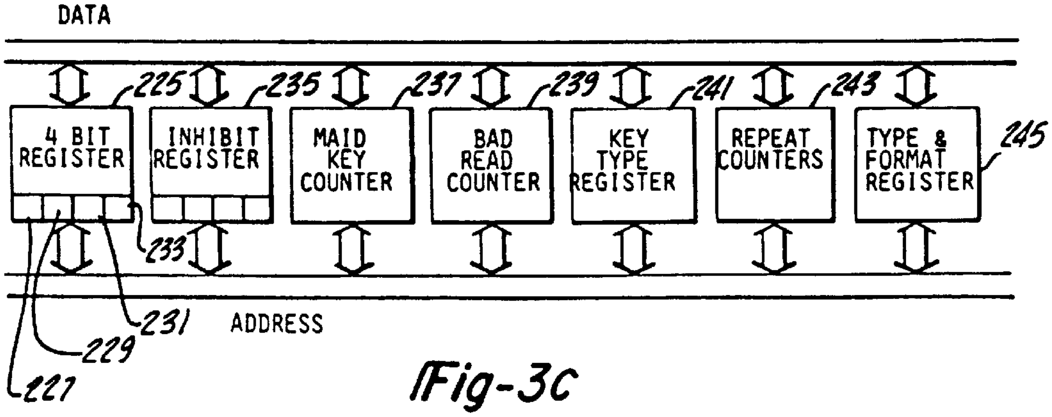

Additionally, the random access memory includes certain registers and counters as shown in FIG. 3C. A four bit register 225 includes a "new" bit flag 227, a logical dead bolt flag 229, an opening flag or bit 231 and a memory compare flag 233. The use of these bits in operation will be described subsequently. Additionally, an inhibit register 235 comprises four different inhibit bits for use by the operation of the housekeeper key to prevent the use of a previously issued guest key, as will be described below. A maid key counter 237 is used to keep track of the number of times that the maid key is used to open a door with the low battery warning light energized. A bad read counter 239 keeps a count of successive attempts to use a key which does not match the key code memory of the lock. A history buffer includes a key-type register 241 which records the last several key-types used (except for non-opening keys), as will be described subsequently. It also includes repeat counters 243 which count the number of repeats of the last opening keys. A type and format register 245 keeps a record of the type and format of the key last used (whether an opening key or a non-opening key). The use and operation of these registers will be described subsequently.

Figure 22:
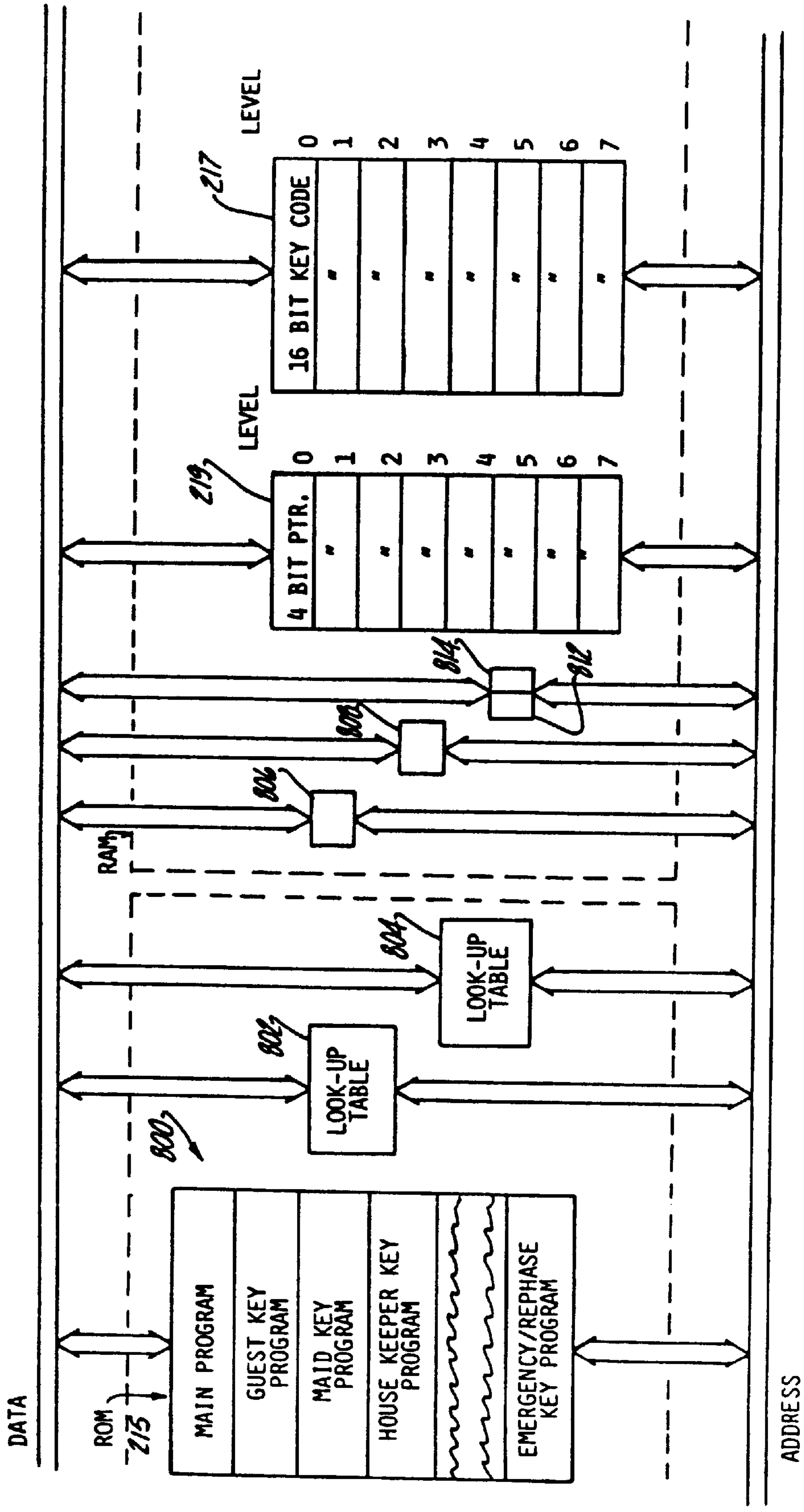
FIG. 22 shows certain details of the microcomputer.

The read-only memory and the random access memory of the microcomputer are shown in further detail in FIG. 22. The read-only memory 215 comprises a program memory 800. This memory stores a main program and a plurality of subroutines at discrete locations, as will be described subsequently. The read-only memory also stores a first decoder or look-up table 802 and a second decoder or look-up table 804. The function and operation of these look-up tables will be discussed presently. The random access memory of the microcomputer includes a control code register 806 which is adapted to hold the control code read from the key being processed. As discussed above, the random access memory includes a function table 219 and a key code memory 217. As shown, the function table 219 is an eight character table shown as having eight different levels or locations labeled zero through seven with a different character at each level. Each character is a four bit pointer each of which functions, in conjunction with the look-up table 804, to point to the memory address of the one of the subroutines in the program memory 800. The key code memory 217 is also shown as having eight different levels labeled zero through seven. Each level or location stores a sixteen bit key code.

Additionally, the random access memory includes a hotel code register 808, a cycle time flag 812 and a flag for indicating actuation of the locking means, i.e. a knob-turned flag 814.

When the key code is read into the microcomputer from the key reader, the control code is temporarily stored in the control code register 806. The four bit control code serves as a pointer and is decoded by the look-up table 802 which is operative to point to one of the eight levels in the function table 219 and to the corresponding level in the key code memory 217. Thus, the control code is operative to designate the key code in the key code memory 217 which is to be compared with the code read from the key. The four bit pointer in the function table 219 which is designated by the control code is at the same level as the designated key code. This four bit pointer is processed using the second look-up table 804 to get the address of the subroutine in the program memory 800 which corresponds to the key function.

The operation of the lock will be described with reference to the flow charts shown in FIGS. 4 through 14. The flow charts represent certain operating programs stored in the read-only memory 215 of the microcomputer 112.

Figure 4:
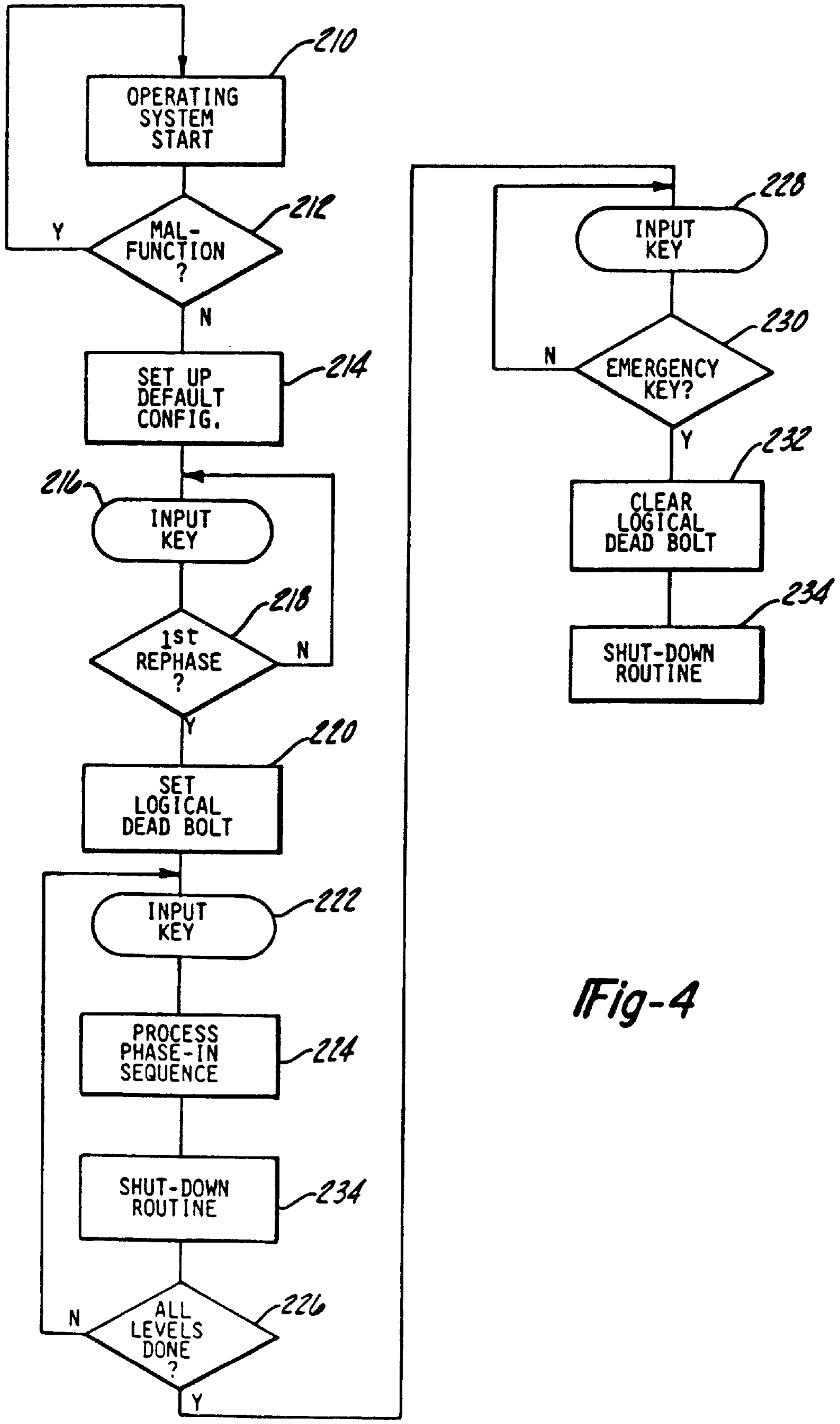
FIGS. 4, 5, 6A and 7 through 14 show flow charts representing the control program of the microcomputer in a first embodiment of the invention.

FIG. 4 is a flow chart which represents the lock start-up program. The operating system start block 210 is operative to power-up the microcomputer 112 and the electronic control circuit 44. This power-up condition occurs upon connection of the battery in the lock circuit and constitutes a cold start of the system. When power on is achieved, the program advances to the test block 212 which determines whether any part of the system has a malfunction. If so, it loops back to the start block 210; if not, it proceeds to means for assigning levels, namely to the block 214 which sets up a default configuration of the assigned levels in key code memory. As previously described, key code memory 217 in RAM has eight different locations or levels and each level stores a key code. Also, the function table 219 in RAM has eight different locations or levels each of which represents a particular function which is to be executed in response to a key corresponding to that level. In the illustrative embodiment, the default configuration of the eight different assigned levels is as follows:

Memory level 1: card type C, guest number 1;

Memory level 2; card type B, one-shot;

Memory level 3: card type A, fail-safe;

Memory level 4: card type D, housekeeper/inhibit guests;

Memory level 5: card type A, master for assigned zone

Memory level 6: card type F, emergency/rephase

Memory level 7: card type C, guest number 2 (suite)

Memory level 8: card type E, maid

With the default configuration established as given above, the program advances to the input block 216 at which the system waits for a key input. At this point in the start-up procedure, the only effective key input is the first or start-up rephase key which, as will be described subsequently, is used as a preliminary step in assigning specific key codes to the different memory levels. If the test block 218 determines that the input key is not a rephase key, the program loops back to block 216 and waits for another input. If it is a rephase key, the program advances from block 218 to block 220 which asserts the logical dead bolt, i.e. it sets the logical dead bolt bit to one. Then, the program advances to the input block 222 and waits for a key input. At this point in the start-up procedure, the lock is in readiness for having assigned key codes written into the key code memory 217 at a location pointed to by the same pointer as used by function table 219 in accordance with the assigned memory level. In other words, a certain key code is written into the memory at a position corresponding to level 1 for the guest number one function, a certain key code is written into the memory for level 2 for the one-shot function, and so forth. When the system receives a key input, the program advances to the block 224 and the secondary code from the key is written into the key code memory 217 at a level corresponding to the key level or control code encoded on the key. This procedure, as represented by block 224, is repeated for each separate key input. After a key is inputted, it is processed by block 224 and then the shut-down routine 234 puts the system in standby. Test block 226 determines when all levels are done. The different keys corresponding to the different memory levels may be inputted in any sequence. This operation of key code phase-in is essentially the same as rephasing the lock (changing key code at one or more levels) which is described in detail subsequently. When a key is inputted at the input 228, the program advances to the test block 230 which determines whether it is an emergency key. If not, the microcomputer will process whatever key is inserted but then the program loops back to the input 228. If it is an emergency key, the program advances to block 232 which clears the logical dead bolt. This places the lock in readiness for use and the program advances to the shut-down routine 234 which places the system in standby condition to wait for the next key. Thus, the start-up procedure for a lock is completed and the lock is in readiness for use. Generally, this start-up procedure is done in the factory so that the lock is ready for use when it is installed on a door. If desired, the start-up procedure may be done after the lock is installed.

Figure 5:
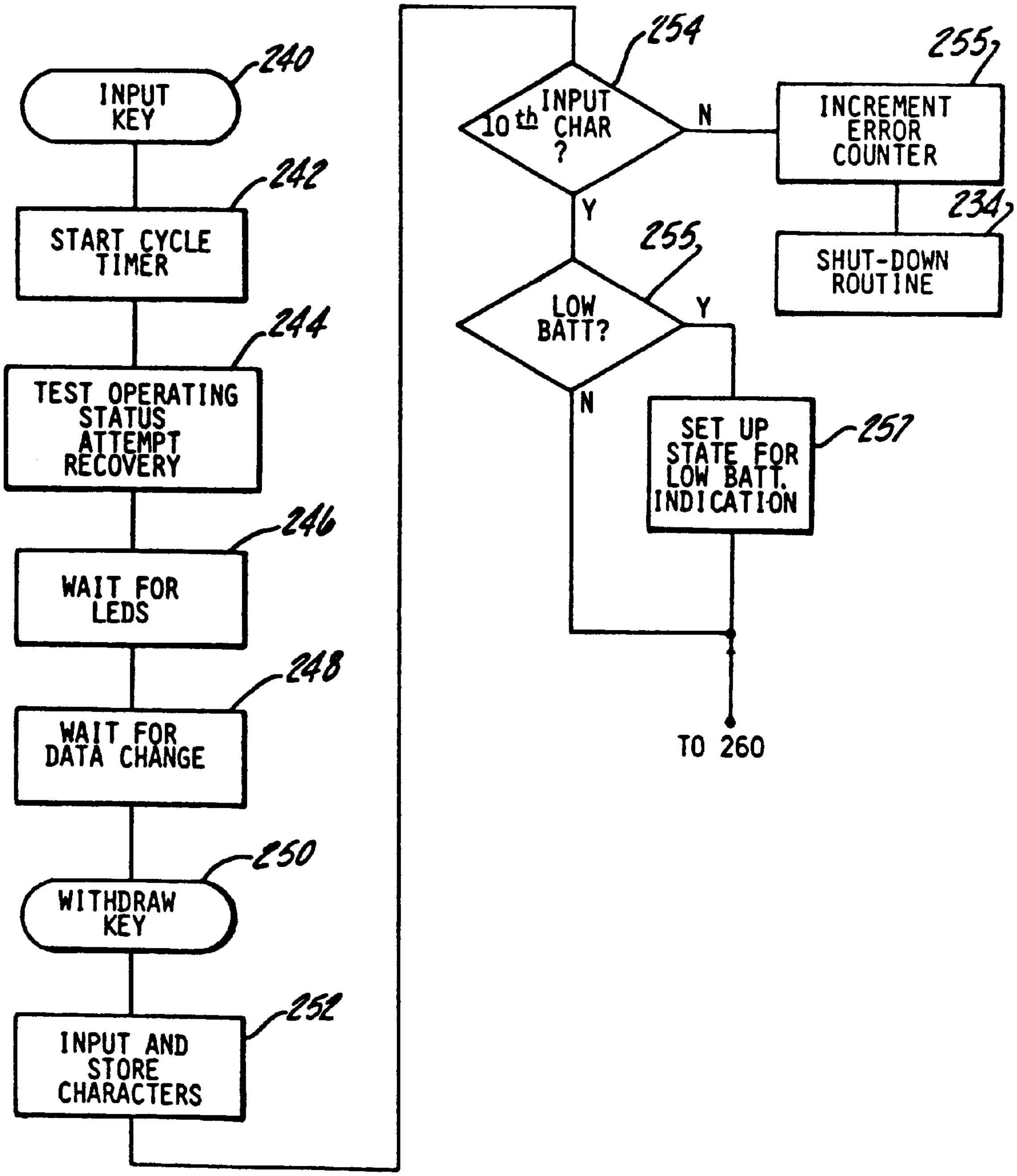

Referring now to FIG. 5, the operation of the lock will be further described. As described above, the start-up procedure places the lock in readiness for use by any of the several keys which have been phased into the lock. After the start-up procedure, the lock is in a standby condition and waits for a key input. The operation, as represented by the flow chart of FIG. 5, is the same for all of the several keys to be used with the lock. At the input block 240 a key is inputted and the program advances to the block 242 which starts the cycle timer in the microcomputer. After the key has been inserted and the start switch is activated, five seconds are allowed by the cycle timer for the nine nibbles of data from the key to be clocked and for the knob to be turned. Typically, a key is read in less than one second, depending upon the speed of withdrawal. (The operation which takes place during the remaining time will be described subsequently.) From block 242, the program advances to block 244 which causes the central processing unit of the microcomputer to test the integrity of the memorized conditions. In this testing, the existing conditions are compared with the conditions memorized when the lock went into the standby condition. If there is any error, the CPU attempts to make a recovery and the program advances to block 246 which imposes a time delay to allow the LEDs to reach the on state. Next, the block 248 waits for a data change. Then at the input block 250, the key is withdrawn which opens the start switch. This causes the program to advance to the block 252 which inputs the code from the key. This includes the nine characters representing the control code, the primary code and the secondary code from the code reader. Next the program determines whether a valid tenth character is inputted. For this purpose, the program advances to the test block 254 which determines whether the code reader detected a tenth character having a one in each bit position which is the correct state of the code reader after having made a good reading of the nine encoded characters on the key. In other words, upon withdrawal of the key during which the nine characters are sequentially detected, the card reader should detect all ones (all bit positions transparent) following the ninth character when the opaque key clears the reader. Thus, if the tenth character is not all ones an erroneous reading is indicated which may result from irregular motion of the card or the like. If the character is not all ones, then the program proceeds to block 255 which increments the error (bad read) counter 239. Then the program advances to the shut-down routine 234 which causes the system to go to standby and wait for the next key. In the case of a bad or invalid reading of the key, the key may be reinserted and the program would repeat from block 240. If the tenth character is all ones, the program advances to block 255 which assesses the battery state. If it is not low, it advances to block 260 of FIG. 6A. If it is low it advances to block 257 which sets up the state for low battery indication by the red LED. Then the program advances to block 260 of FIG. 6A which will be described subsequently.

Figure 6A:
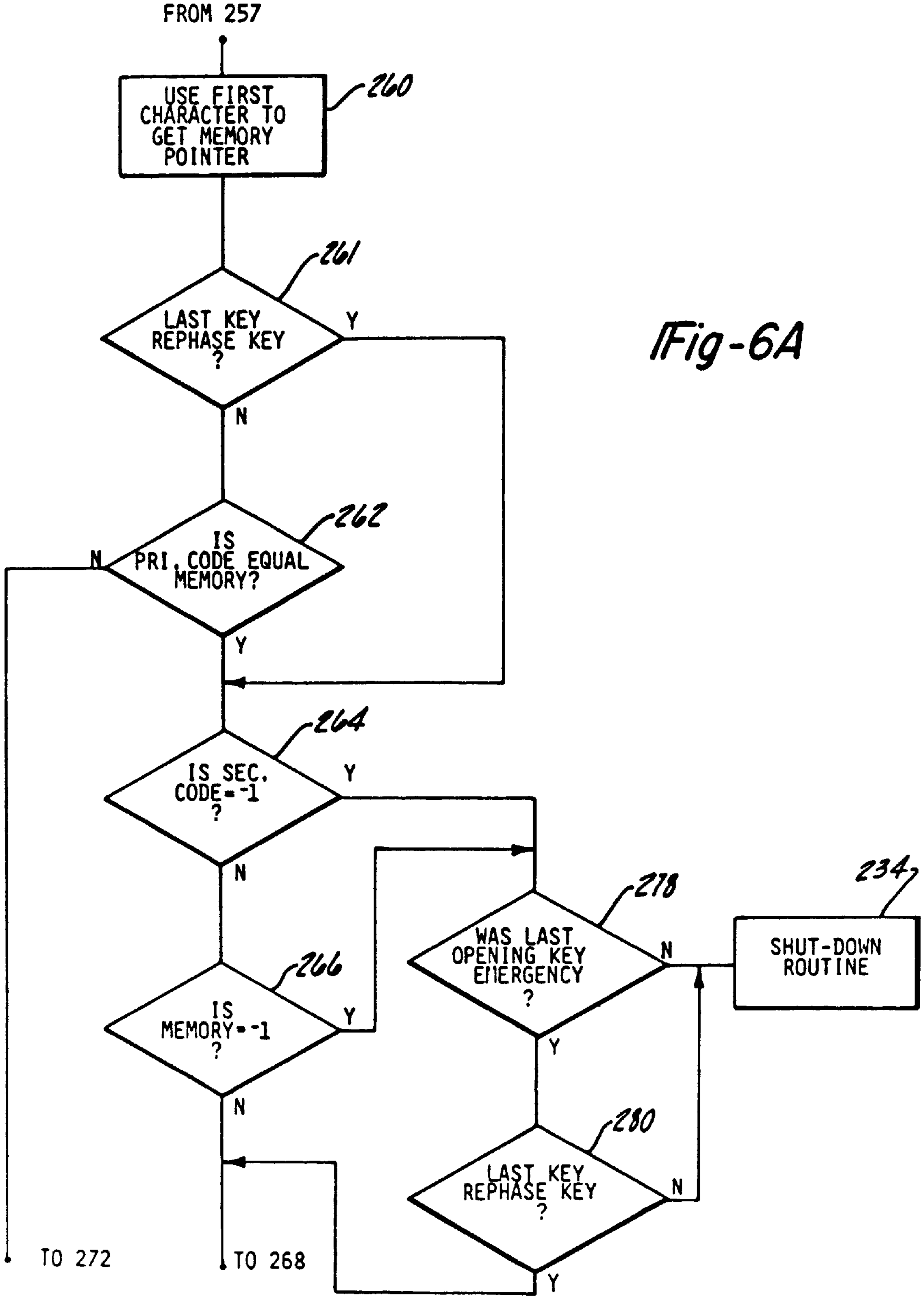
Figure 6B:
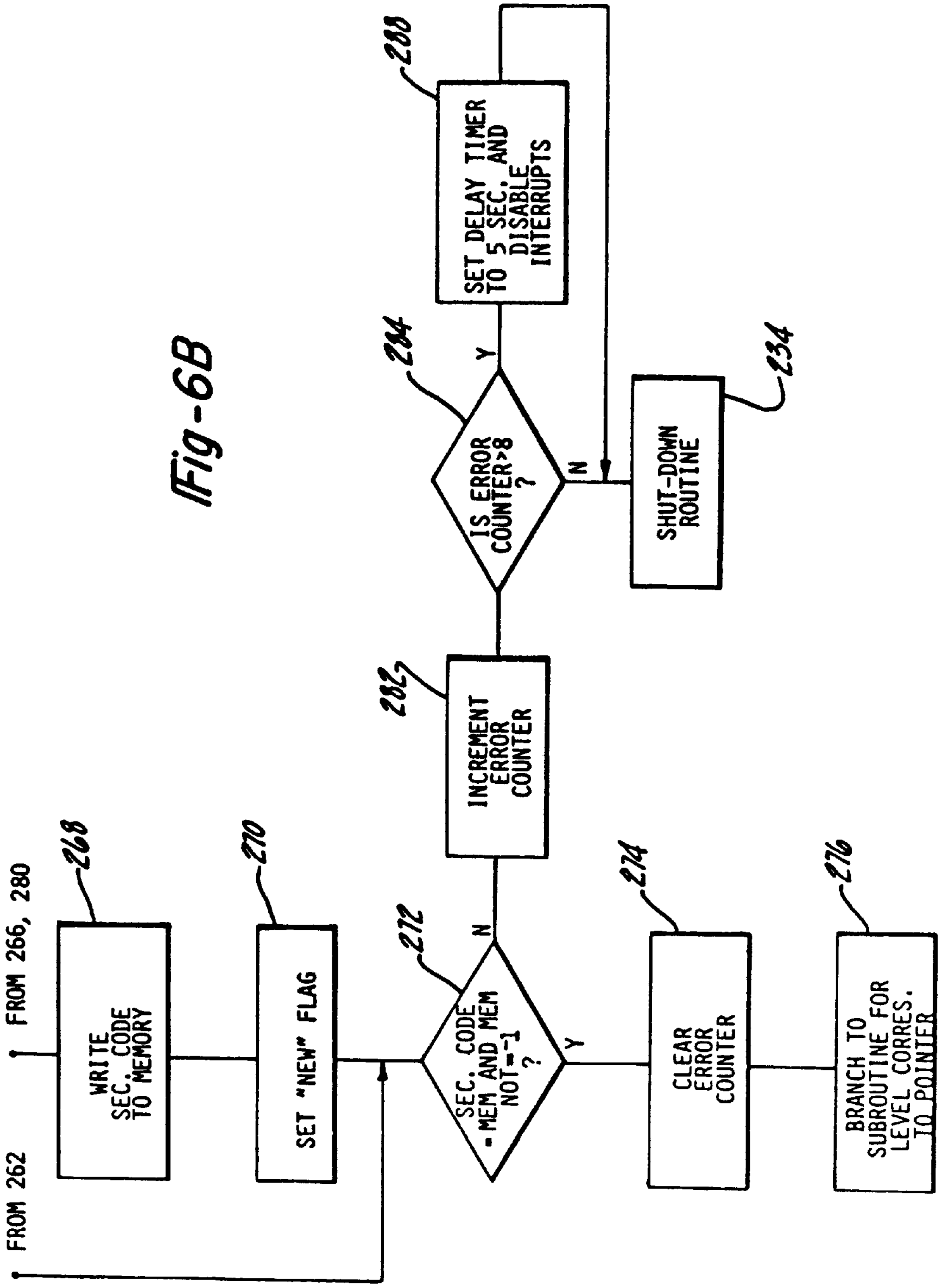

The program represented by the flow chart off of FIGS. 6A and 6B is a continuation of the program of FIG. 5. It is also utilized in the operation of the lock by the different keys which have been phased in at the different levels of key code memory. In other words, keys which are type A through F at one of the levels 1 through 8, will cause operation of the microcomputer in accordance with the program of FIG. 5 and also in accordance with the continuing program of FIGS. 6A and 6B. As described with reference to FIG. 5, upon obtaining a valid reading of the nine characters encoded on the key, the program advances from block 257 of FIG. 5 to block 260 of FIG. 6A. Block 260 uses the first character, which represents the level code, with the table 802 in memory to get a pointer or address for the location of the stored key code in the key code memory 217. Then, the test block 261 determines whether the last key was the rephase key. If so the program advances to test block 264; if not, the program advances to test block 262 which determines whether the primary code of the key matches the code stored in the key code memory. If the answer is yes, the program advances to test block 264 which determines whether the secondary code is all ones, i.e. equal to minus one. A secondary code of all ones is used only in conjunction with the emergency/rephase key which will be described subsequently. If the test block 264 determines that the secondary code is not all ones, the program advances to test block 266 which determines whether the key code memory is set to all ones. (A key code memory is set to all ones for the purpose of taking a lock out of use and is not otherwise used as a valid code.) If the test block 266 determines that the key code memory is not all ones, the program advances to block 268 which writes the secondary code from the key to the key code memory and it replaces the previously stores key code. The program then advances to block 270 which sets the “new” flag 227 to signify that the key is new, i.e. being used for the first time. From the block 270, the program advances to the test block 272 which determines whether the secondary code matches the key code stored in the memory. If it does, the program advances to block 274 which clears the bad read or error counter 239 described above. (The use of the error counter will be described presently.) After clearing the error counter, the program advances to block 276 which causes the program to branch to the particular subroutine for the level corresponding to the pointer obtained by block 260.

In the description of operation thus far given with reference to FIG. 6, conditions were assumed which caused the program to advance straight through from block 260 to block 276. If at test block 262 it were determined that the primary code does not equal the key code stored in the memory, the program will advance therefrom to test block 272 which determines whether the secondary code matches memory. If it does, the program proceeds as before to block 274 and thence to block 276 where the program branches. There is another condition, not previously described, which will allow the operation to proceed to block 276 at which the program branches. This other condition is as follows. If the test block 262 determines that the primary code matches memory and the secondary code is all ones as determined by block 264, the program will advance to test block 278 which determines whether the last key of the opening type was the emergency key; if so, the program advances to test block 280 which determines whether the last key inserted was the rephase key. If so, the program advances to block 268 which writes the secondary code to memory and the program advances through blocks 270, 272 and 274 to block 276 where the program branches. The foregoing condition is one which would be obtained when it is desired to take a lock out of use for a given level by writing all ones in the key code memory level. There is still another condition in the operation of the system, according to the flow charts of FIG. 6, in which the program will advance to block 276. If test block 262 determines that the primary code matches memory and test block 264 determines that the secondary code is not all ones but test block 266 determines that the key code memory is all ones, the program will advance to test block 278 which determines whether the last opening key was the emergency key. If it was the test block 280 determines whether the last key inserted was the rephase key. If so, the program will advance to block 268 which writes the secondary code to memory and then the program advances through blocks 270, 272, 274 and 276 at which the program branches as previously discussed. This latter condition could be obtained where the memory has previously been set to all ones to put the lock out of use at the particular level. If, however, in the procedures just described where the test block 264 determined that the secondary code is all ones or the test block 266 determines that the memory is all ones but the test block 278 determined that the last opening key was not the emergency key, or the test block 280 determined that the last key was not the rephase key, this would signify that the lock is not being put out of use and that a lock previously out of use is not being rephased. Accordingly, the program advances from block 278 to the shut-down routine 234 and puts the system in standby.

If, in the program of FIGS. 6A and 6B, the program advances to test block 272 and it is determined thereby that the secondary code does not match memory, the program will advance to the block 282 which increments the error counter 239. The error counter, as previously described, is used for recording the number of times a key is used in the lock without producing a match of the secondary code with the memory. This may result from use of the wrong key or it may result from bad data reads as referred to in the program of FIG. 5. If a key is inserted more than eight times with eight successive failures to get a code match, then it is desirable to discourage further attempts because of the possibility of tampering. For this reason, the program advances from block 282 to the test block 284 which determines whether the error count is greater than eight. If it is not, the program advances to the shut-down routine 234 which causes the system to go into standby condition and wait for the next key. If the error count is greater than eight, the program advances to block 288 which sets a delay timer in status control 223 for five seconds to prevent the reading of data from a key by block 252 of FIG. 5 until five seconds have elapsed. It is noted that the error counter 239 is cleared in block 274 each time a code match is determined by block 272.

As discussed above, when the program of FIGS. 6A and 6B reaches the block 276, it branches to the subroutine for that level corresponding to the pointer obtained by block 260. The subroutines corresponding to the different levels will now be described.

Figure 7:
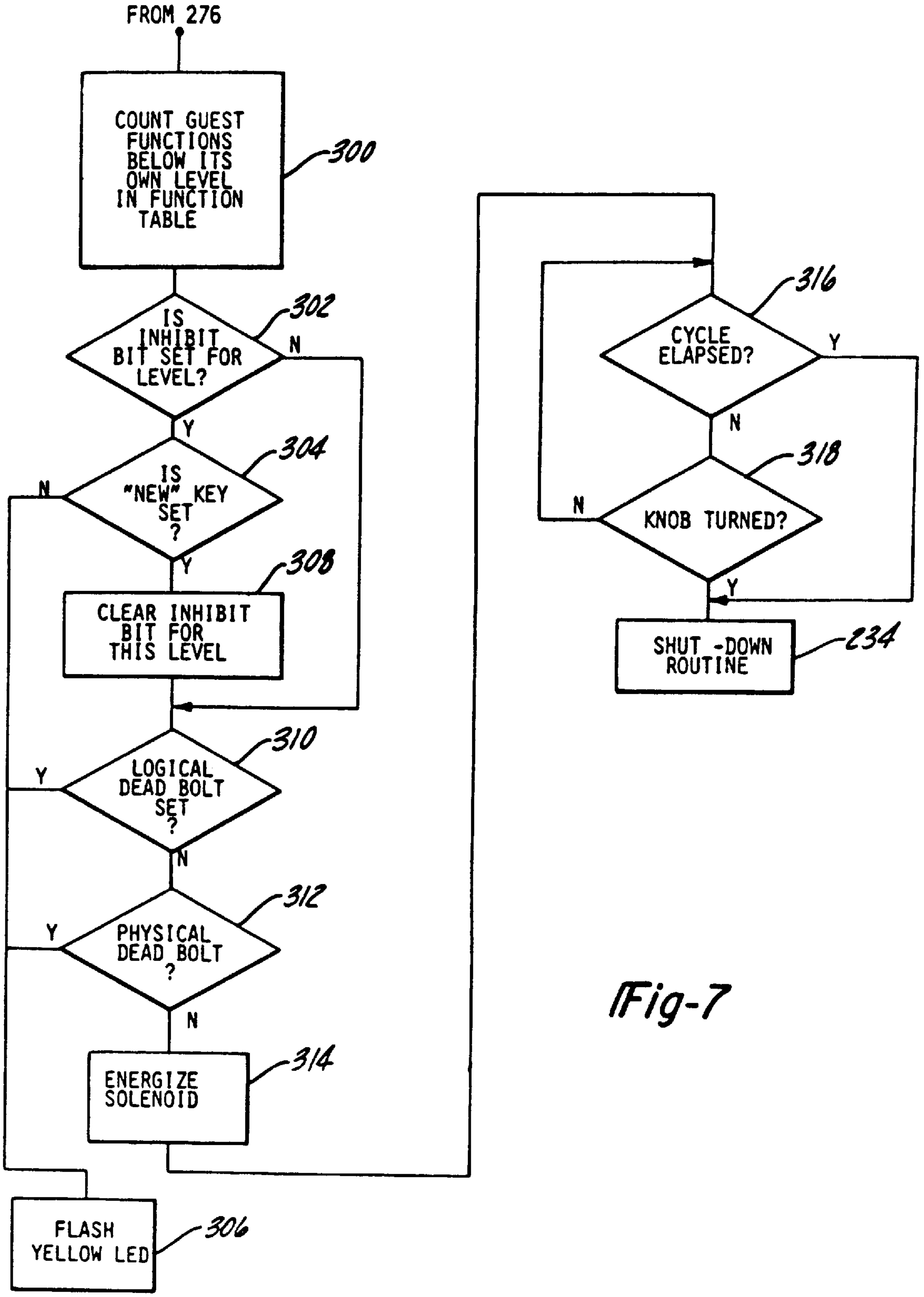

If the key which was inputted at block 240 of FIG. 5 was a guest key, either guest number 1 at level 1 or guest number 2 at level 7, the program will branch at block 276 of FIG. 6B to block 300 of FIG. 7. FIG. 7 represents the program or subroutine for a guest key. The guest key has the purpose of unlocking the lock unless the physical dead bolt is thrown, the logical dead bolt is set or the lock operation is inhibited by reason of the inhibit bit being set for the level of the inputted key. The inhibit bit may be set by previous inputting of the housekeeper key (non-opening version) to prevent unlocking by use of the previous guest key. Such procedure may be used as a security measure to prevent a guest who has checked out from entering the room. The operation of the system by the housekeeper key will be described in detail subsequently. Suffice it to say at this point, the housekeeper key (non-opening version) is effective to set all of the inhibit bits in the inhibit register 235. As described previously, the inhibit register has only two active inhibit bits since there are only two guest levels assigned in the function table namely, levels 1 and 7, for the lock being described. When a new guest key is assigned, as in the example of the inputted key at block 240, it must be operative to clear the inhibit bit for its level, if such bit is set.

The guest key program is shown in FIG. 7. As described above, more than one level may be assigned for the guest key function. The inhibit register contains four bits each of which may be selectively set for one of the guest key levels. Thus, at the outset, it must be determined which inhibit bit corresponds to the inputted guest key. For this purpose the initial block 300 counts the guest functions below its own position in the function table. The corresponding inhibit bit is in the same relative position as the guest key level. The program then advances to test block 302 which determines whether the inhibit bit is set for the level of the key being processed. If it is, the program advances to test block 304 which determines whether the “new” flag is set. If it is not set, meaning that the key being processed is not a new key, the program advances to the block 306 which flashes the yellow LED signifying that the key code matched but the door will not be unlocked. If test block 304 determines that the new flag is set, the program advances to block 308 which clears the inhibit bit for the level of the key being processed. The program then advances to test block 310 which determines whether the logical dead bolt is set. If the test block 302 determined that the inhibit bit was not set, the program would advance directly to test block 310 to determine if the logical dead bolt is set. If it is, the program advances to block 306 to flash the yellow LED. If it is not, the program advances to the test block 312 to determine whether the physical dead bolt is set. If it is, block 306 flashes the yellow LED. If it is not, the program advances to block 314 which energizes the solenoid. The program then advances to test block 316 which determines whether the cycle time has elapsed. If it has, the program advances directly to the block 234 which initiates the shut-down routine which will be described subsequently with reference to FIG. 8. If the cycle time has not elapsed, the program advances to test block 318 which determines whether the knob has been turned. If it has not, the program loops back to the test block 316. If the knob has been turned, the program advances to the shut-down routine 234.

Figure 8:
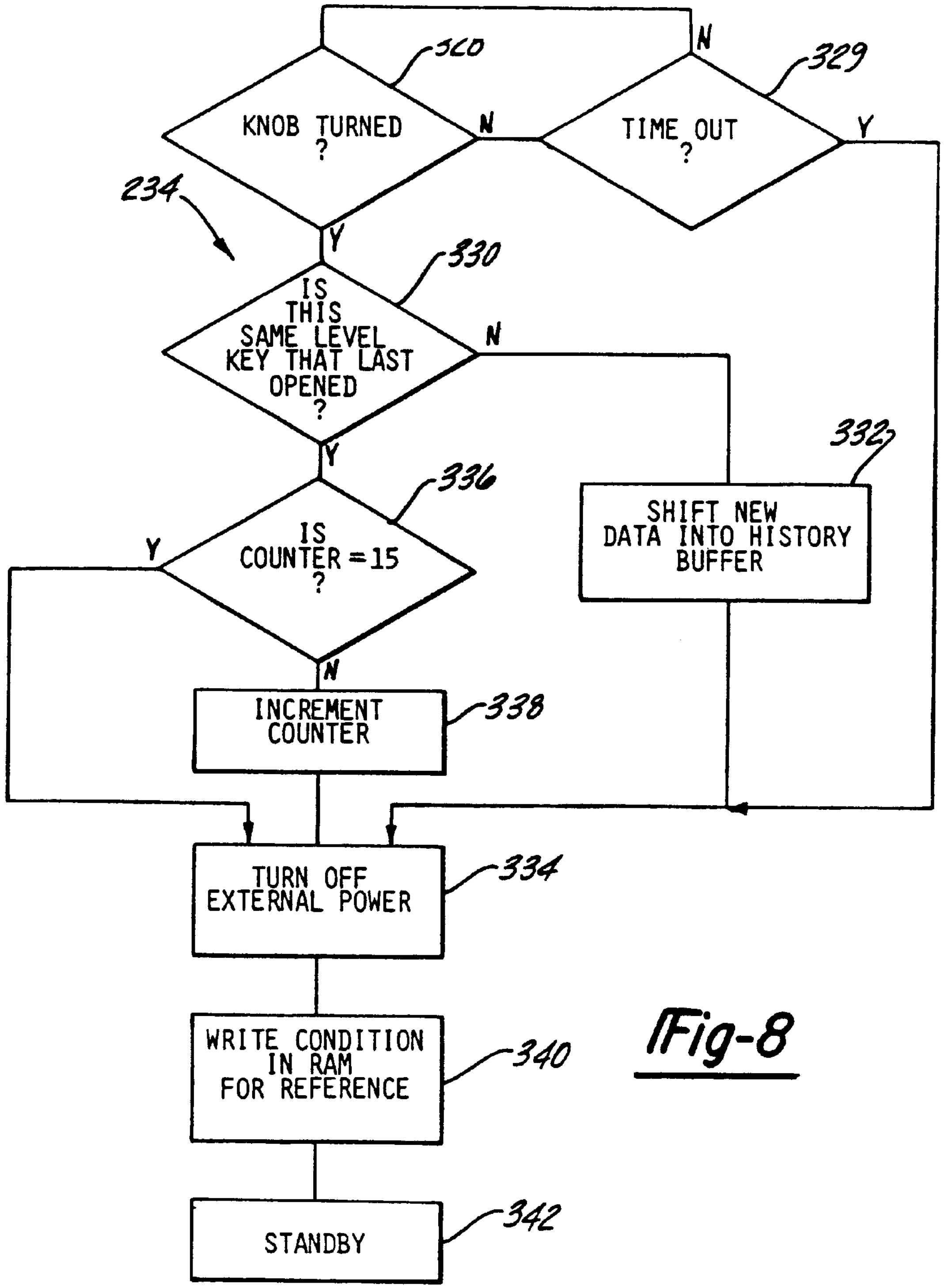

The shut-down routine is shown in FIG. 8. In general, it is adapted to record or memorize certain data regarding the recent history of the lock operation and then place the lock in standby condition. The recording of lock operation history in the lock memory permits subsequent memory dump for purposes of analysis for security purposes or for diagnostic purposes. The memory dump includes the identification as to which of the eight opening-type keys were used to actually open the door. The opening repeat counters 243 are provided to record the number of sequential door openings, up to a maximum of fifteen, for the most recent several (e.g. five) different keys used for opening. The shut-down routine 234 starts with block 328 which determines whether the knob had been turned to open the door, i.e. whether a door opening occurred. If not, the program advances to the test block 329 which determines whether the delay timer has timed out. If so, the program advances directly to block 334 and by-passes the recording steps. If it has not timed out, the program loops back to block 328. If block 328 determines that the knob was turned, the program advances to block 330 which determines from the key-type register 241 whether the key being processed is at the same level as the last key used for opening the door. If the answer is no, the program advances to block 332 which shifts new data into the history buffer which includes the repeat counters 243 and records a zero for the level of the key being processed. Then the program advances to block 334 which will be described presently. If the answer to test block 330 is yes, the program advances to test block 336 which determines whether the repeat counter 243 associated with the level of the key being processed is equal to fifteen. If the answer is yes, the program advances to the block 334. If the answer is no, the program advances to block 338 which increments the counter and then the program advances to block 334. Block 334 turns off power to the external devices including the solenoid and the LEDs. Then the program advances to block 340 which writes data into the memory of the status control 223 in RAM in order to memorize the existing condition or status of the lock. This memorized status is then used as reference data to assure that the status is reinstated when the lock is next activated. After the block 340, the program proceeds to block 342 which places the lock in standby condition to wait for the next key. The shut-down routine just described is used in connection with other keys, the operation of which will be described subsequently.

Figure 9:
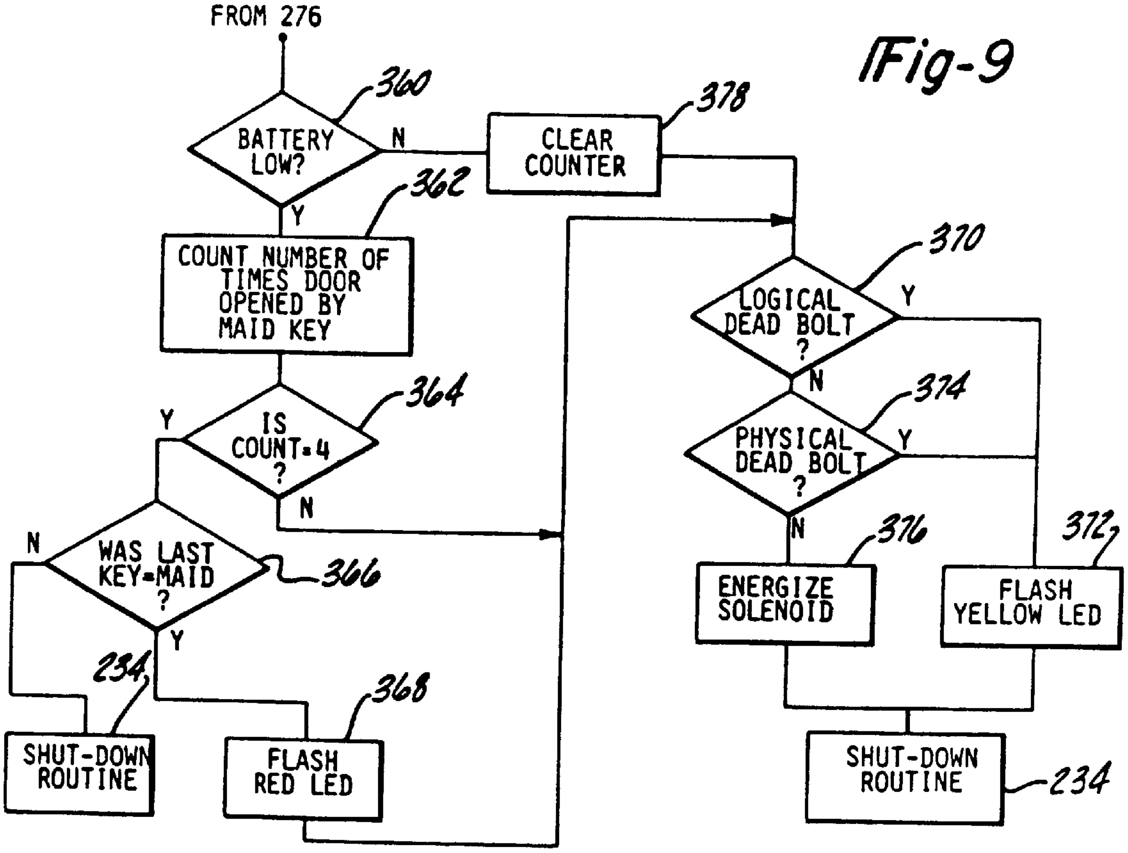

If the maid key is inputted at block 240, the program will branch at block 276 to the maid key subroutine which is represented in the flow chart of FIG. 9. The maid key which is assigned level number 8 in the function table is intended to be used as an opening key for several rooms, for example all rooms on the same floor of the hotel. Additionally, the maid key is used to alert the maid to a low battery condition of the lock so that it can be replaced in a timely fashion.

The maid key program starts with block 360 which determines whether the battery is found to be low. If it is, the program advances to block 362 which increments the maid key counter which, as described previously, counts the number of times the door has been opened by the maid key while the battery is in a low condition. The program advances to block 364 which determines whether the maid key counter is equal to four. If it is, the program advances to test block 366 which determines whether the last key was the maid key. If it was not, the program goes to the shut-down routine 234, previously described, and waits for the next key. Thus the first insertion of the maid key will not open the door when the solenoid has been energized and the door opened (knob turned) four times by the maid key with a low battery. To open the door under these conditions, the maid key must be inserted twice. If the test block 366 determines that the last key was the maid key, the block 368 flashes the red LED and the program then advances to test block 370. Test block 370 determines whether the logical dead bolt is set. If it is, block 372 flashes the yellow LED. If it is not, the program advances to block 374 which determines whether the physical dead bolt is thrown. If it is, block 372 flashes the yellow LED. If not, the program advances to block 376 which energizes the solenoid. Then the program executes the shut-down routine 234 and waits for the next key. If the test block 360 determines that the battery is not low, the program advances to block 378 and clears the maid key counter and the program advances to block 370 and proceeds as described above.

Figure 10:
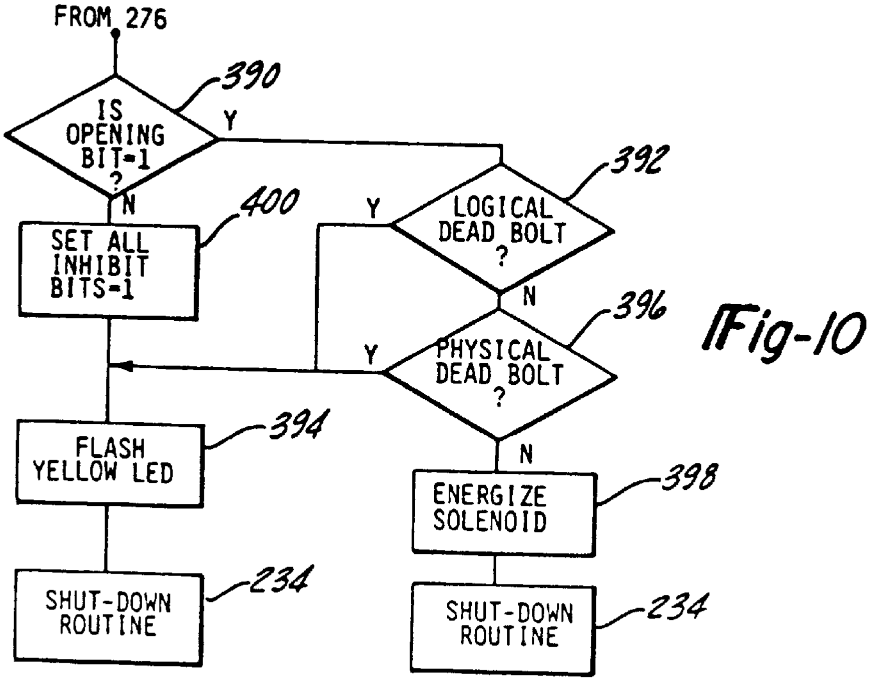

If the housekeeper key is inputted at the block 240, the program will branch at block 276 to the housekeeper key subroutine which is represented in the flow chart of FIG. 10. The housekeeper key is provided in two different versions, an opening version and a non-opening version. Both versions of the key are to be used in a number of different locks, for example, the locks for all of the guest rooms in the hotel. The unlocking version of the housekeeper key is to be used for unlocking the door and gaining access to the room. The non-opening version is to be used for locking out the previous guest by setting the inhibit bit to one so that a new guest key must be used to unlock the door. The housekeeper key subroutine starts with block 390 which determines whether the opening bit (one of the bits of the first character) is equal to one. If it is, the key is an opening version and the program advances to test block 392 which determines whether the logical dead bolt is set. If it is, the program advances to block 394 which flashes the yellow LED and then the program goes to the shut-down routine 234. If the logical bolt is not set, the program advances from block 392 to block 396 which determines whether the physical dead bolt is set. If it is, the program advances to block 394 to flash the yellow LED. If it is not, the program advances to block 398 which energizes the solenoid. If at test block 390, it is determined that the opening bit is not one, the program advances to block 400 which sets all inhibit bits to one. Then, the program advances to block 394 which flashes the yellow LED and the program goes to the shut-down routine 234.

If a one-shot key is inputted at input block 240, the program will branch at block 276 to the one-shot key subroutine. This subroutine is represented by the flow chart of FIG. 11. The one-shot key has the purpose of unlocking the door one time and one time only. It may be used, for example, to give a repair person access to the room with the assurance that it cannot be used for subsequent access to the room. The one-shot key subroutine starts with the test block 410 which determines whether the "new" flag is set. If it is not set, meaning that this key has been used previously, the program advances to the shut-down routine 234. If the new flag is set, the program advances to test block 414 which determines whether the logical dead bolt is set. If it is, the program advances to block 412 to flash the yellow LED; if it is not, the program advances to test block 416 which determines whether the physical dead bolt is thrown. If it is, the yellow LED is flashed; if not, the program advances to block 418 which energizes the solenoid and the program goes to the shut-down routine 234.

Figure 12:
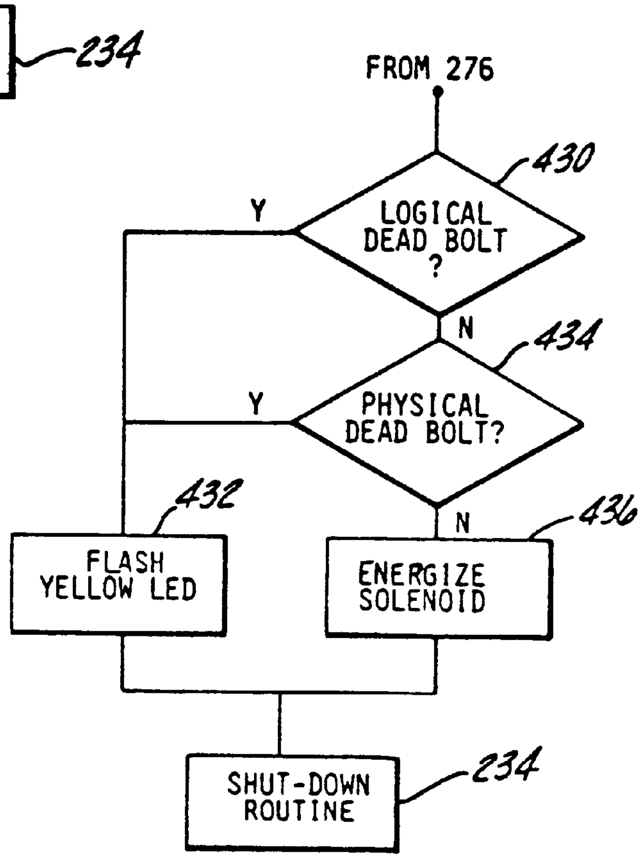

If a miscellaneous key is inputted at the input 240, the program will branch at block 276 to the miscellaneous subroutine which is represented in the flow chart of FIG. 12. The miscellaneous key is assigned to level 5 in the key code memory 217 for use as a master opening key for an assigned zone or group of rooms. The miscellaneous key is also assigned to level 3 in the key code memory 217 and is used to function as a fail-safe key in the event that, for example, a guest key cannot be produced because of a malfunction of equipment or an emergency such as a power outage in the hotel. The miscellaneous key, whether fail-safe or zone, has the function of unlocking the door provided the logical or physical dead bolts are not set. The housekeeper key does not inhibit unlocking by a miscellaneous key.

The miscellaneous subroutine starts with test block 430 which determines whether the logical dead bolt is set. If it is, the program advances to block 432 which flashes the yellow LED and the program goes to the shut-down routine 234. If the logical dead bolt is not set, the program advances to the test block 434 which determines whether the physical dead bolt is thrown. If it is, the yellow LED is flashed; if it is not, the program advances to block 436 which energizes the solenoid and the program goes to the shut-down routine 234.

Figure 13:
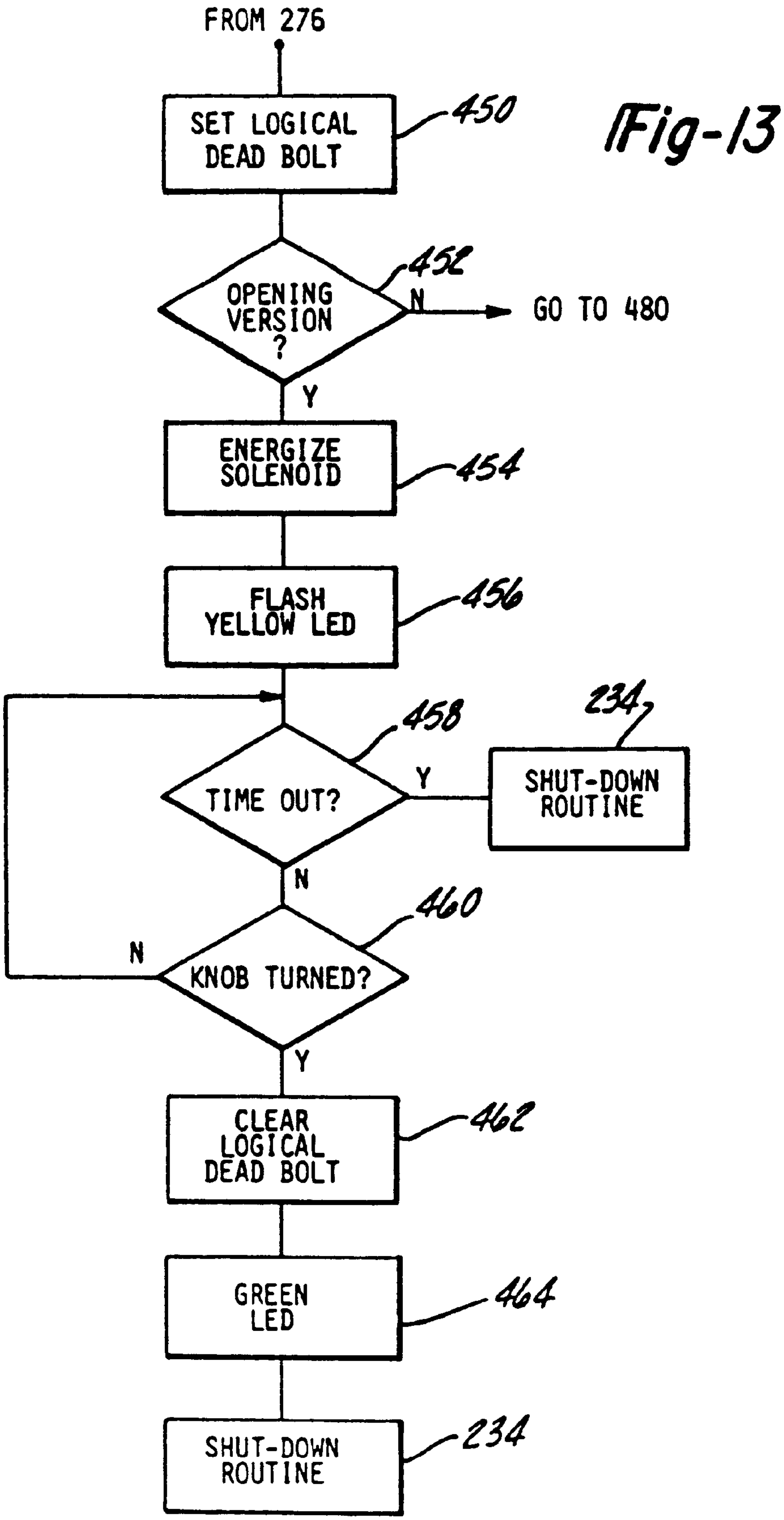
Figure 14:
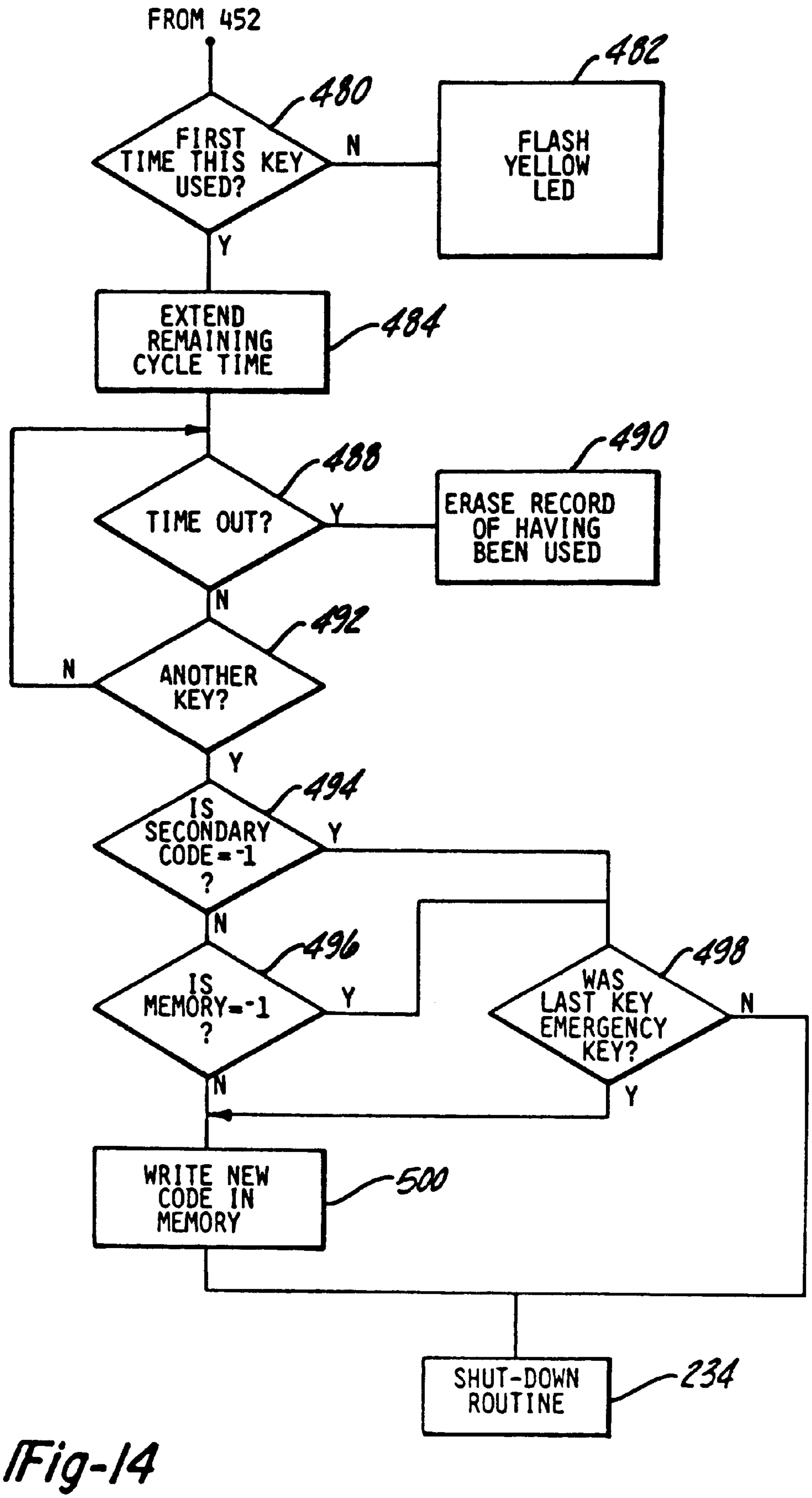

If the emergency/rephase key is inputted in input block 240, the program will advance to block 276 and then branch to the emergency/rephase key subroutine which is represented in the flow chart of FIGS. 13 and 14. There are two versions of the emergency/rephase key. One version, referred to as the emergency key is an opening version with a one in the opening bit position in the first character encoded on the key. The other version, known as the rephase key, is a non-opening key and has a zero at the opening bit in the first character. The emergency key will unlock the door regardless of the physical or logical dead bolt status. When the emergency key is inputted, the logical dead bolt is set or asserted and if the knob is not turned it will remain set. Since it is an opening key, the knob may be turned and if is it will cancel the logical dead bolt. Turning of the knob also unlocks the physical dead bolt. The logical dead bolt cannot be released by any key other than the emergency key.

The emergency/rephase key subroutine starts at block 450 which sets the logical dead bolt. The program advances to test block 452 which determines whether the key is an opening version. If it is not, the program branches to the rephase subroutine of FIG. 14 which will be described subsequently. If the key is an opening version, the program advances to the emergency subroutine which begins at block 454 which energizes the solenoid. The program advances to the block 456 which flashes the yellow LED and this signifies that the solenoid has been energized to unlock the door but the knob has not been turned. The program advances to the test block 458 which determines whether the cycle has timed out. If it has, the program goes to the shut-down routine 234. If it has not timed out, the program advances to block 460 which determines whether the knob has been turned. If it has not, the program loops back to block 458. If it has been turned, the program advances to block 462 which clears the logical dead bolt. Next, the program advances to block 464 which causes the green LED to flash three times. Then the program goes to the shut-down routine 234 and waits for the next key.

The emergency key is used to obtain a high degree of security in locking a room. For example, if a guest has valuables in the room and wants to make sure that no key including maid key, housekeeper key, etc. will open the lock, the hotel management can use the emergency key and let the cycle time run out without turning the knob. This leaves the logical dead bolt set and it will remain set after the emergency key is withdrawn. In this condition, no other key will operate the unlocking mechanism. When the guest desires to reinstate the lock operation, the emergency key is inserted by management and the knob is turned to open the door. This places the lock in the standby condition and it waits for the next key.

The rephase key is used to write new key code into the lock at any desired level of memory. In general, it is used by inserting the rephase key into the lock then removing it and inserting any other key which is encoded with a key code to be read into the key code memory. This is done by sequencing similar to that of a guest key which is being used for the first time wherein the secondary code of the key is written into the key code memory at the level corresponding to that key.

The rephase subroutine will now be described with reference to FIG. 14. It is noted that the emergency/rephase key program branches at block 452 when it is determined that the key is a non-opening version, i.e. a rephase key. The rephase subroutine starts with block 480 which determines whether this is the first time the key has been used. (When the rephase key is used two times in succession, the RAM memory including the repeat counters 243 can be dumped via a port on the microcomputer to a portable computer for analytical purposes. After that the program advances to block 482 which flashes the yellow LED.) If this is the first time the key has been used, the program advances to block 484 which extends the remaining cycle time by a factor of four. Then, the program advances to the test block 488 which determines whether the extended cycle time has timed out. If the answer is yes, the program advances to the block 490 which erases the record of the rephase key having been used. If the cycle has not timed out, the program advances to block 492 which determines whether another key has been inputted. If not, the program loops back to the test block 488. If another key has been inserted, the program advances to the block 494 which determines whether the secondary code is all ones. If the answer is yes, the program goes to test block 498 which will be described presently. If the answer is no, the program advances to block 496 which determines whether the key code memory is all ones. If the answer is yes, the program advances to block 498 which determines whether the emergency key was the last to open the door. If the answer is no, the program goes to the shut-down routine 234. If the answer is yes, the program advances to block 500 which writes the new key code into memory. If the answers to both test blocks 494 and 496 are both no, the program advances directly to block 500 which writes the new code into memory.

The second embodiment of the invention is shown in FIGS. 15 through 21. This second embodiment is characterized by a magnetic key as distinguished from the punch card key described with reference to the first embodiment. As shown in FIG. 15, the magnetic key 508 comprises a card 510, suitably of opaque plastic material, which carries a magnetic band or stripe 512. The magnetic stripe 512, in the nature of a stereo recording tape, has two record tracks 514 and 516. Each track is recorded with an undulating magnetic field which, in analog signal form, represents a sequence of magnetic poles. Each track is encoded with a magnetic signal which represents twenty bits of information. As will be described subsequently, the magnetic key 508 is read by a key reader which converts the magnetic signals of the tracks 512 and 514 to electrical signals.

As in the first embodiment, the lock is adapted for use of eight different key functions. However, more than eight different types of key functions are available even though only eight may be programmed in the lock at a time. The following different types of keys may be programmed:

Key-Type A: Normal operation for opening and non-opening and for sequencing and non-sequencing; for general use or master key levels. All other key-types operate in this manner except for special features as noted.

Key-Type B: Single entry "one-shot". Allows only one-time door opening. Internal flag is kept in the memory to allow only one activation per code of the stripe. Used for service personnel who need to enter a room only once.

Key-Type C: Normal guest usage. The non-opening housekeeper key may be used to inhibit (lock out) the currently active guest level. Internal flags are used to inhibit up to four different guest levels: a sequencing type card must be the next card used for access to the room. When a new guest card is sequenced into the lock, that guest level becomes active again with the other guest level still inhibited. Use of an inhibited guest key will only flash yellow accept LED.

Key-Type D: Housekeeper function. Opening version operates normally. Non-opening version will inhibit all current guest level cards. Used for inhibiting a check-out guest before a new guest card is sequenced. Up to four guest levels such as the normal guest or suite are simultaneously inhibited.

Key-Type E: Maid/low battery key. Normal use for access by the maid with a special effect of a low battery inhibit function. When the maid key is used to open the door (i.e. turn knob) four different times with a low battery, the key must be inserted two times in sequence to unlock the door. The purpose is to alert the maid to the need for battery replacement. If the low battery inhibit function is in effect and the lock is dead bolted, the first insertion of the maid key will be initiation of the low battery indicator.

Key-Type F: Emergency/rephase. This is the highest security key and will assert the logical dead bolt status if the key is inserted and the knob is not turned. The opening version is referred to as the emergency key and will always open the door regardless of the physical or logical dead bolt status. Insertion of the key and turning the doorknob will release the logical dead bolt. The non-opening version of this key is referred to as the rephase key. Insertion of this key will assert the logical dead bolt but the knob cannot be turned to release the logical dead bolt. This key allows a new key code to be loaded into the key code memory. If the particular memory level has been inhibited by a code of all ones, the rephase key must be preceeded by the emergency key to load a new key code. The sequential use of the emergency key and the rephase key is also required to phase in a code of all ones at any level to inhibit use of that level.

Key-Type G, Security A: This key is the first of a two key sequence for a high degree of security. The opening version will assert the logical dead bolt but the non-opening version does not. This allows sequencing of a new security key without dead bolting the lock.

Key-Type H, Security B: This key is the second in the two key sequence for the high degree of security. This key must be inserted within the normal cycle time after the security A key in order for the door to be unlocked. The opening version of this key will open the lock regardless of the dead bolt status and will assert the logical dead bolt status after use. The non-opening version can only sequence a new key if needed and will not assert the dead bolt. Activation of the door lock with the security A—security B key sequence results in only the security B being recorded in the door lock history.

Key-Type I, No Operation: This no-op key is used to program a level to an inactive state, i.e. to put that level out of use. No key is actually made for the inactive level. The level can be activated only by power-up and reprogramming. No key will operate at the inhibited level.

Key-Type J, Hotel Pass: This is a utility function which can be programmed to allow door lock activation by matching of only the card key level code and the hotel code, i.e. there is no matching required of the primary or secondary key codes. Typical use includes guest access to common hotel areas such as swimming pools, game rooms, etc.

As described above, the recorded code on the key is read from the key in two parallel streams of data. For this purpose, a magnetic key reader 520 is provided as shown in the schematic diagram of FIG. 16. The magnetic key reader comprises a pair of magnetic tape read heads 522 and 524 which coact respectively with the recording tracks 514 and 516 on the magnetic stripe of the key. The read heads 522 and 524 suitably take the form of a conventional stereo pick up or read head. The magnetic read heads 522 and 524 are connected with a voltage divider 526 which is connected across the voltage source. The output of the read head 522 is coupled to the input of a differential amplifier 528 and the output of the amplifier is coupled to the input of an analog to digital converter 532. The output of the converter 532 is coupled to the data pin D0 of the microcomputer 112. Similarly, the output of the read head 524 is coupled to the input of a differential amplifier 534. The output of the amplifier is coupled to the input of an analog to digital converter 536 and the output thereof is coupled to the auxiliary clock pin and the data pins D1, D2 and D3 of the microcomputer 112. As described with reference to FIGS. 2A and 2B, the key reader 38 includes a key switch 58 which is actuated to a closed condition upon full insertion of the key and it is actuated to an open condition upon withdrawal of the key. Thus, the data streams which are produced by the magnetic read heads 522 and 524 from the recording tracks 514 and 516 on the key are read into the microcomputer upon withdrawal motion of the key. The motion of the key causes a signal voltage to be induced in the read heads 522 and 524 in accordance with the recorded magnetic signal on the respective tracks 514 and 516. The signals are amplified by amplifiers 528 and 534, respectively, to produce enhanced analog voltage signals. The analog signals from the amplifiers 528 and 534 are processed by the analog to digital converters 532 and 536, respectively, to produce corresponding digital signals. The output of the converter 532 supplies a serial bit stream of twenty bits to the data pin D0 corresponding to the data recorded on track 514. Similarly, the output of the converter 536 supplies a serial bit stream of twenty bits to the microcomputer corresponding to the data recorded on track 516.

As described, the microcomputer 112 receives the code from the magnetic key in two parallel streams of serial bit data with twenty bits per stream. The ROM 215 in the microcomputer includes a decoder which is operative under the program control to reformat the incoming code streams for further processing of the key code. In particular, the decoder transposes the two serial bit streams into a storage format for comparison with the code stored in the key code memory 217. For explanatory purposes, it may be considered that the coded data read from the key is reformatted by the decoder so that it comprises a control code field, a hotel code field, and primary and secondary key code fields. The control code comprises a four bit character or nibble of which three bits represent the level or function of the key and the fourth bit is the opening bit to define the key as an opening key when it is a one and a non-opening key when it is a zero. The hotel code includes a four bit character to identify the hotel and to function as a hotel pass code which will be described below. The primary key code for the lock comprises a sixteen bit character and the secondary key code for the lock comprises another sixteen bit character. The array of the stored key code may be considered as similar to that described with reference to FIG. 2C.

In this second embodiment of the invention, the microcomputer 112 and its connection with external circuits is the same as described with reference to FIGS. 3A, 3B and 3C except as modified to accept the magnetic key reader 520 as described with reference to FIG. 16. The programming and operation of the microcomputer 112 is the same as previously described except as noted in the description that follows.

This second embodiment of the lock which uses the magnetic key, provides a higher degree of security than the first embodiment for several reasons. First, the magnetic coding on the key itself cannot be readily examined and is difficult to reconstruct or copy. Secondly, the start-up program requires a specific sequence with a plurality of keys. In particular, when a lock comes up from a cold start, a minimum of eleven keys must be used in the proper sequence to open the lock. Third, a programming key allows any level to be assigned whatever function desired. Further, a high degree of security is provided by reason of the code processing. In particular, the decoder which reformats the serial bit stream into a storage format is an internal part of the microcomputer chip and cannot be accessed except through the ports or pins of the microcomputer. These features are in addition to those described with reference to the first embodiment such as the time-out requirement after eight bad reads in a row and the requirement for operation of the key switch for each key and turning of the knob within the time limit after hitting the correct key code.

Figure 17A:
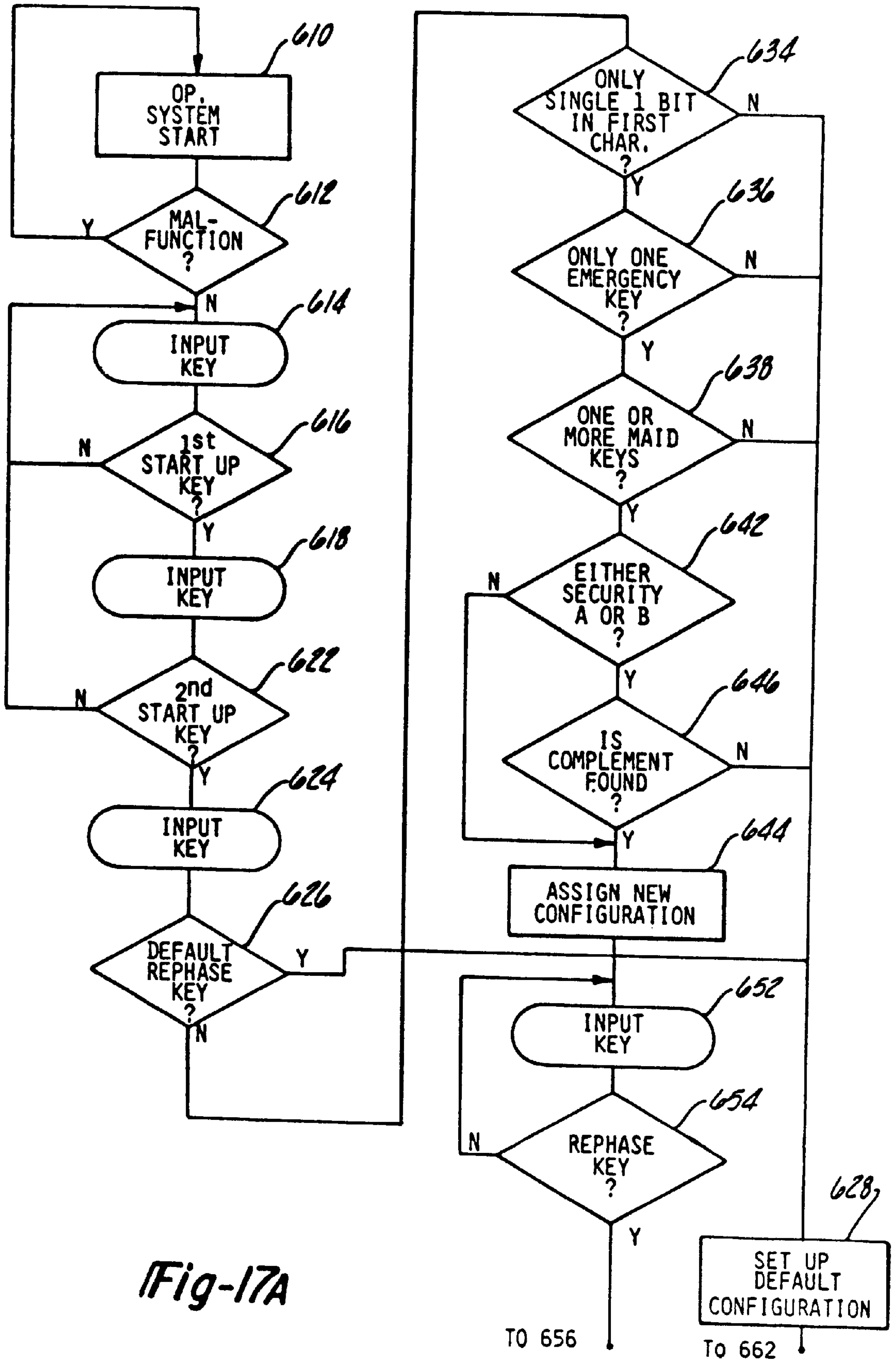
FIGS. 17A, 17B and 18 through 21 show flow charts representing additional control programs for the microcomputer in a second embodiment of the invention.
Figure 17B:
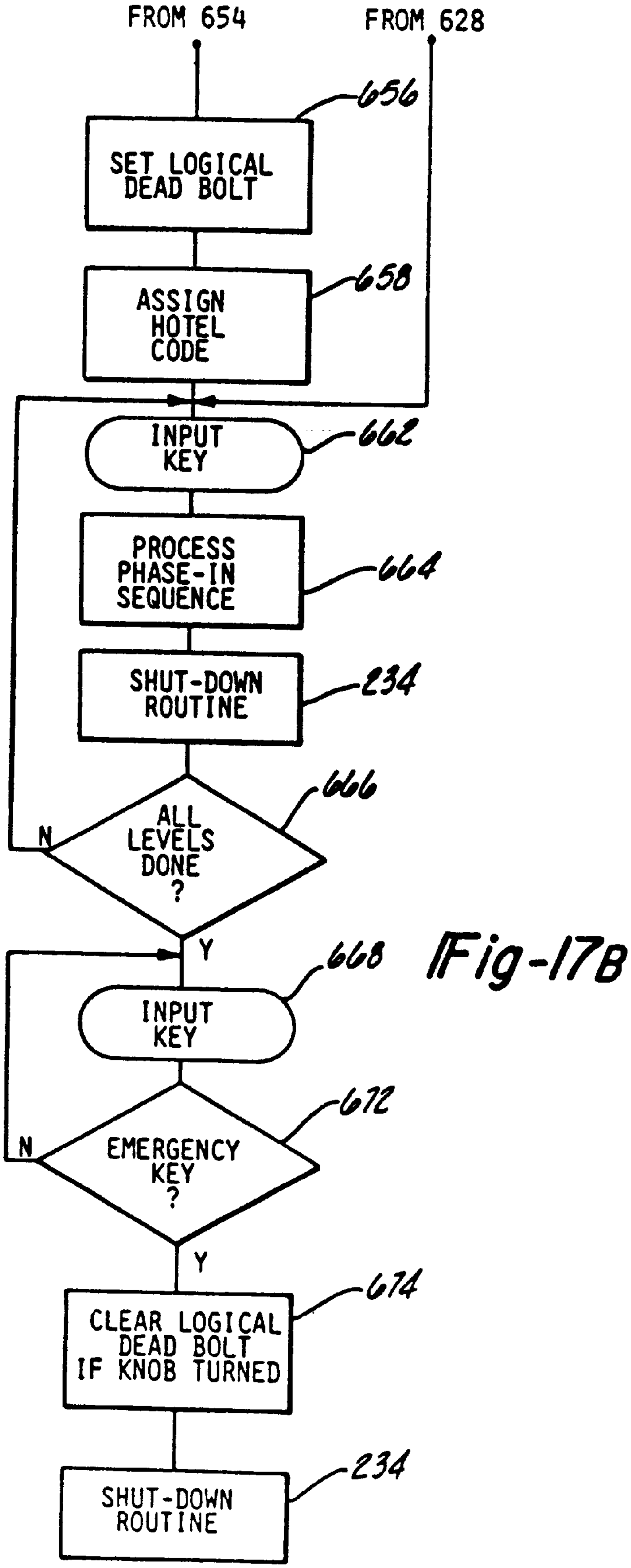

The start-up procedure for the second embodiment of the invention is represented in the flow charts of FIGS. 17A and 17B. The start-up procedure is characterized by the requirement for the inputting of first and second start-up keys in sequence and also by the optional use of a programming key as a means for assigning levels, i.e. to define or to redefine the assigned levels in the key code memory. The operating system start block 610 is operative to power up the microcomputer and the electronic control circuit. This power up condition occurs upon connection of the battery in the lock circuit and constitutes a cold start of the system. When power on is achieved, the program advances to the test block 612 which determines whether any part of the system has a malfunction. If so, it loops back to the start block 610; if not, the program proceeds to an input block 614 and awaits the insertion of a key. When a key is inserted, the program advances to the test block 616 which determines whether the inserted key is the first start-up key. If it is not, the program returns to block 614 and waits for another key. If the inserted key was the start-up key, the program advances to the input block 618 and waits for the insertion of another key. When a key is inserted, a test block 622 determines whether it is the second start-up key. If not, the program loops back to input block 614; if it was the second start-up key, the program advances to the input block 624 and waits for another key. When a key is inserted, the test block 626 determines whether it is the default/rephase key. If it is, the program proceeds to block 628 which sets up the default configuration which, for example, may be the same as that described with reference to the first embodiment of the invention. If the inserted key is not the default/rephase key, the program proceeds to determine whether the inserted key is a valid programming key. The programming key is prewritten with the key functions desired at the different levels in the function table 219. If the programming key meets certain criteria, as checked by the microcomputer, it is operative to set all eight levels in the function table and it assigns the opening bit configuration in the four bit control code. (As in the first embodiment, three of the four bits in the control code define one of the eight different levels and the other bit tells whether it is an opening or non-opening key.) In the second embodiment, the opening bit can be placed in any one of the four bit positions. In order to determine whether the input key is a valid programming key, as prewritten, it is checked by a series of tests starting with the test block 634. Test block 634 determines whether there is only a single one bit in the first column, i.e. in the four bit control code so that in the programming of the lock that follows, only one opening bit will be designated. If test block 634 determines that there is more than one one bit in the first column the program proceeds to block 628 which sets up the default configuration. If there is only one one bit, the program advances to test block 636 which determines whether there is one and only one emergency key assignment in the programming key. If there is none or if there is more than one, the program advances to the block 628 to set up the default configuration. If there is one and only one emergency key the program advances to test block 638 which determines whether there is at least one maid key assignment. If not, the default configuration is set up at block 628. If so, the program proceeds to test block 642 which determines whether either at least one security A or at least one security B key is assigned by the programming key. If the answer is no, the program advances to block 644. Block 644 is operative to assign the new configuration, as will discusser presently. If test block 642 determines that the programming key assigns at least one security A or security B key, the program then proceeds to test block 646. This test block 646 determines whether the complement to security A or security B is assigned, i.e. the other of the two. If not, the program advances to block 628 to set up the default configuration. If the complement is found by block 646 the program advances to block 644 which assigns the new configuration, i.e. the key functions for each of the eight different levels are established as prewritten on the programming key. Next, the program advances to the input block 652 which waits for the input of a key. At this point in the procedure, the eight character function table 219 has been written by the block 644 to establish the desired configuration of the eight key levels. It remains, in the start-up procedure, to load the key code memory 217 with the key codes at the eight different levels corresponding with eight different key function assignments. For this purpose, the next key required in the start-up sequence is the rephase key.

When a key is inputted at input block 652, the program advances to test block 654 which determines whether the inserted key is a rephase key having a level designation according to the level assigned by the programming key. If it is not, the program loops back to the input block 652 and waits for another key. If it is, the program advances to block 656 which sets the logical dead bolt in response to the insertion of the rephase key. Then, the program advances to block 658 which assigns the hotel code by writing the hotel code which is contained on the rephase key into the hotel code memory of the lock. At input block 662, the system waits for the input of a key. At this point in the start-up procedure, the lock is in readiness for having assigned key codes written into the key code memory 217 at a location pointed to by the same pointer as used by the function table 219, in accordance with the assigned memory level. The phase-in procedure for writing the key codes into memory is accomplished by the sequential insertion of the keys which have been programmed into the lock. This sequence of key insertion must start with the key which is assigned to the level next above the level of the rephase key. The sequence is continued in numerical order of the key levels, it being understood that when level seven is reached, the sequence continues from level zero. This phase-in sequence starts at block 662 with the input of the key which has a level next higher than that of the rephase key. Then the program advances to block 664 which represents the processing of the phase-in sequence; it checks to make sure that the correct level of key is inserted. If it is not, the program would return to block 662. If the key is at the correct level, the block 664 causes the secondary key code from the key to be written into the key code memory 217 at a location or level corresponding to the key level code encoded on the key. Next, the program advances to the shut-down routine 234 and the system is placed in standby. Then, the test block 666 determines whether all levels of the keys have been phased in. If not, the program loops back to block 662 and waits for the insertion of another key. When all levels are done, the program advances to the input block 668 and waits for the input of another key. At this point in the program, the lock will accept any key and process it according to its normal function except that the door cannot be opened because the logical dead bolt is set. The emergency key is required to place the lock in readiness for door opening by the keys which have been assigned. The key is inputted at block 668 and the program advances to the test block 672 to determine whether it is an emergency key. If not, the program loops back to the input block 668 to wait for another key. If it is, the program advances to block 674 which clears the logical dead bolt if the knob of the lock has been turned. After block 674 the program advances to the shut-down routine 234 and the lock is placed in standby. The start-up procedure just described is usually performed in the factory so that the lock is ready for use when it is installed on a door. However, it can be performed after installation and the start-up procedure must be used when a lock has lost power, as might be the case if the lock has been tampered with and the battery supply is short circuited.

After the start-up procedure, as described above with reference to FIGS. 17A and 17B, the lock is in readiness for use and may be operated by any of the several keys which have been phased into the lock. In response to the insertion of any key into the lock, the microcomputer controls the lock in accordance with the code read from the key. The microcomputer operates under program control; the program for all of the keys which have been phased in is represented by the flow charts of FIGS. 5, 6A and 6B as described above, with the exceptions noted below. The program represented by the flow chart of FIG. 5 is modified so that block 252 inputs and stores ten characters upon withdrawal of the key since there is an additional four bit character for the hotel code. Otherwise, the program represented by FIG. 5 remains the same as in the first embodiment of the invention. The program represented by FIG. 6A is different from that for the first embodiment in that it is adapted to check the hotel code on each key. This modification is shown in the flow chart of FIG. 18 which will be described subsequently. As previously described, when the program reaches block 276 in FIG. 6B, it branches to the subroutine for that level corresponding to the pointer obtained by block 260. In this second embodiment, the same key functions may be used as those described in the first embodiment, i.e. the key functions described with reference to the program subroutines represented by the flow charts of FIGS. 7 through 14. This second embodiment also includes additional key functions or types which are referred to herein as security A, security B, hotel pass, and no operation (no-op). These key functions and the corresponding program subroutines for effecting the lock operation will now be described.

Figure 18:
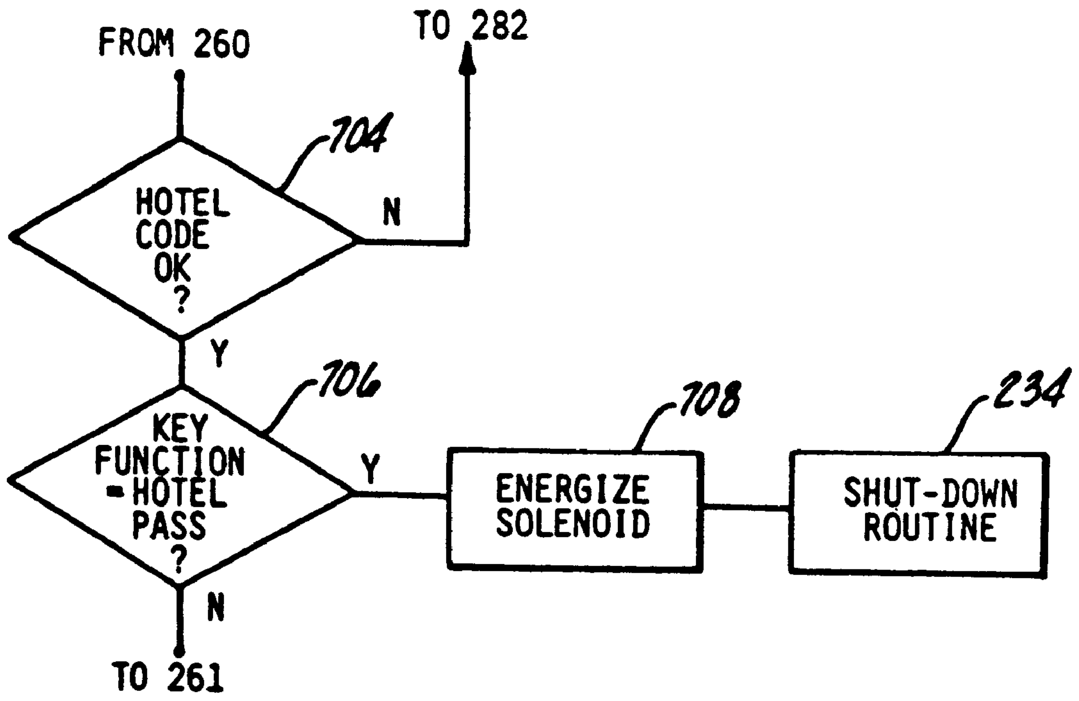

The program for the hotel pass function is represented by the flow chart of FIG. 18. The program represented by this flow chart is a part of the program represented by the flow chart of FIG. 6A; specifically, the flow chart of FIG. 6A is modified by inserting the chart of FIG. 18 between block 260 and block 261. After the block 260, which uses the first character representing the control code to get a pointer or address for the location of the key code in code memory, the program advances to the test block 704. The test block 704 determines whether the hotel code on the key matches the hotel code stored in the key code memory. If not, the program loops back to block 282 (FIG. 6B) and waits for the insertion of another key. If the hotel code does match, the program advances to test block 706 which determines whether the key function as indicated in the function table 219 is the hotel pass function. If it is not, the program proceeds to block 261 and is executed as described previously with reference to FIGS. 6A and 6B. If the key function is the hotel pass function, the program advances from block 706 to block 708 (provided neither the logical nor the physical dead bolt is set) which energizes the solenoid and allows the door to be opened. Then, the program advances to the shut-down routine 234. As previously described, the hotel pass key is useful for admitting guests of the hotel to common areas such as the swimming pool, game room, etc.

The additional functions, namely, no-op and security A and security B are provided by the way of subroutines in the same manner as the different key functions of the first embodiment described with reference to the flow charts of FIGS. 7 through 14. As discussed above, when the program of FIG. 6B reaches the block 276, it branches to the subroutine for that level corresponding to the pointer obtained by block 216. The additional subroutines of the second embodiment will now be described.

Figure 19:
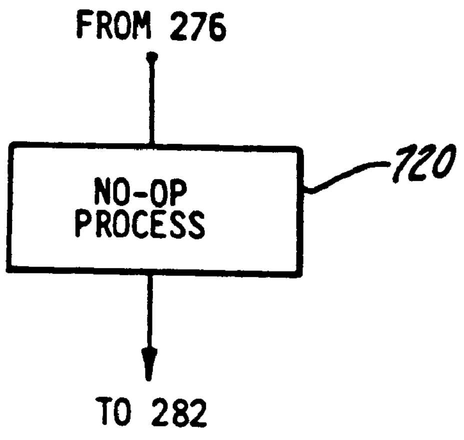

If the key which was inputted at the block 240 of FIG. 5 was a no-op key, the program will branch at block 276 of FIG. 6B to block 720 of FIG. 19.

The no-op function is used to mark an unused level in the key code memory and has the effect of programming a level to an inactive state. In normal operation, it would not be useful to produce a no-op key because it would have no function; however, it is useful for security purposes to program one or more levels to the no-op function. As previously discussed, all eight levels in the function table and the key memory must be assigned a particular function. Otherwise, the programming key is invalid. Therefore, when the lock is programmed and less than eight different active functions are desired, the remaining levels may be assigned the no-op function. In the event that unauthorized entry is attempted by a key which happens to be coded corresonding to the no-op function, the computer program responds by going to the error shut-down routine. When a no-op function is assigned to a selected level, that level in the key code memory 217 is loaded with all ones. This, in effect, takes the lock out of operation for that particular level. If a no-op key is inserted in the lock, the microcomputer would operate under program control as described with reference to the flow charts of FIGS. 5, 6, 6A and 6B. At block 276 of FIG. 6B, the program would branch to the subroutine for the no-op function. This is represented by the flow chart of FIG. 19. The program advances to block 720 which processes the level code for the no-op function and the program proceeds to the error shut-down routine at block 282. Thus, the system is placed in standby and is inactive until another key is inserted.

For security purposes, the lock may be programmed to provide the security A and security B functions, as mentioned above. As described with reference to the start-up procedure, the security A and B functions must be used together; if only one is provided in the programming key, the key is invalid and will be ineffective to install the program. If the security A and B functions are programmed into the lock, the security A and B keys may be used by authorized personnel to open the lock regardless of the state of the logical dead bolt and the physical dead bolt. The keys must be inserted in proper sequence. A first and then, within a predetermined time interval, B must be inserted. This will unlock the door and the lock will be left in a state with the logical dead bolt set. (However, the memory will have recorded the security B key as the last key to open the door.)

Figure 20:
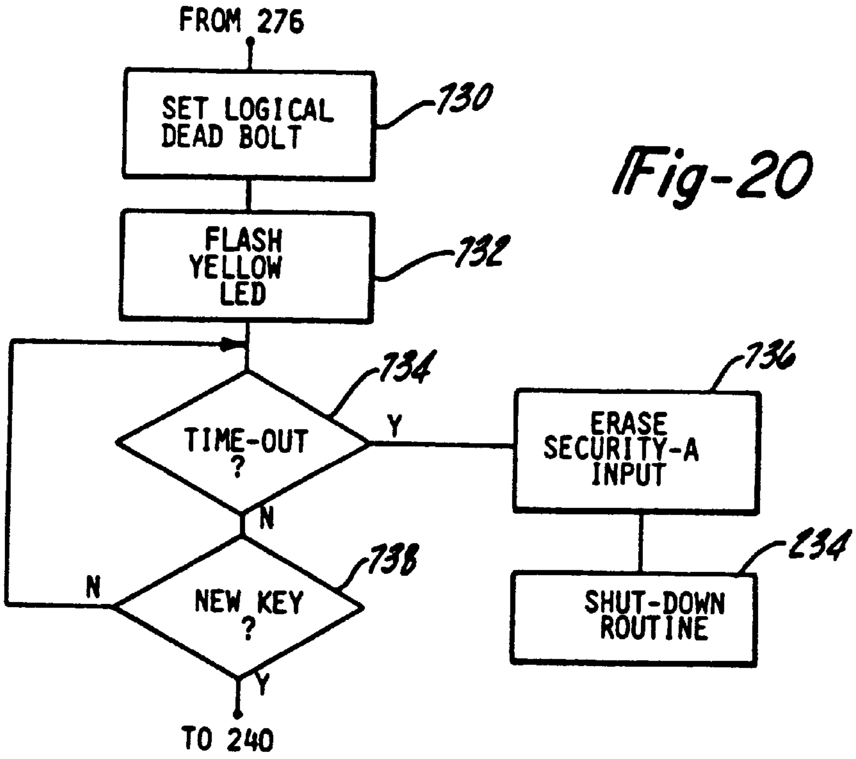
Figure 21:
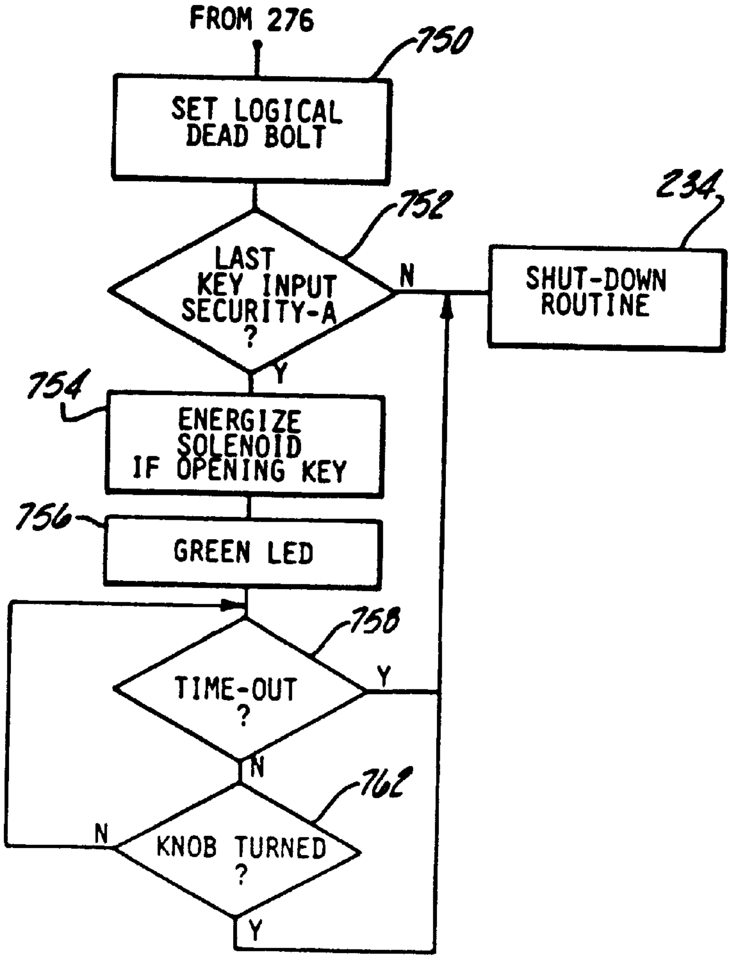

The operation of the lock with the security A and security B keys and the control program for these subroutines will be described with reference to the flow charts of FIGS. 20 and 21. If the key inputted at block 240 of FIG. 5 is a security A key, the program will branch at block 276 of FIG. 6B to block 730 of FIG. 20. FIG. 20 represents the program or subroutine for the security A key. Block 730 sets the logical dead bolt and the program advances to block 732 which flashes the yellow LED indicating acceptance of the key. The program then proceeds to the test block 734 which determines whether the five second timer has timed out. If it has, the program advances to block 736 which erases the security A input from the last-key used memory. Then, the program advances to the shut-down routine at block 234. If at test block 734 the timer has not timed out, the program advances to the test block 738 which determines whether a new key has been inserted. If not, the program loops back to block 734. If a new key has been inserted, the program returns to block 240 and processes the new key. When the new key is processed, the program will be executed according to the key-type subject, however, to the restriction that the logical dead bolt was set by the security A key. Thus, for example, if the new key is a maid key, it would not permit opening of the door because of the logical dead bolt being set. Further, the insertion of another key will have the effect of erasing the security A key record from the last-key used memory. If no new key is inserted before the timer times out as determined by block 734, the program will proceed to block 736 which erases the security A input as described above.

If a new key is inserted within the five second time interval, as determined by test block 738, and it is a Security B key the program will advance from block 240 of FIG. 5 to block 276 of FIG. 6B. Then, the program branches to the security B subroutine of FIG. 21. In this subroutine, the block 750 sets the logical dead bolt and the program advances to the test block 752. This test block determines whether the last key input was the security A key. If it was not, the program proceeds (after flashing the yellow LED) to the shut-down routine at block 234. If the last key was the security A key, the program advances to block 754 which energizes the solenoid if the security B key is an opening key. The program then advances to block 756 which turns on the green LED to give the opening indication. The program then proceeds to test block 758 which determines whether the timer is timed out. If it has, the program advances to the shut-down routine at block 234. If it has not, it advances to the test block 762 which determines whether the knob has been turned. If not, the program loops back to test block 758. If the knob has been turned, the program advances to the shut-down routine at block 234.

The third embodiment of the invention is shown in FIGS. 23 through 31. This third embodiment utilizes the magnetic key as in the second embodiment; it is characterized by a link code on the key, on-line programming of the lock, operation with a 40-bit or 64-bit code on the key card and additional operating functions and a pseudo time record of door openings.

As in the second embodiment, the lock is adapted for use of eight different key functions. However, more than eight different types of key functions are available even though only eight may be programmed in the lock at a time. In addition to the key functions described with reference to the second embodiment, the following additional types of keys may be programmed:

Key type K, office latch function: When office hardware is attached, this function will operate the solenoid and latching ports to assert the hardware as latched. The yellow LED is flashed during the latching sequence. If office hardware is not attached, this function assignment behaves as a miscellaneous function.

Key type L, office unlatch function: When office hardware is attached and the hardware is not indicating an already unlatched state, this function will operate the solenoid and latching ports to assert the hardware as unlatched. The green LED is flashed during the unlatching sequence. If the hardware is already unlatched, the green LED is flashed for a shortened period. If office hardware is not attached, this function assignment behaves as a miscellaneous function.

Key type M, office toggle function: When office hardware is attached, this function will operate as either the office latch function or the office unlatch function depending on the state of the hardware limit sensors. If office hardware is not attached, this function assignment behaves as a miscellaneous function.

Key type N, security C: This function ignores the logical dead bolt but not the physical dead bolt. An additional software switch is available to have this function to both assert the logical dead bolt and bypass the physical dead bolt. This is a single key card sequence as distinguished from the security A and security B functions described above.

Key type O, low lock toggle: This function locks out all levels lower than the level of this function. When this function is executed, other levels numerically lower in the function assignment table are inhibited. The red LED is used to indicate when the inhibiting state is set and thus preempts the low battery indication.

Key type P, high lock toggle: This function locks out all levels higher than the level of this function. When this function is executed, other levels numerically higher in the function assignment table are inhibited. The red LED is used to indicate when the inhibiting state is set and thus preempts the low battery indication.

Key type Q, redefinition (programming) key: This key has a 4-bit run mode character in place of the hotel code character. The redefinition key is used for on-line programming of the lock.

Key type R, assignment key: This key is used for reassigning the hotel code and the run mode.

As will be described in detail below, function assignments are changeable with the lock in service in an operative state, i.e. by on-line programming. This is done with the redefinition key card. Unless the key card meets certain qualification tests, no change is made in the function assignments. It does not permit changing of the emergency level assignment or the open bit assignment.

Figure 23:
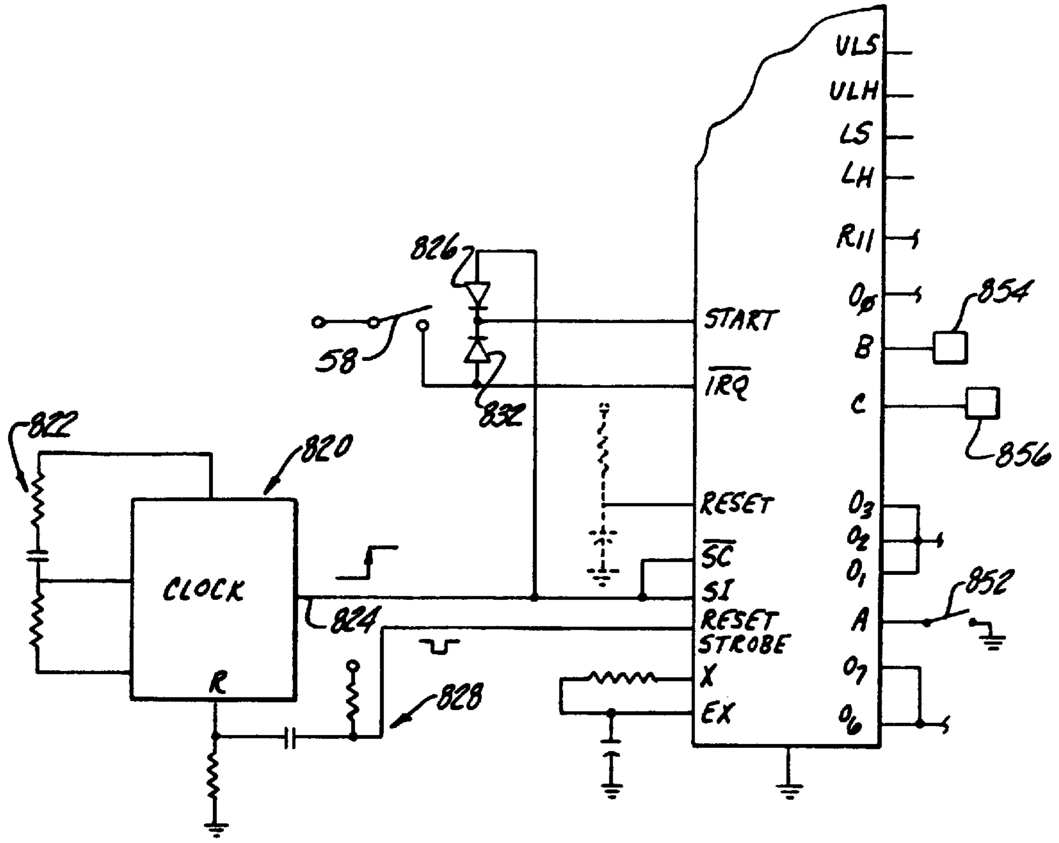
FIG. 23 shows the microcomputer and electronic circuit in a third embodiment of the invention.

In addition to the above features, the third embodiment provides a time base feature for the door opening history, i.e. a pseudo time record of door openings. Additional hardware is provided so that the lock opening chronology can be traced back for a period of several days. The circuitry required to provide this time base is shown in FIG. 23. The microcomputer lock control circuit in the third embodiment, is essentially the same as that described above with reference to FIG. 3A with the changes described below with reference to FIG. 23.

As shown in FIG. 23, an external clock is coupled with the microcomputer 112. The clock 820 comprises an oscillator with an external frequency determining circuit 822 and it also comprises a ripple counter to perform a binary divider function. The clock 820 produces a positive going pulse on an output 824 at the rate of one pulse per minute. This output 824 is coupled directly with the SI input pin and the $\overline{SC}$ input pin of the microcomputer 112. The output 824 is also coupled through a steering diode 826 with the start input pin of the microcomputer. The reset strobe output pin of the microcomputer is coupled through the resistive-capacitive network 828 to the reset input of the clock 820. The start switch 58 is coupled directly with the $\overline{IRQ}$ input pin and it is coupled through a steering diode 832 with the start input pin of the microcomputer.

In general, the real time clock 820 is utilized with the microcomputer 112 to provide a time base for the record of lock openings in the history buffer. For this purpose, a time signal is recorded at timed intervals, approximately every four minutes. When a clock pulse is generated at the output 824 of the clock 820, it is applied to the start input pin through the diode 826 and the microcomputer is switched from the standby state to the on or run state. The clock pulse is also applied to the SI and the $\overline{SC}$ input pins. The $\overline{SC}$ input causes the serial buffer flag to be set upon receipt of every fourth pulse, as will be described subsequently. The SI input causes the microcomputer to send a reset pulse from the reset strobe output pin to the reset input of the clock 820. This reset pulse effectively clears the clock counter so that it starts counting again for the next one minute output clock pulse. At the same time, the clock output 824 goes low and the microcomputer 112 is switched to the standby state. A start signal for the microcomputer which is generated by the insertion of a key is given precedence over a start signal generated by the clock 820. For this purpose, the logic high signal resulting from closure of the key switch 58 is applied to the start input pin through the diode 832 and simultaneously it is applied to the $\overline{IRQ}$ pin as an interrupt request signal which gives the key switch priority over the clock signal. As a result, if a key is inserted during the interval of a clock pulse, the key will be processed in the usual manner; during the processing of the key data, the clock pulse will be held and the clock will not be reset until after completion of processing of the key data. After the reset pulse, the microcomputer will be returned to the standby state.

In order to implement the office lock functions of the third embodiment, the microcomputer 112 is provided with additional pin connections as follows. Pin A is tied low through a switch 852 to signify that it is used in conjunction with the office lock. A latch detector 854 which goes high when the lock is in the latched condition is coupled with input pin B. An unlatch detector 856 is coupled with input pin C and goes high when the lock is in the unlatched condition. Additionally, four output pins are provided for controlling the energization of the actuators of the office lock bolt. These output pins are the unlatch strobe pin ULS, the unlatch hold pin ULH, the latch strobe pin LS and the latch hold pin LH. These outputs are used in conjunction with output pins 04 and 05 which, as previously described, function as the locking/unlocking output and control the energization of the solenoid 66 in both a pull-in mode and a hold-in mode. When the ULS pin goes true, the ULH pin goes true at the same time to for initial actuation; the unlatch strobe signal at pin ULS is of short duration and after it goes false, the unlatch hold signal at pin ULH remains true for a predetermined time interval to allow the unlatched state to be achieved. Similarly, when the LS pin goes true, the LH pin also goes true at the same time. The latch strobe signal is a pulse of short duration and after it goes false, the latch hold signal at pin LH remains true for a predetermined time interval to allow the latched state to be achieved. The office lock with latch and unlatch operating conditions may take a variety of forms. For example, the lock of the type described with reference to FIGS. 2A and 2B may be used with a lock pin (such as lock pin 64) together with an unlatch pin for holding the lock pin in the unlatched condition, i.e. unlocked condition, and a latch pin for holding the lock pin in a latched condition. The unlatch pin is actuated to disengage the lock pin by an unlatch solenoid and it is actuated to engage the lock pin by a return spring. Similarly, the lock is provided with a latch pin which is actuated to disengage the lock pin by a latch solenoid and it is actuated to engage the lock pin by a return spring. Such an arrangement permits the lock pin to be retained in either the extended (locked) or retracted (unlocked) positions, i.e. locked or unlocked states, without energization of solenoids or other actuators. Thus, the actuators do not impose any current drain on the battery except when the lock is actuated to chance its state between locked and unlocked conditions. It will be appreciated that other mechanisms providing the latched and unlatched conditions may be utilized such as a motor driven lead screw actuated lock pin which is inherently held in either the latched or unlatched position without energization of an actuator. Thus, the pins 04 and 05 as well as the pins ULS, ULH, LS and LH will be utilized in accordance with the particular mechanisms for latching and unlatching the office lock.

Figure 24:
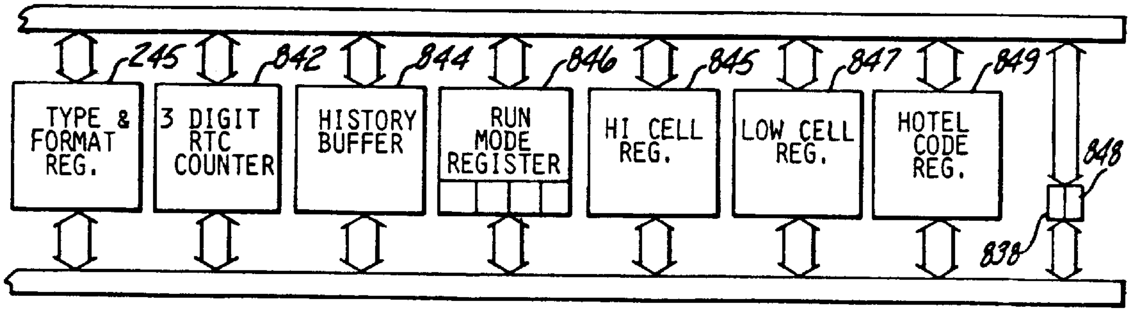
FIG.24 shows a portion of the random access memory of the third embodiment.

Further, in order to implement the features of the third embodiment, the RAM of the microcomputer 112 is provided with additional registers as shown in FIG. 24. For use in connection with the time base provided by the clock 820, the RAM includes a serial buffer flag 838, a three digit counter 842 and a history buffer 844. Also, the RAM includes a high cell register 845, a low cell register 847, a hotel code register 849 and a redefine flag 848. The use of these registers and flags will be described in detail subsequently. The RAM also includes a run mode register 846 which holds the four bit character initially assigned by the redefinition key when it is used for function assignment, as discussed above. The four bits of the run mode register are as follows. Bit zero determines the action of the low battery function. When the bit is set low, the maid key functions as described above, i.e. after four key insertions with a low battery condition, the key must be inserted twice in succession to open the door. When the zero bit is at high, the key will not open the door until the battery condition is corrected. Bit zero is called the "lock out" bit. Bit one of the run mode character determines the security limit of the security C function and the acknowledgment of fully read key cards containing improper data. Bit one is referred to as the "C bolt" bit. When the bit is low, improper key data is acknowledged with a single strobe of the yellow LED unless the previous number of improper key insertions has placed the lock in the protection mode, described above, where full cycle times are asserted and immediate reinsertion of the key is ineffective. Also, when this bit is low a lower level of security is provided in the security C function in that the logical dead bolt is ignored while the physical dead bolt is obeyed. When bit one is high, a higher level of security is provided in that improper keys provide no feedback to the operator, i.e. there is no LED signal and further, the security C function behaves like the emergency key except that the door opening does not clear the logical dead bolt. Bit two of the run mode character, designated "code 64" bit, determines the data format of binary keys but does not alter the punch card data format. When this bit is low, key data is interpreted in the manner established for the 40-bit code as described with reference to the second embodiment. When this bit is high, the 64-bit format of the third embodiment is enabled. Bit three of the run mode character determines the extent and the distribution of the lock entry history. It is designated the "do RTC" bit. When this bit is low, the lock allocates memory for the recognition code, repeat-entry counter and duplicate identification number associated with each of the last fifteen entries. When this bit is high, the entire history is reduces from fifteen to eight and all of the entries have a three character counter reading associated with the time of the last entry of the associated key.

The features and operation of the third embodiment will now be described with reference to the flow charts of FIGS. 25 through 31. The start-up procedure for the third embodiment is the same as that for the second embodiment as described with reference to the flow chart of FIG. 17A and 17B. After the start-up procedure, the lock is in readiness for use and may be operated by any of the keys which have been phased into the lock. In response to the insertion of any key into the lock, the microcomputer controls the lock in accordance with the code read from the key. The program control for all of the keys which have been phased-in is represented by the flow charts of FIGS. 5, 6A and 6B as described with reference to the second embodiment and with the exceptions noted below. The program represented by the flow chart of FIG. 5 is modified so that the block 252 inputs and stores sixteen characters upon withdrawal of the key when bit two (code 64-bit) of the run mode character is high. This enables the 64-bit format. If the code 64-bit is low, the 40-bit format is enabled and the program of FIG. 5 remains unchanged. The program represented by the flow charts of FIGS. 6A and 6B, in this third embodiment, are modified as described below.

In order to permit a new key to perform its function in the event that the primary code does not match the key code of the previous key, means are provided to validate the key by another code in memory. In the second embodiment, as in the first embodiment described with reference to FIGS. 6A and 6B, a new key such as a guest key bears a primary code and a secondary code. The secondary code is the new key code for that particular key and which after the first use must be stored in the key code memory of the lock to enable the key to be effective in opening the lock. The primary code on the key is the key code which was assigned to the previously issued key, i.e. the previous guest. In the second embodiment, as described with reference to FIGS. 6A and 6B, a new key being used for the first time will open the lock if the primary code matches the code previously stored in the key code memory by the previous key. However, if the guest key, for example, issued to the previous guest for a given room did not ever insert the key in the lock, the key code stored in the key code memory would remain the same as that which was written by insertion of the last key which was used in the lock. Thus, it is possible in the second embodiment, that a newly issued key would be inoperative since neither the primary code nor the secondary code would match the code stored in key code memory. The likelihood of this is minimized by the provision of a suitable link code on each newly issued key in addition to the primary code.

The link code is the key code of a key issued previous to the key from which the primary code is taken. Preferably, the link code is that of the next to last issued key. This link code feature is available only when the code 64-bit of the run mode character is high, signifying that the 64-bit format is enabled. The operation of the lock with the link code feature will now be described with reference to FIGS. 25A and 25B.

Figure 25A:
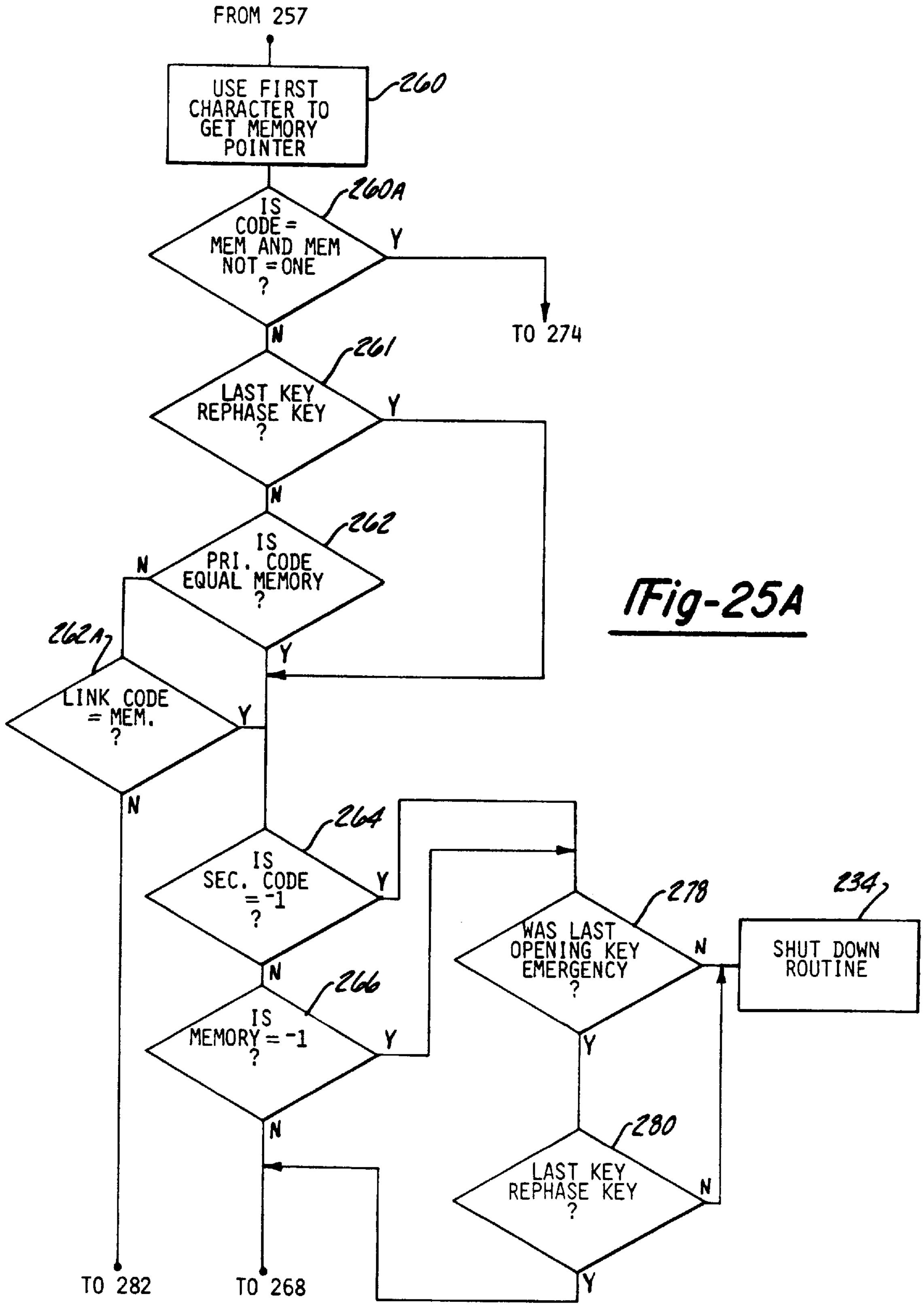
FIGS. 25A and 25B show a flow chart representing a link code program for validating a new key.
Figure 25B:
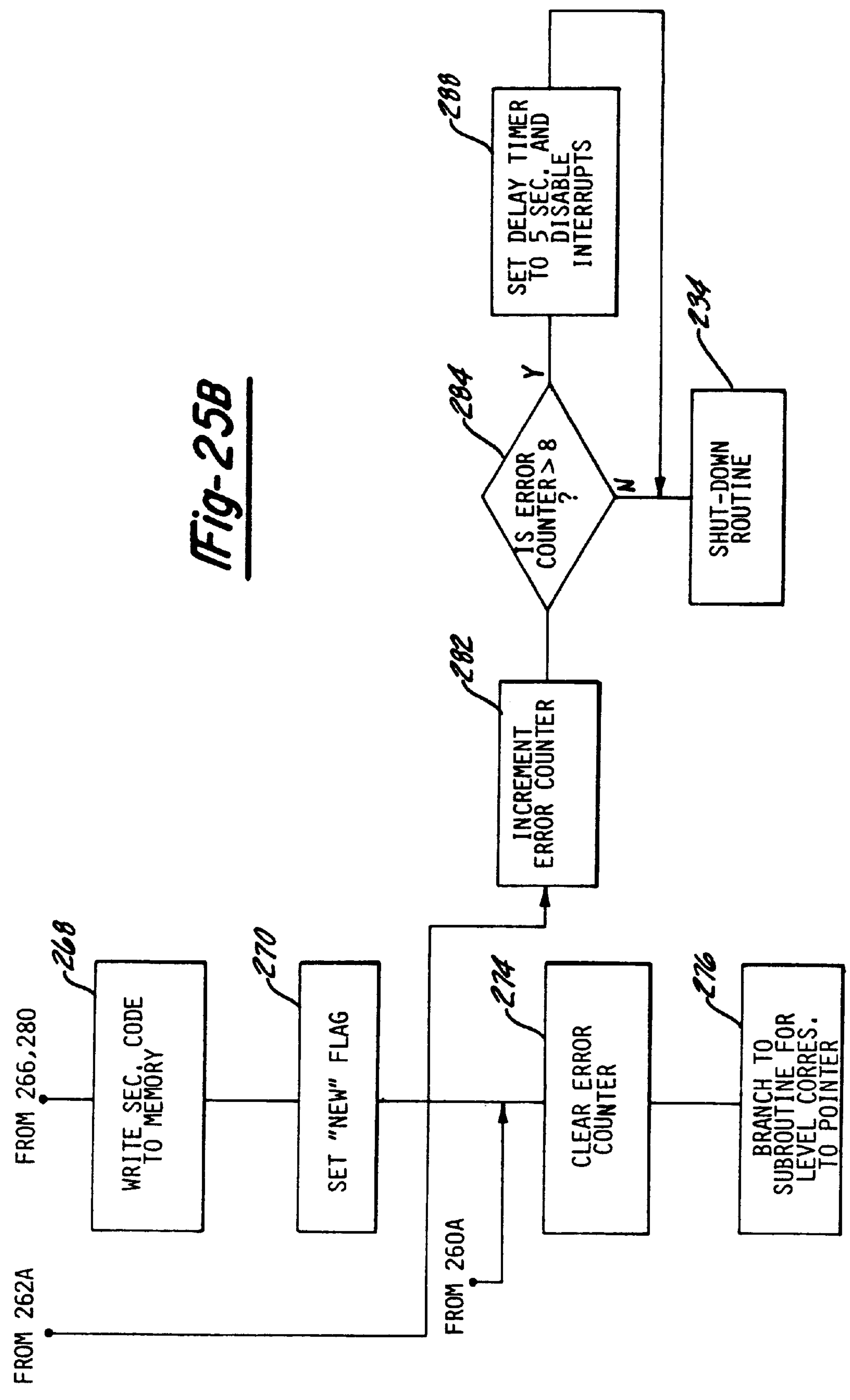

The program represented by the flow chart of FIGS. 25A and 25B is similar to that represented by the flow chart of FIGS. 6A and 6B; it differs, however, in that it provides for the utilization of a link code on the key. This program of FIGS. 25A and 25B is used in the operation of the lock by the different keys which have been phased-in at the different levels of key code memory. As described with reference to FIG. 5, upon obtaining a valid reading of the key data, the program advances from block 257 of FIG. 5 to block 260 of FIG. 25A. (Where a program block in FIGS. 25A and 25B is the same as a program step in FIGS. 6A and 6B the same reference character is used.) The program step of block 260 uses the first character, which represents the level code, with the table 219 in memory to get a pointer or address for the location of the stored key code in the key code memory 217. Then, a test block 260A determines whether the secondary code of the key matches the code stored in the key code memory and that the latter code is not equal to one. If it is, the program advances to block 274 which clears the error counter and then the program advances to block 276. At this point, the program branches to the subroutine for the level corresponding to the pointer. If at test block 260A the answer is no, the program advances to test block 261 which determines whether the last key was the rephase key. If so, the program advances to test block 264; if not, the program advances to test block 262 which determines whether the primary code of the key matches the code stored in the key code memory. If the answer is yes, the program advances to test block 264. If the answer is no, the program advances to test block 262A which determines whether the link code of the key matches the key code stored in the key code memory. If it does not, the program advances to test block 282 which increments the error counter 239. Then, the test block 284 determines whether the error count is greater than eight. If it is not, the program advances to the shut-down routine 234 the s causes the system to go into standby condition and wait for the next key. If the error count is greater than eight, block 288 sets a delay timer in the status control 223 for five seconds to prevent the reading of data from a key by block 252 of FIG. 5 until five seconds have elapsed.

If at test block 262A it is determined that the link code of the key is equal to the code stored in the key code memory, the program advances to test block 264. From this point, the program as represented by blocks 264, 266, 278, 280, 234, 268, 270, 274 and 276 is the same as that previously described with reference to FIGS. 6A and 6B. The program may be summarized in respect to the link code feature as follows. If the secondary code of the key matches the key code memory and is not all ones, the program advances to the subroutine for the level corresponding to that key. If not, but the primary code of the key matches the key code memory, the secondary code will be written into key code memory, the "new" flag is set and the program proceeds to the subroutine for the level of that key. If the primary code does not match memory but the link code does match memory, the same results are obtained as when the primary code matches memory. If none of the codes of the key match memory, the error counter is incremented and the lock goes into the shut-down routine.

Figure 11:
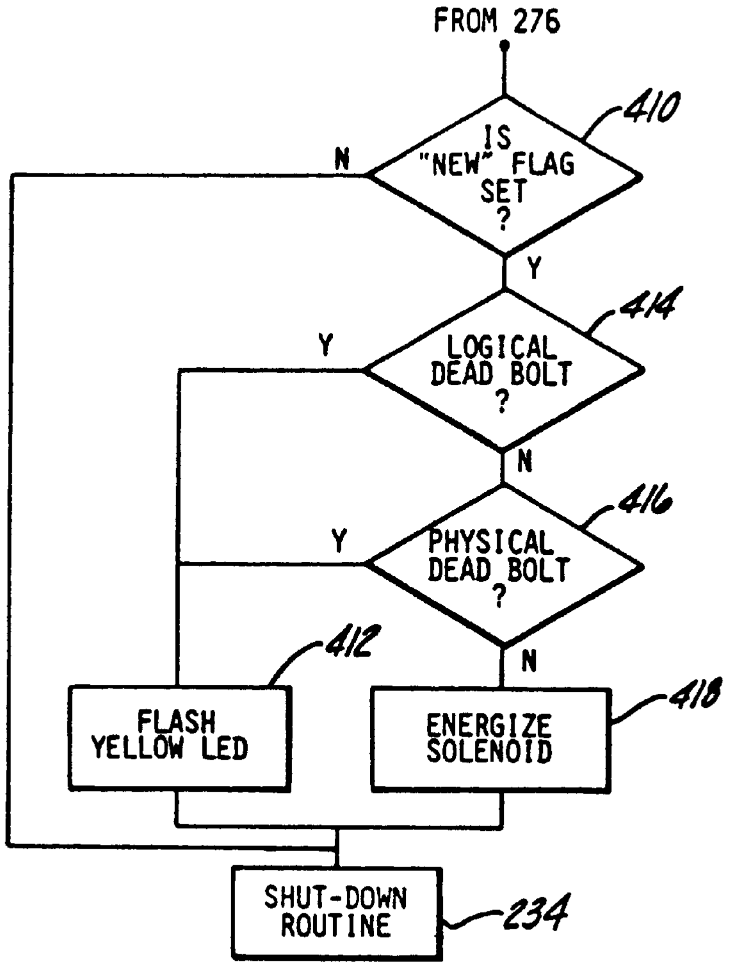

When the program reaches the block 276 in FIG. 25B, it branches to the subroutine for that level corresponding to the pointer obtained by block 260. In this third embodiment, the same key functions may be used as those described in the second embodiment. For the key functions described with reference to the second embodiment, the subroutines remain the same for this third embodiment except as follows: The subroutine of FIG. 9 is changed by deleting blocks 370, 374, 376, 372 and 234 and substituting at that point the subroutine of FIG. 29. The subroutine of FIG. 10 is changed by deleting blocks 392, 396, 398 and 234 and substituting the subroutine of FIG. 29. The subroutine of FIG. 11 is changed by deleting the blocks 414, 416, 412, 418 and 234 and substituting the subroutine of FIG. 29. The subroutine of FIG. 18 is changed by deleting block 708 and 234 and substituting the subroutine of FIG. 29.

This third embodiment also includes additional key functions or types which are referred to herein as the office toggle, office unlatch, office latch, security C, low lock toggle and high lock toggle as described above. It also includes a different subroutine for the miscellaneous key function. These additional key functions and corresponding program subroutines for effecting the lock operation will now be described.

The office key functions are provided for operation of a lock of the type commonly used on office doors. Such locks have a bolt which is either latched or unlatched, i.e. the bolt is held in the extended position or in the retracted position for the lock and unlock conditions, respectively. To provide the capability for the office functions, the microcomputer 112 has a pin A which is tied true through a switch 852 to signify that it is used in conjunction with an office lock. Additionally, it has an input pin B which is coupled with a latch detector 854 which goes true when the lock is in the latched condition. It is also has a pin C coupled with an unlatch detector 856 which goes true when the lock is in the unlatched condition. In the office lock, the latch key is operative to energize the solenoid and the latching ports to place the bolt in the latched condition. The unlatch key is operative, when the lock is not already in the unlatched condition to energize the solenoid and the latching ports to place the lock in the unlatched condition. The toggle key is operative to unlatch the lock if it is latched and to latch it if it is unlatched.

Figure 26A:
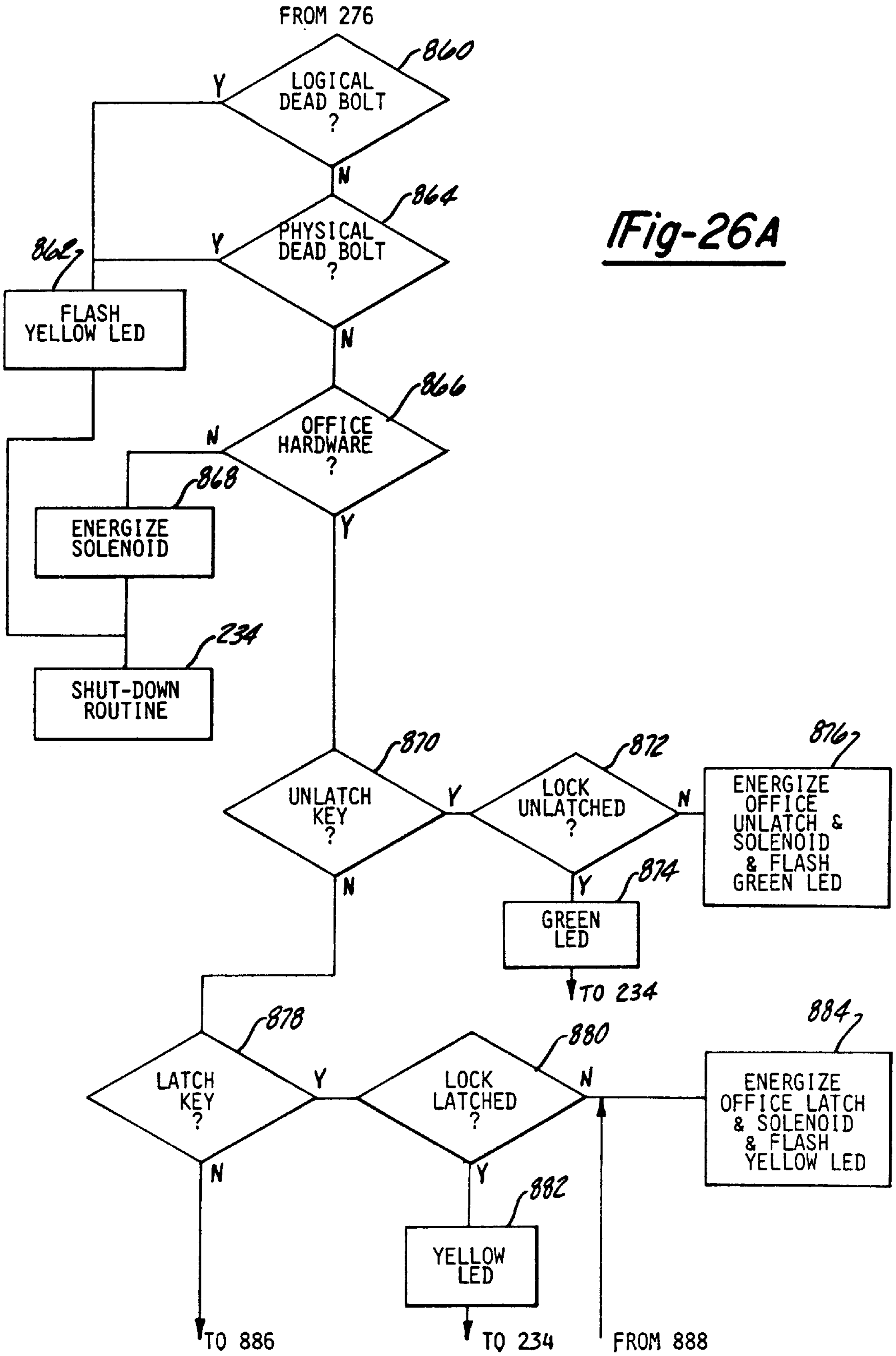
FIGS. 26A, 26B, 27, 28A, 28B and 29 show flow charts representing control programs for key functions in a third embodiment of the invention.
Figure 26B:
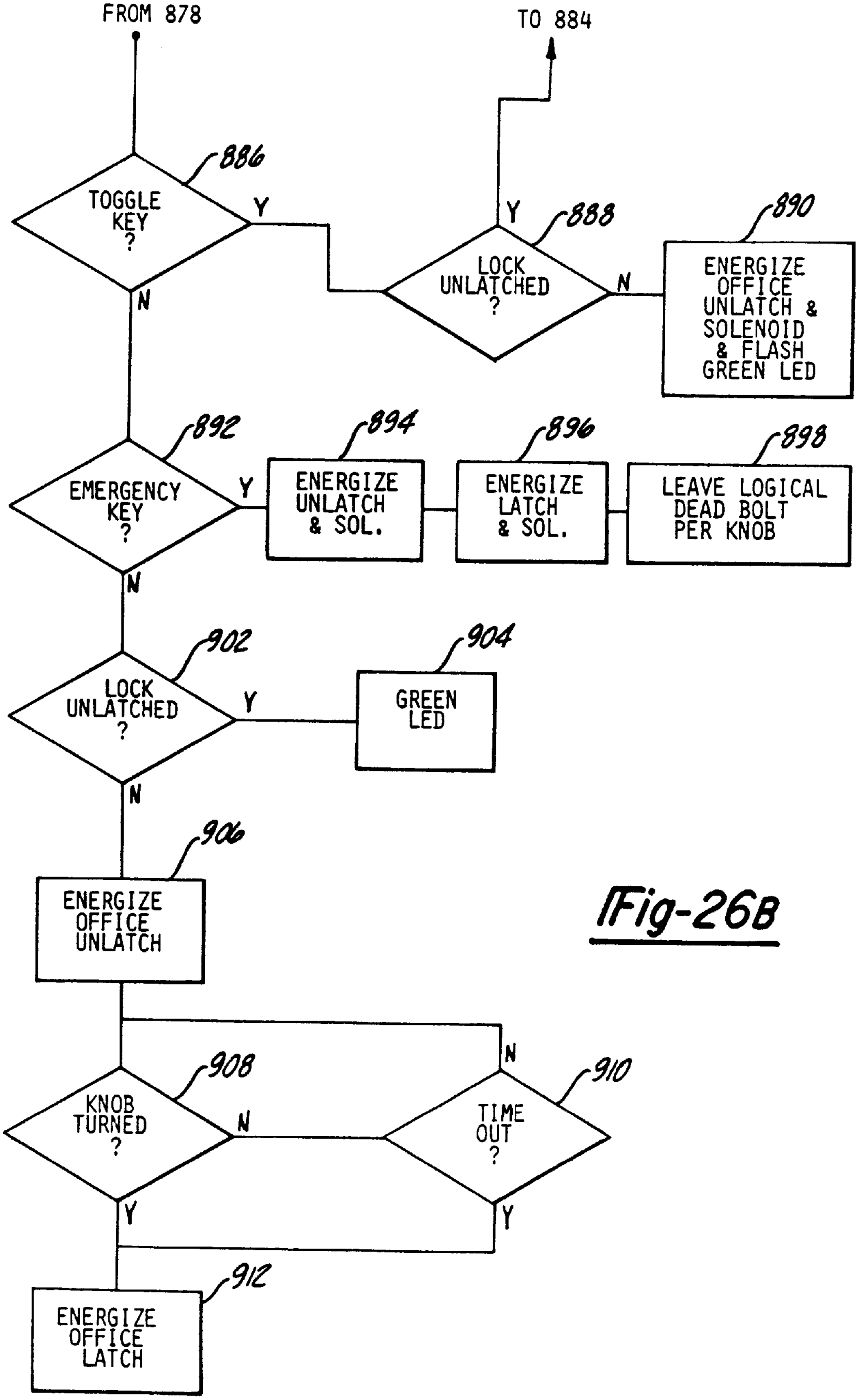

The program for the office functions is represented by the flow chart of FIGS. 26A and 26B. If the key which was inputted at the block 240 of FIG. 5 was a latch key, unlatch key or toggle key, the program will branch at block 276 of FIG. 25B to block 860 of FIG. 26A. The test block 860 determines whether the logical dead bolt is set. If it is, the program advances to block 862 which flashes the yellow LED and the program goes to the shut-down routine 234. If the logical dead bolt is not set, the program advances to the test block 864 which determines whether the physical dead bolt is set. If it is, the yellow LED is flashed but block 862 in the program goes to the shut-down routine 234. If the physical dead bolt is not set, the program advances to test block 866 which determines whether the lock is an office lock, i.e. whether the office hardware pin A is at logic low. If it is not, the solenoid is energized at block 868 and the program advances to the shut-down routine 234. If the lock is an office lock, the program advances to test block 870 which determines whether the key is an unlatch key. If it is, test block 872 determines whether the lock is unlatched. If it is, block 874 flashes the green LED. If it is not, the program advances to block 876 which sets the unlatch pins true to energize the unlatch actuator to the unlatch condition.

If test block 870 determines that the key is not the unlatch key, the test block 878 determines whether the key is the latch key. If it is, test block 880 determines whether the lock is in the latched condition. If it is, block 882 flashes the yellow LED. If it is not, the block 884 sets the latch pins true to energize the latch actuator to the latched condition.

If the test block 878 determines that the key is not the latch key, the program advances to the test block 886 which determines whether the key is the toggle key. If it is, test block 888 determines whether the lock is unlatched. If it is, the program advances to block 884 which energizes the solenoid to the latched condition. If it is not unlatched, i.e. if it is latched, the program advances to block 890 which sets the latch pins true to energize the unlatch actuator to the unlatched condition.

If the test block 886 determines that the key is not the toggle key, the program advances to the test block 892 which determines whether it is the emergency key. If it is, block 894 energizes the solenoid to the unlatched condition and the program advances to block 896. Block 896 energizes the solenoid to the latched condition. Then, block 898 leaves the logical dead bolt thrown if the knob is not turned and leaves it unthrown if the knob is turned.

If test block 892 determines that the key is not the emergency key, the program advances to the test block 902 which determines whether the lock is unlatched. If it is, block 904 flashes the green LED. If it is not, block 906 energizes the office unlatch. Then, the program advances to the test block 908 which determines whether the knob is turned. If not, test block 910 determines whether the five second timer has timed out. If not, the program loops back to test block 908. If the timer has timed out, the program advances to block 912 which energizes the office latch.

For security purposes, the lock may be programmed to provide the security C function, as mentioned above. In the second embodiment, the security A and security B functions were provided as previously described. The security A and B keys may be used by authorized personnel to open the lock regardless of the state of the logical dead bolt and the physical dead bolt. The keys must be inserted in the proper sequence and within a predetermined time interval between insertions, as described above. This will unlock the door and the lock will be left in a state with the logical dead bolt set.

In this third embodiment, the security C function is provided to allow a lower level of security than that of security A and B and permit operation with a single key. The security C function has the capability of ignoring the logical dead bolt but not the physical dead bolt in its low security mode. Further, by means of setting the C bolt bit of the run mode character, the security C function is operative to assert the logical dead bolt and bypass the physical dead bolt.

Figure 27:
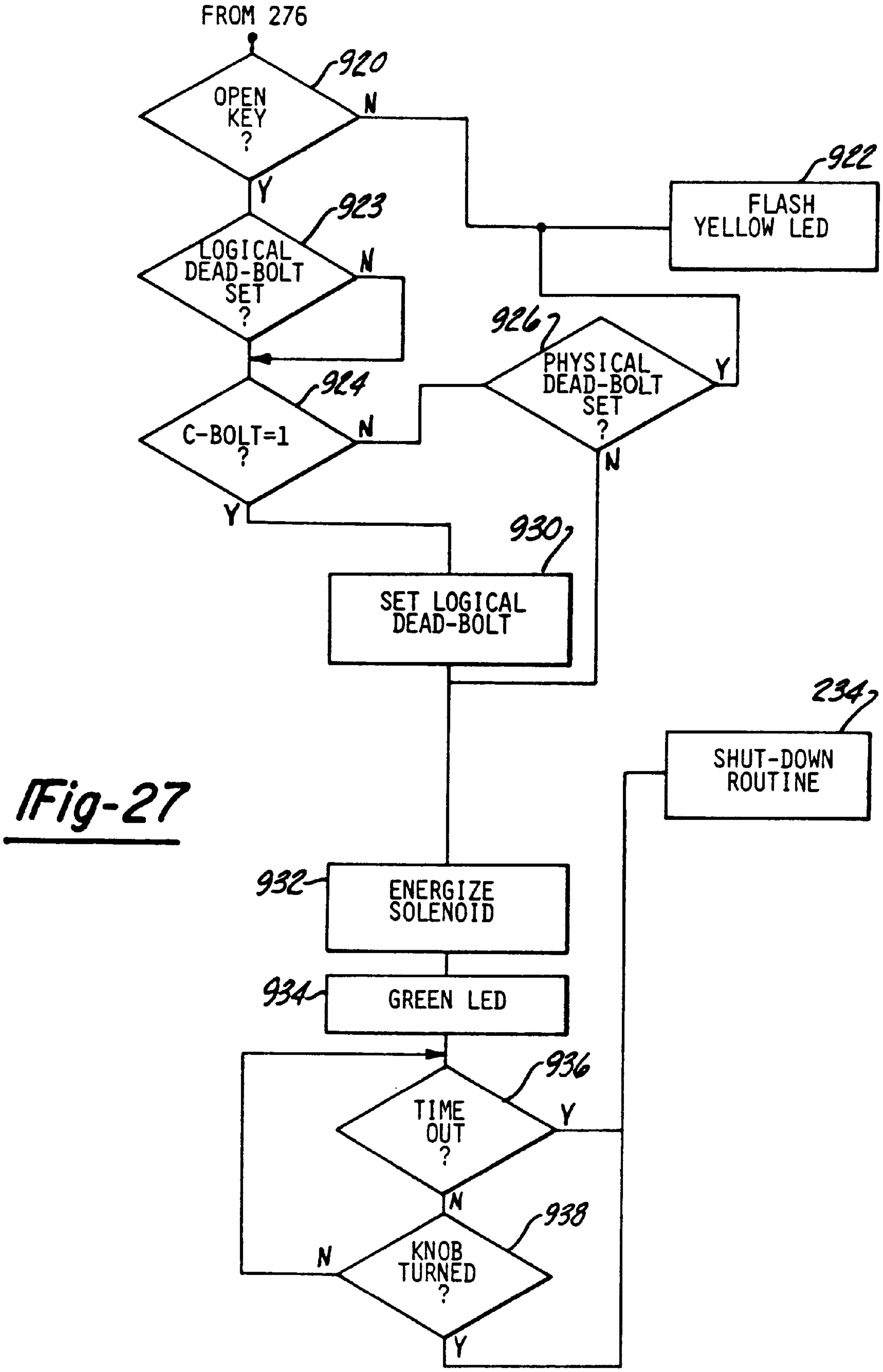

The operation of the lock with the security C key and the control program for this subroutine will be described with reference to the flow chart of FIG. 27. If the key inputted at block 240 of FIG. 5 is a security C key, the program will branch at block 276 of FIG. 25B to the test block 920 of FIG. 27. Test block 920 determines whether the key is an opening key. If it is not, block 922 flashes the yellow LED. If it is, the program advances to test block 923 to see if the logical dead bolt is set and regardless of the answer the program advances to test block 924 which determines whether the C bolt bit in the run mode character is at logic high. If it is not, the test block 926 determines whether the physical dead bolt is set. If it is, block 922 flashes the yellow LED. If the physical dead bolt is not set, the program advances to a test block 928. If test block 924 determines that the C bolt bit is at logic high, the program would bypass the physical dead bolt test block 926 and advance to the test block 932 only after setting the logical dead bolt at block 930. Then, block 934 flashes the green LED. The program then advances to the test block 936 to determine whether the five second timer has timed out. If it has, the program proceeds to the shut-down routine block 234. If not, test block 938 determines whether the knob is turned. If not, the program loops back to test block 936. If it is, the program advances to the shut-down routine at block 234.

For administrative or security purposes, the lock may be programmed to provide the high lock or the low lock functions. For example, the hotel authority may desire to render certain key functions inoperable on a temporary basis. For this purpose, a high lock key and subroutine are provided to temporarily lock out or render inoperable all key functions (except security functions) at a higher level than the level of the high lock key. Similarly, a low lock key and subroutine are provided to lock out keys (except security) at a lower level than that of the low lock key. After either key has been used to achieve the lock out function, the lock out function is cancelled by reinsertion of the key and thus operability of all levels is restored.

Figure 28A:
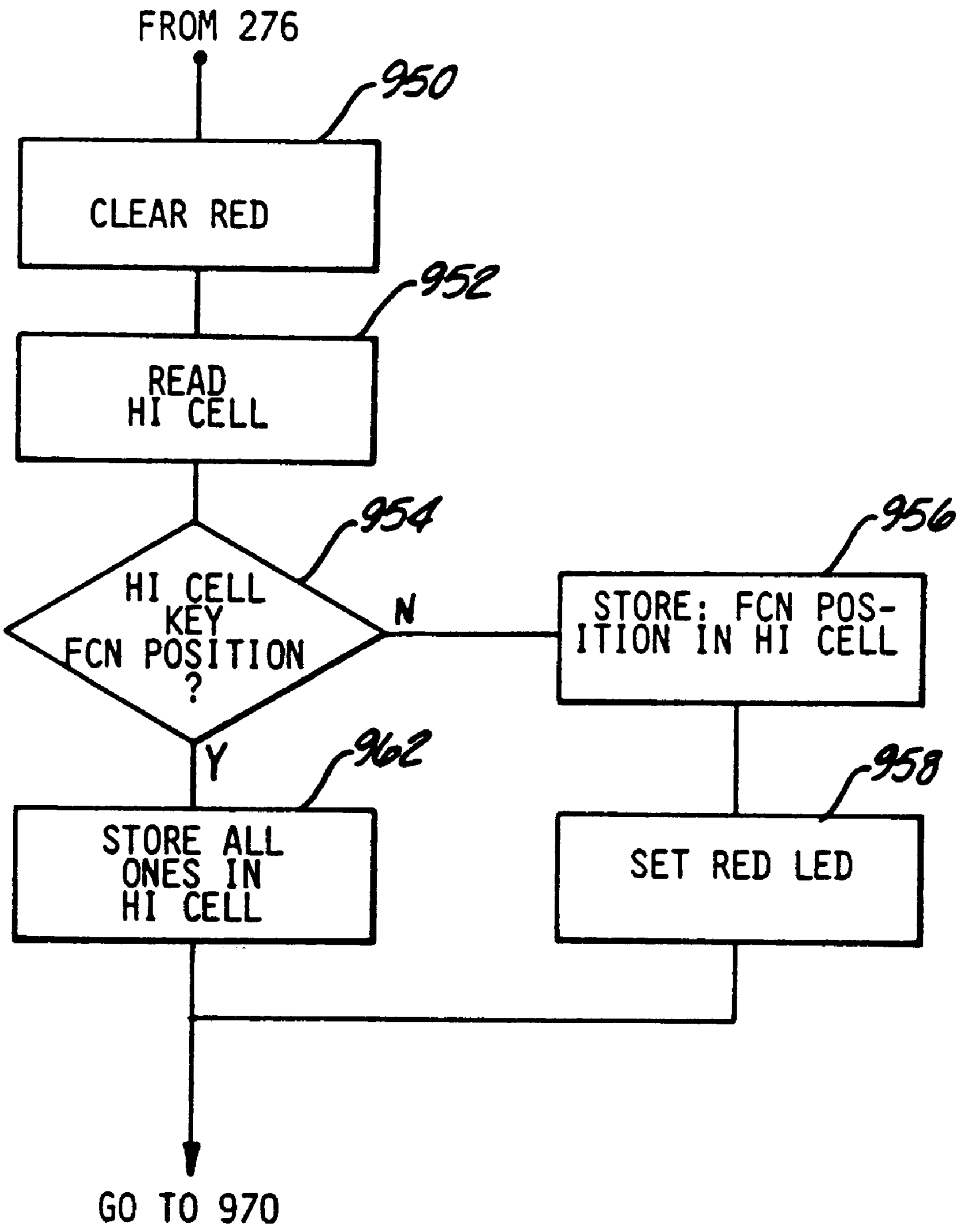

The operation of the lock with the high lock and low lock keys and the control program for these subroutines will be described with reference to the flow charts of FIGS. 28A, 28B and 28C. If the key inputted at block 240 of FIG. 5 is a high lock key, the program will branch at block 276 of FIG. 25B to block 950 of FIG. 28A. Block 950 clears the red LED so that it is available for signifying a lock-out condition (during lock-out, the red LED is not available for low battery indication). The program advances to block 952 which reads the level number stored in the high cell register in RAM. Then, the test block 954 determines whether the level number stored in the high cell register 845 is equal to the key function position, i.e. the level number of the high lock key in the register 219. If it is not, the block 956 stores the function position of the key in the high cell register. Then, block 958 sets the red LED and the program advances to test block 970. If test block 954 determines that the level number in the high cell register is equal to the key function position, this indicates that the high lock key is being reinserted for cancelling the high lock function. Block 962 then stores all ones in the high cell register. This assures that the level number in the high cell will be greater than any key level number and hence, none of the key levels are locked out. Then the program advances to block 970 of the miscellaneous subroutine of FIG. 29 which will be described presently. In brief, the miscellaneous subroutine tests whether the current level is inhibited by a high lock or low lock. If it is, the program goes to the shut-down routine; if not, the solenoid is energized.

Figure 28B:
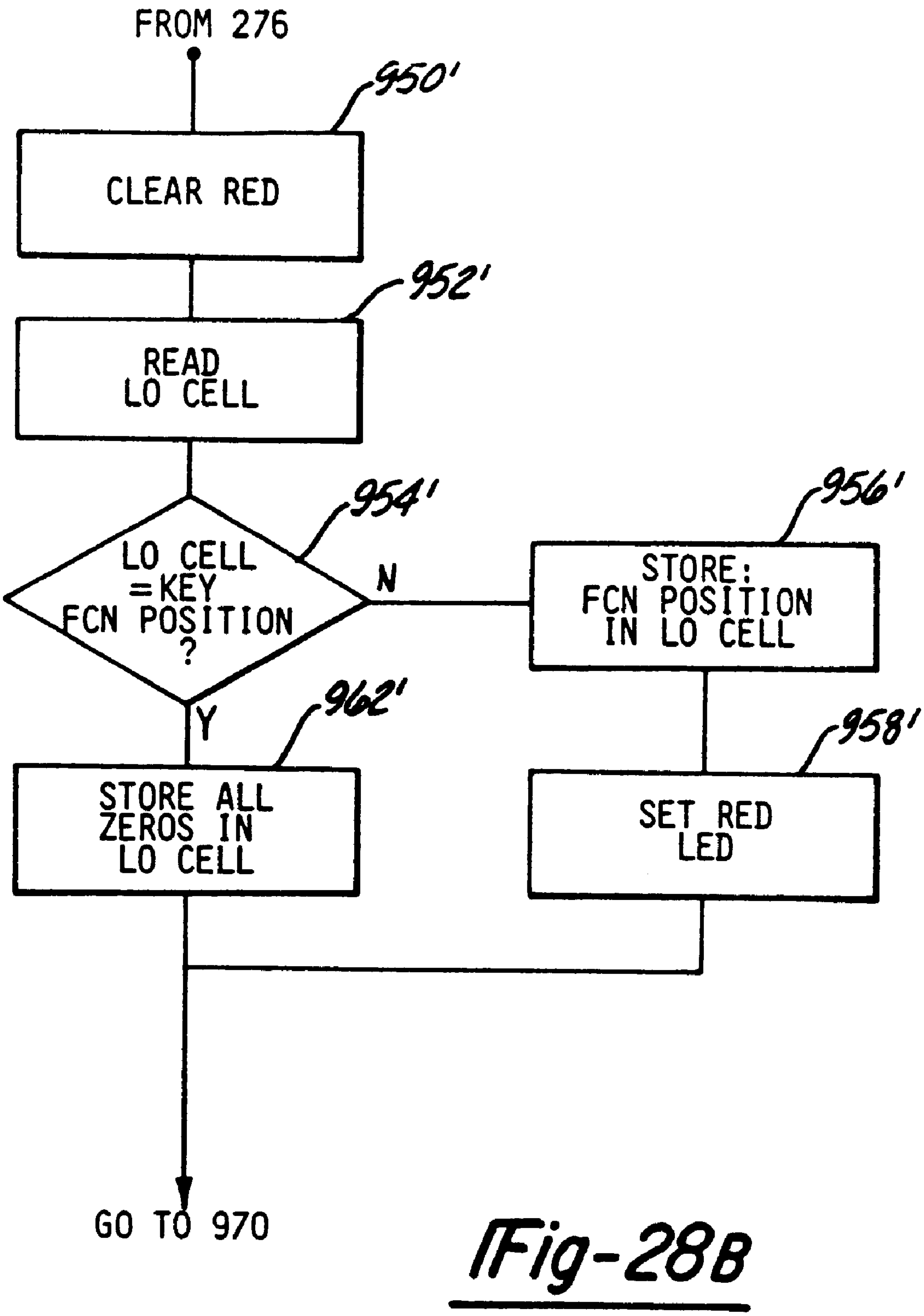

The subroutine for the low lock key is represented by the flow chart of FIG. 28B. It is the same as that for the high lock key with exceptions noted below and, for the sake of brevity, the entire description will not be repeated. It is noted that the same reference characters are used in FIG. 28B as in 28A for corresponding blocks, except that a prime symbol is added to each reference character in FIG. 28B. The difference is in the low lock subroutine from the high lock subroutine are as follows. Block 952' reads the level number stored in the low cell register in RAM. Then, test block 954' determines whether the level number stored in the low cell register 847 is equal to that of the key function position, i.e. the level number of the low lock key in the register 217. If it is not, block 956' stores the function position of the key in the low cell register. Then, block 958' sets the red LED and the program advances to test block 960'. If test block 954' determines that the level number in the low cell register is equal to the key function position, this indicates that the low lock key is being reinserted for cancelling the low lock function. Block 962' then stores all zeros in the low cell register. This assures that the level number in the low cell will be smaller than any key level number and hence, none of the key levels are locked out. From this point, the program advances to block 970 and is identical to that of FIG. 28A.

Figure 29:
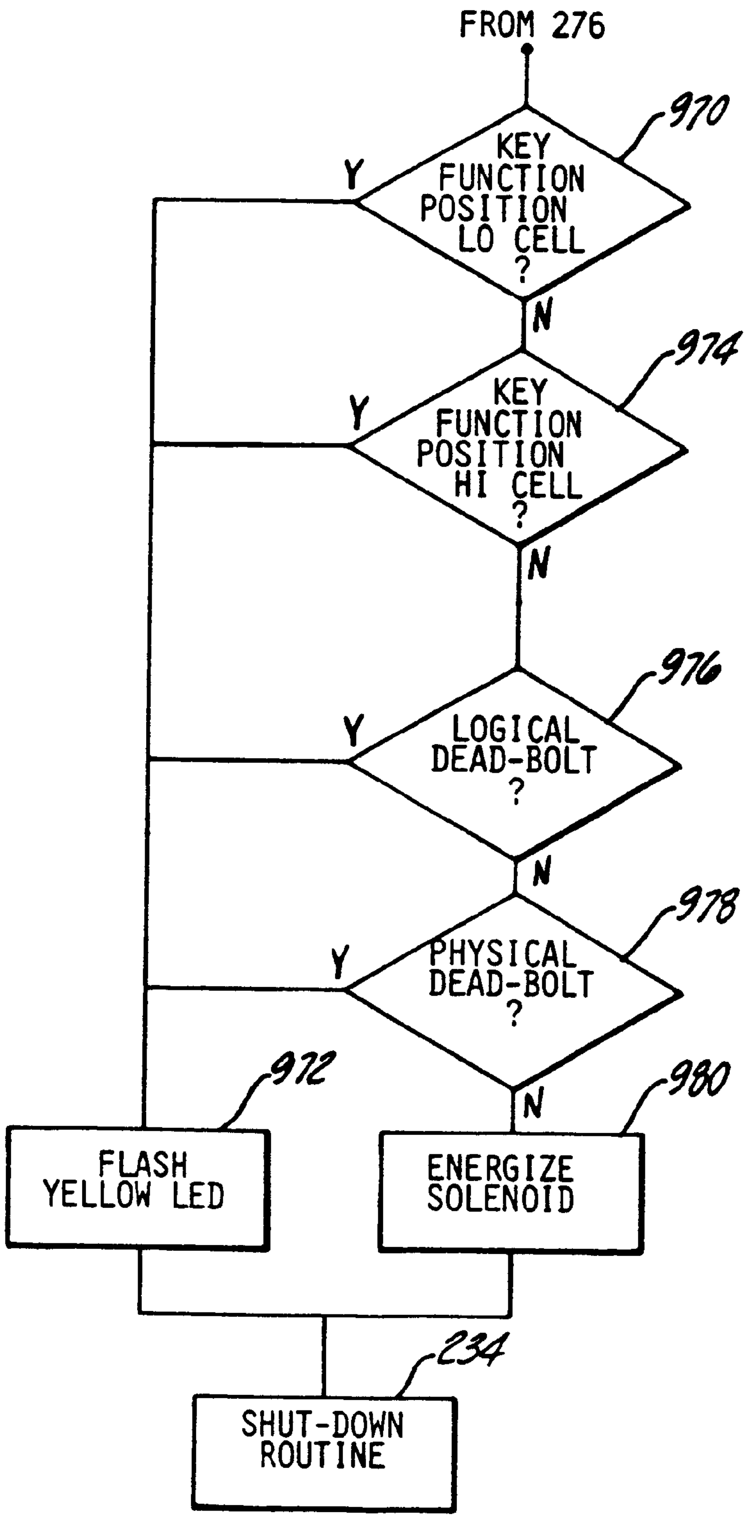

When the high lock or low lock key function is used in a system as described above, all keys are processed in accordance with the subroutine of FIG. 29. (This subroutine is a new miscellaneous subroutine for this third embodiment because of the high lock and low lock functions.) When a key is inputted at block 240 in FIG. 5, the program will branch at block 276 of FIG. 25B to block 970 of FIG. 28C. Block 970 determines whether the key function position of the key is less than the level number stored in the low cell register 847. If it is, the program branches to block 972 which flashes the yellow LED then, the program proceeds to the shut-down routine 234. If test block 970 determines that the key function position is not less than the level number in the low cell register, the program advances to test block 974 which determines whether the key function position is higher than the level number stored in the high cell register 845. If it is, the program branches to block 972 to flash the yellow LED and then proceeds to the shut-down routine 234. If it is not, the program advances to the test block 976 which determines whether the logical dead bolt is set. If it is, the program flashes the yellow LED and proceeds to the shut-down routine 234. If it is not, test block 978 determines whether the physical dead bolt is set. If it is, the yellow LED is flashed at block 972 and the program proceeds to the shut-down routine 234. If it is not, the block 980 energizes the solenoid and then the program advances to the shut-down routine 234. Thus, the subroutine of FIG. 28C is operative to lock out in accordance with either the high lock or the low lock function keys. As described above, normal operation is restored so that no keys are locked out by reinserting either the high lock or the low lock key, as the case may be.

As described previously, the second embodiment of the invention has the special feature of programmability of the key functions. This permits the assignments of any key function to any desired level in the key code memory. The start-up procedure, as described previously with reference to FIG. 17A and 17B, is characterized by the requirement for the inputting of first and second start-up keys in sequence and also by the optional use of a programming key as a means for assigning levels, i.e. to define or to redefine the assigned level in the key code memory. This start-up procedure also permits the assignment of the hotel code in the lock memory. This programming feature is highly advantageous in that it affords flexibility in assigning levels and the hotel code in different installations and it also permits the changing of level assignments and the hotel code in a given installation. A disadvantage, however, in the second embodiment is that changes cannot be made without a power down of the lock, i.e. removing power, and going through the entire start-up procedure. This third embodiment overcomes the above mentioned disadvantage and provides the feature of on-line programming to make certain changes. For this purpose, means are provided to respond to a certain data sequence and make selected changes. The selected changes are reprogramming to assign new functions for different levels according to a programming key or to reassign the bits of the run mode character and the hotel code by an assignment key.

The on-line programming of this third embodiment can be initiated at any time after the lock is phased-in, as described with reference to FIGS. 17A and 17B. The on-line programming subrouting will now be described with reference to FIGS. 30A, 30B and 30C. In general, the on-line programming subroutine to be described requires the code sequence of two different keys followed by the insertion of a redefinition key. The first key is the first start-up key and which has no function other than start-up, the second key is the emergency level key (either emergency key or the rephase key) and the redefinition key may be either a programming key or a reassignment key.

Figure 30A:
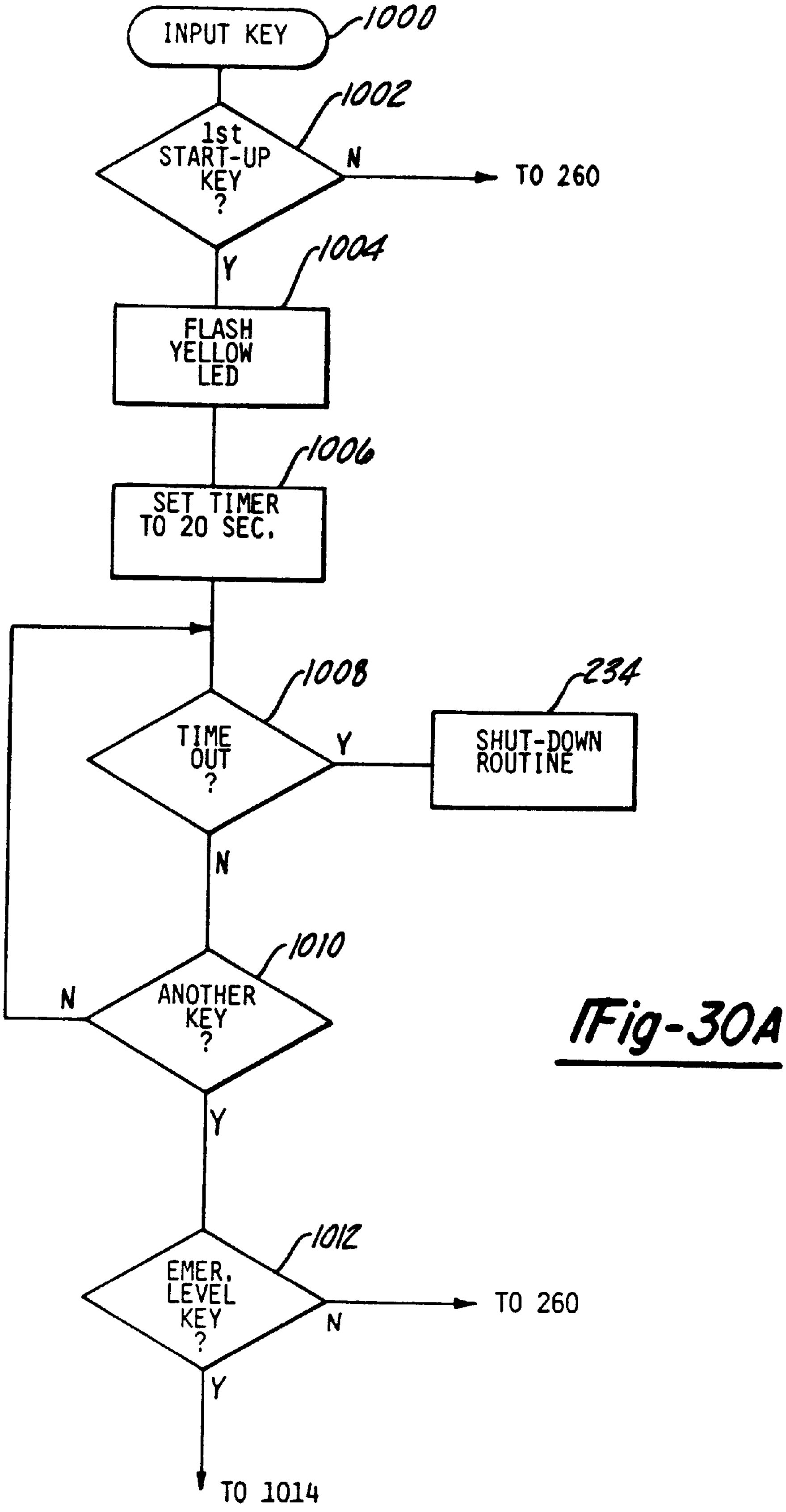
FIGS. 30A, 30B and 30C show a flow chart representing the control program for on-line reprogramming of the lock in the third embodiment.
Figure 30B:
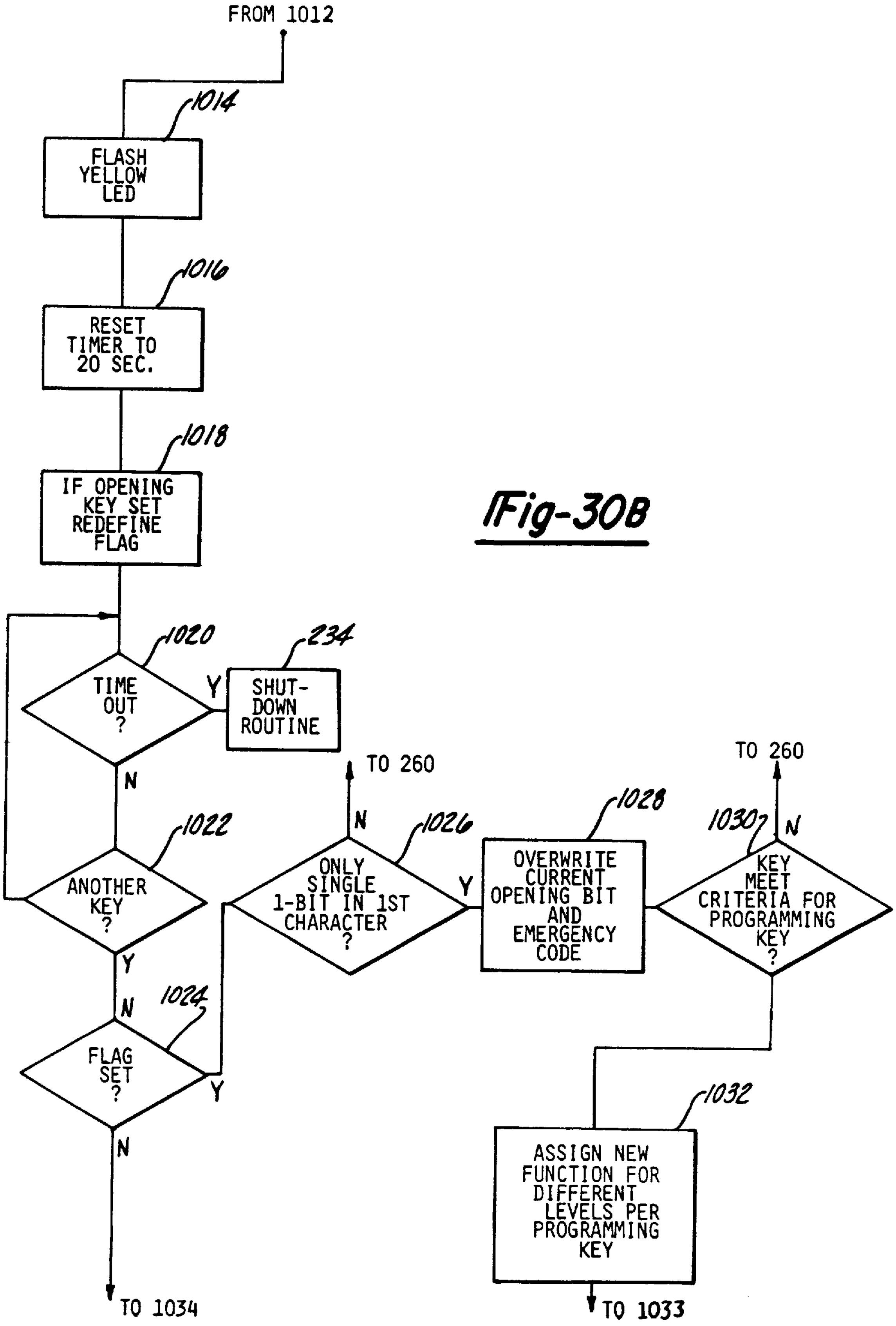
Figure 30C:
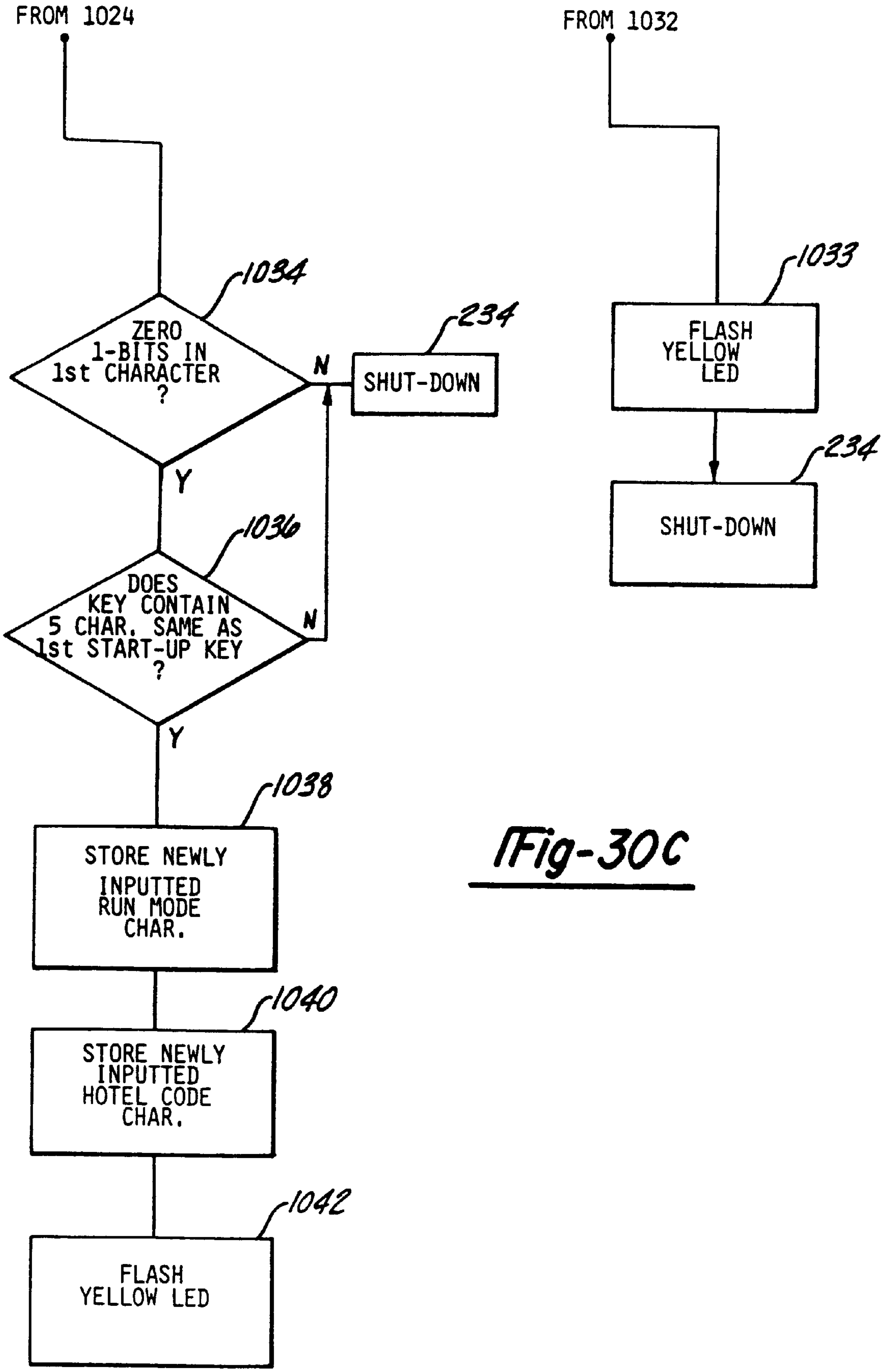
Figure 31:
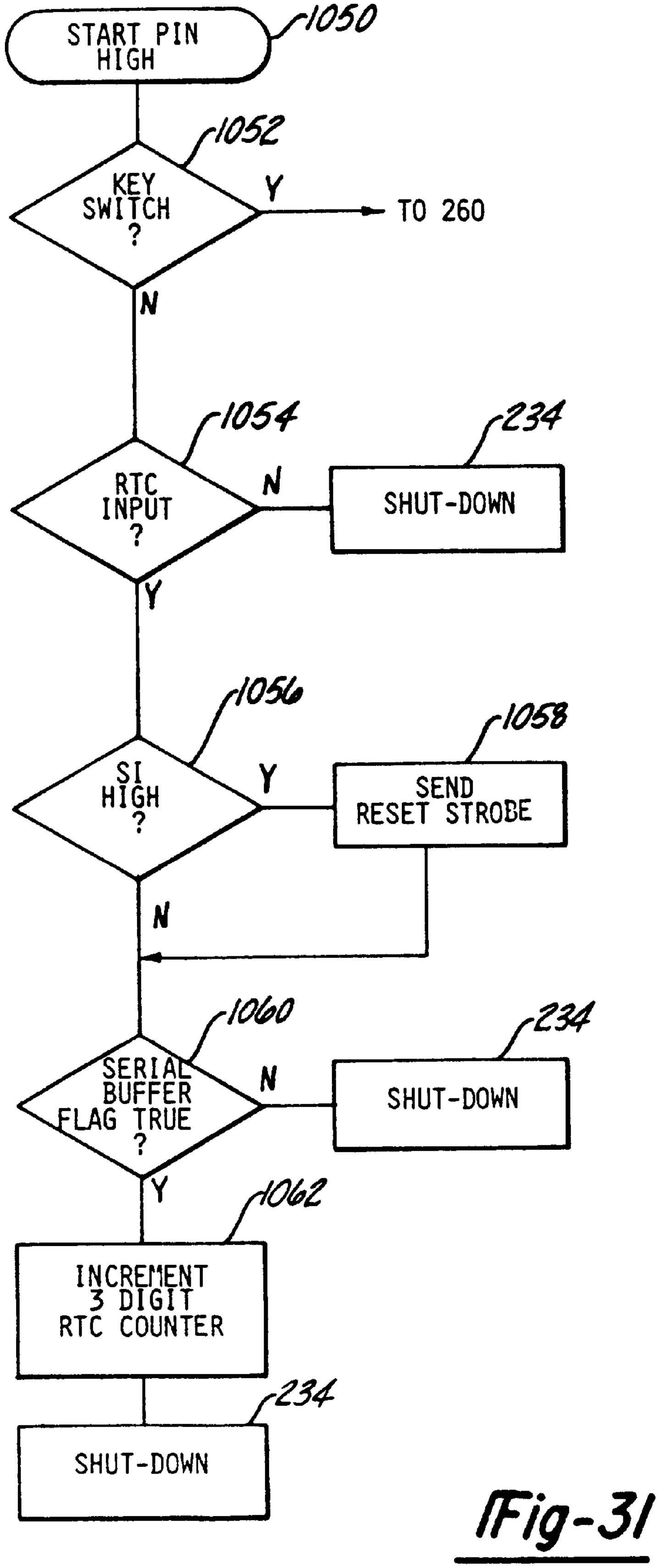
FIG. 31 is a flow chart representing the real time clock for providing a time base for a record of door openings.

Referring now to FIG. 30A, the on-line programming subroutine starts with inputting a key at block 1000. The test block 1002 determines whether the inputted key is the first start-up key. If not, the program proceeds to block 260 with the subroutine of FIGS. 25A and B, to process the key data as previously described. If it is the first start-up key, the program advances to the block 1004 which flashes the yellow LED and then to block 1006 which sets the timer to twenty seconds. Then, test block 1008 determines whether the timer has timed-out for the insertion of another key, the program goes to the shut-down routine 234. If it has not timed-out, the program advances to test block 1010 which determines whether another key is inserted. If not, the program loops back to block 1008. If another key is inserted, the program advances to the test block 1012 which determines whether the inserted key is an emergency level key. If it is not, the program advances to block 260 of the subroutine of FIGS. 25A and 25B to process the key data. If it is the emergency level key, the program advances to block 1014 which flashes the yellow LED and then to block 1016 which resets the timer to twenty seconds. Then, block 1018 sets the "redefined" flag 848 if the emergency level key is an opening key. Then, the program advances to the test block 1020 which determines whether the timer is timed-out. If it is, the program goes to the shut-down routine 234. If it is not, the test block 1022 determines whether another key is inserted before the timer times-out. If not, the program loops back to block 1020. If it is, the program advances to test block 1024 which determines whether the redefine flag is set. The third key, namely the key inserted at test block 1022 will be tested to determine whether it is a redefinition key. If the redefine flag is set, as determined by test block 1024, the third key will be processed as a programming key; if not, it will be processed as an assignment key which allows reassignment of the run mode and hotel code characters. If the flag is set, the program proceeds from test block 1024 to test block 1026 which determines whether there is only a single one bit in the first character. If not, the key does not qualify as a programming key and the program proceeds to block 260 of the subroutine of FIGS. 25A and 25B. If it does have only a single one bit in the first character, it qualifies as a programming key and the program advances to block 1028 which overwrites the current opening bit and the emergency code in memory thus ensuring that there is no change to these codes. Then the program advances to test block 1030 which determines whether the key meets the criteria for a programming key as previously described with reference to FIGS. 17A and 17B. If it does not meet the criteria, the program advances to block 260 of FIG. 25A. If it does, the program advances to block 1032 which assigns new functions to the different levels according to the coding of the programming key. Then block 1033 flashes the yellow LED and the program goes to the shut-down routine 234.

If the test block 1024 determines that the redefine flag was not set, the program advances to test block 1034 which determines whether there are zero one bits in the first character. If not, the program goes to the shut-down routine 234. If there are no one bits in the first character, the test block 1036 determines whether the key contains five characters which are the same as the first start-up key for further verification that the key qualifies as an assignment key. If it does not, the program goes to the shut-down routine 234. If it does, block 1038 stores the newly inputted run mode character in register 846. Then, block 1040 stores the newly inputted hotel code in the hotel code register 849. Then, the program advances to block 1042 which flashes the yellow LED to indicate acceptance.

As described above, the third embodiment provides a time base for recording the last eight entries or door openings. Information regarding each of the eight openings is recorded in the history buffer 241. When the RTC bit in the run mode character is set high, the microprocessor operates with the real time clock 820 to record the data regarding each door opening in the history buffer. In particular, the recognition code (control code) of the last key is recorded. If it is a reentry by the same key, the reentry counter is incremented. If the key has the same recognition code but a different ID code, the ID code is recorded in the buffer. Along with these entries, the reading of the three digit real time clock counter 842 is entered in the history buffer. Thus, this data for each of the last eight entries is recorded in the history buffer and can be examined upon readout of the buffer.

The operation of the microprocessor with the real time clock 820 and the three digit RTC counter will be described with reference to the flow chart of FIG. 30. The program represented by this flow chart is initiated whenever the start pin of the microprocessor goes high as indicated at block 1050. Then the test block 1052 determines whether the high input was produced by the key switch 58. If it was, the program advances to block 260 of the flow chart in FIG. 25A to process the key data. If it was not the key switch, the program advances to test block 1054 which determines whether the high input was produced by the real time clock 820 on input 824. If it was not, the program goes to the shut-down routine 234. If it was, the test block 256 determines whether input pin SI is high. If so, block 1058 sends a reset signal from reset strobe on the microprocessor to the reset pin of the clock 820. If pin SI is not high, the program advances to test block 1060 which determines whether the serial buffer flag 838 is true, i.e. whether the serial buffer which holds four counts is full. If it is not, the program advances to the shut-down routine 234. If it is, the program proceeds to the block 1062 which increments the three digit RTC counter. Then, the program goes to the shut-down down routine 234.

Although the description of this invention has been given with reference to a particular embodiment, it is not to be construed in a limiting sense. Different modifications and variations will now occur to those skilled in the art. For a definition of the invention reference is made to the appended claims.

What is claimed is:

1. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein, and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

said memory including read-only memory and read-write memory accessible to said microcomputer, a function table and a key code register in said read-write memory, a library of routines stored in said read-only memory, each of said routines having an address in said read-only memory and being adapted to perform a different lock operating function, a data storage member external of said memory for storing data for use in programming said lock for the selective performance of one of a plurality of different lock functions, said data including plural function pointers which identify the respective addresses in said read-only memory of a selected set of said routines, means for writing a different one of said function pointers to each of a predetermined number of levels in said function table for designating one of said routines for each level, means for assigning a key code to each of a predetermined number of levels in said key code register, each level in said function table corresponding to one of the levels in the key code register, said control code designating one of said levels in said function table and one of said levels in said key code register, said control program including a main program, the number of routines in said library being greater than said predetermined number of levels in said function table, said microcomputer being operative under program control of said main program for reading the control code and the key code from said selected one of said keys for determining whether the key code on the selected key has a predetermined requisite relationship to the assigned key code at said designated level in said key code register and if it does, said microcomputer being operative under program control of said main program for responding to the function pointer at the level in said table designated by said control code to select the routine designated by the last-mentioned function pointer and to execute the selected routine, and means under program control of the selected routine for operating the lock to perform the function represented by said selected routine.

2. The invention as defined in claim 2 wherein:

each key has a hotel code stored thereon, said read/write memory has a hotel code register for storing an assigned hotel code, said microcomputer being operative under program control of said main program in response to code input by said key reader from a selected key coacting therewith to store said control code in said control code storage register and to determine whether said hotel code on the key matches the assigned hotel code and, if it does, to determine whether the control code corresponds to a control code for a hotel pass function and if it does, to switch said locking/unlocking output of the microcomputer to an unlocking state.

3. The invention as defined in claim 1 including:

a control code register in said read-write memory, said microcomputer being operative under program control of said main program in response to code input from said key reader to store said control code in said control code register, each of said function pointers pointing to a memory address of one of said routines, the number of function pointers being equal to the number of levels in said key code register, decoding means operable under program control of said main program in conjunction with said control code for pointing to a selected level in said key code register and a selected level in said function table corresponding to said control code, said microcomputer being operative under program control of the selected routine at the memory address pointed to by the function pointer selected by said decoding means, whereby the lock is operated in accordance with the function of said selected key.

4. The invention as defined in claim 3 wherein:

each key has said control code, a primary key code and a secondary key code stored therein, said microcomputer being operative under program control of said main program in response to code input from said key reader from a selected key coacting therewith to compare said primary and secondary key codes from the selected key with the assigned key code at the location in said key code memory selected by said decoding means and, if there is a match, said microcomputer being operative under program control of the routine at the memory address pointed to by the function table location selected by said decoding means, whereby the lock is operated in accordance with the function of said selected key.

5. The invention as defined in claim 4 wherein:

said memory has a guest routine stored therein, said plurality of keys including a guest key, said read/write memory includes an inhibit register having a plurality of inhibit bits for inhibiting said output of the microcomputer when an inhibit bit is set corresponding to the control code of said guest key, said read/write memory also including a new bit flag for signifying that the secondary code on said guest key was written into the key code memory by the current reading of the key, said microcomputer being operative under program control of said guest key routine to clear the inhibit bit corresponding to the control code of the key if the new key flag is set.

6. The invention as defined in claim 4 wherein:

said set of routines includes a one-shot key subroutine, a one-shot key having a control code for selecting said one-shot key routine, said read/write memory also includes a new flag for signifying, when the flag is in one of two different logic states, that the secondary code on said one-shot key was written into the key code memory by the current reading of the key, said microcomputer being operative under program control of said one-shot key routine to switch said output of said microcomputer to an unlocking state if the new flag is in said one state.

7. The invention as defined in claim 4 comprising:

a link code stored thereon on each of said plurality of keys, said selected key has a primary key code which is the same as the secondary key code of the key which was issued next previously to the selected key, said selected key has a link code stored thereon which is the same as the secondary code of a key which was issued second or more next previously to the selected key, said microcomputer being operative under program control of said main program in response to code input from said selected key to compare said primary code with the assigned key code in said key code memory and, if there is no match, said microcomputer being operative to compare said link code with the assigned key code in said key code memory and, if there is a match, said microcomputer being operative under program control to write the secondary code at said location in key code memory, whereby the locking system is operated in accordance with the function of said selected key.

8. The invention as defined in claim 3 wherein:

said read/write memory includes a storage register for storing a logical dead bolt flag for inhibiting said output of the microcomputer when the flag is set, said set of routines including a first security key routine and a second security key routine, a first security key having a control code for selecting said first security key routine, said microcomputer being operative under program control of said first security routine to set said logical dead bolt flag, a second security key having a control code for selecting said second security routine, said microcomputer being operative under program control of said second security routine to set said logical dead bolt flag and to switch said output to an unlocking state if the first and second security keys are input in the order named without any other key being input after the input of the first security key and before the input of the second security key.

9. The invention as defined in claim 3 wherein:

said main program includes a shut-down routine, a locking means detector coupled with an input of said microcomputer for producing a door opening signal when the locking means is actuated to the unlocked condition, said read/write memory includes a plurality of opening repeat counters to record the number of sequential door opening signal produced by a corresponding plurality of different keys, said microcomputer being operative under program control of said shut-down routine for incrementing a repeat counter in response to a door opening signal if the control code of said selected key is the same as that of the key which produced the last opening signal, whereby data is recorded for the purpose of analysis.

10. The invention as defined in claim 1 wherein:

said microcomputer has an input which is set to a predetermined logic state if said lock is an office lock adapted to be held in either a latch or unlatch state, said memory has an office lock routine stored therein, said plurality of keys of different types including an unlatch key, a latch key, and a toggle key, said microcomputer being operative under program control of the office key subroutine to determine whether said input is in said predetermined logic state and, if it is, to determine whether a key inserted in said key reader is an unlatch key, a latch key or a toggle key and to cause energization of said electrically controlled actuator in accordance with the function of the unlatch key, latch key or toggle key, as the case may be.

11. The invention as defined in claim 10 wherein:

said output of said microcomputer is a locking/unlocking output for controlling energization of said electrically controlled actuator, said microcomputer includes an unlatch output for controlling energization of an unlatch device for holding the locking means in an unlocked position and a latch output for controlling energization of a latch device for holding said locking means in a locked position, said microcomputer being operative under program control of the office lock subroutine to determine whether a key inserted in said key reader is an unlatch key and, it if is, to produce a signal at the locking/unlocking output and at the latch and unlatch outputs corresponding to said unlatched condition.

12. The invention as defined in claim 10 wherein:

said output of said microcomputer is a locking/unlocking output for controlling energization of said electrically controlled actuator, said microcomputer includes an unlatch output for controlling energization of an unlatch device for holding the locking means in an unlocked position and a latch output for controlling energization of a latch device for holding said locking means in a locked position, said microcomputer being operative under program control of the office lock subroutine to determine whether a key inserted in said key reader is a latch key and, if it is, to produce a signal at the locking/unlocking output and at the latch and unlatch outputs corresponding to said latched condition.

13. The invention as defined in claim 10 wherein:

said output of said microcomputer is a locking/unlocking output for controlling energization of said electrically controlled actuator, said microcomputer includes an unlatch output for controlling energization of an unlatch device for holding an unlocking means in the unlocked position and a latch output for controlling energization of a latch device for holding said locking means in a locked position, said microcomputer being operative under program control of the office lock subroutine to determine whether a key inserted in said key reader is a toggle key and, if it is, to produce a signal at the locking/unlocking output and at the latch and unlatch outputs corresponding to said unlatched condition if the lock is latched and vice versa.

14. The invention as defined in claim 1 wherein said data storage member is one of said plurality of keys.

15. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein and having a control program stored therein for program control of said microcomputer, a key reader coupled with said microcomputer and being adapted to coact with any selected one of said keys to read the control code and key code stored thereon into said microcomputer, and an electrically controlled actuator for said locking means coupled with an unlocking output of said microcomputer, the improvement comprising:

a storage register for storing a logical dead bolt flag for inhibiting said unlocking output of the microcomputer when the flag is in a predetermined logical state, said plurality of keys including an emergency key, said microcomputer being operative under program control for placing said logical dead bolt flag in said predetermined logical state when said emergency key is read by said key reader.

16. The invention as defined in claim 15 wherein:

said locking means includes a manually actuated physical dead bolt, a physical dead bolt detector coupled with an input of said microcomputer for determining when the physical dead bolt is in the locked condition, said plurality of keys including a guest key, said microcomputer being operative under program control to energize said actuator if said logical dead bolt flag is not set and if said physical dead bolt is not in the locked condition.

17. The invention as defined in claim 16 wherein:

said memory including a read-only memory having a one-key security subroutine stored therein, a security key having a control code for running said one-key subroutine, a second storage register for storing a security flag which is set if the logical dead bolt is to be ignored, said microcomputer being operative under program control of said one-key security subroutine to determine whether said security flag is set and if it is, regardless of the state of the logical dead bolt, energize the electrically controlled actuator.

18. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

a battery for supplying electrical power to said microcomputer, a battery voltage sensor for sensing low battery voltage, said sensor being coupled with said battery and connected with an input of said microcomputer, said plurality of keys including a maid key, a sensor coupled with said lock and connected with an input of said microcomputer for sensing a turning of the knob when the door is unlocked by said maid key, a maid key counter for counting the number of times said turning is sensed while the battery voltage is low, said microcomputer being operative under program control to increment the maid key counter when the battery voltage sensor indicates a low voltage and to inhibit said output when the count registered by the maid key counter exceeds a predetermined number unless the last key used was a maid key, whereby the maid key must be used twice in succession for unlocking when the battery is low if the maid key has been used for door opening more than said predetermined number of times.

19. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

each key having a hotel code stored thereon, said memory has a hotel code register for storing an assigned hotel code, said microcomputer being operative under program control by said main program to compare the hotel code read from said key with the assigned hotel code and to inhibit said output of said microcomputer if there is no match.

20. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

a storage register for storing a logical dead bolt flag for inhibiting said output of the microcomputer when the flag is set, said plurality of keys including a first security key having a first control code, said microcomputer being operative under program control to set the logical dead bolt flag when said first security key is read by said key reader and to wait for the input of another key, said plurality of keys also including a second security key having a second control code, said microcomputer being operative in response to said second security key under program control to set said logical dead bolt flag and to switch said output to an unlocking state if the previous key input was said first security key.

21. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

a locking means detector coupled with said locking means and with an input of said microcomputer for determining when the locking means is actuated to the unlocked condition, said microcomputer includes a cycle timer, said microcomputer being operative under program control of said main program for starting said cycle timer when said selected key is inserted into said key reader and to prevent further operation unless said locking means is actuated within a predetermined time period.

22. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

a clock adapted to generate periodic clock pulses at a clock output, said clock output being coupled with a start input of said microcomputer, a key actuated switch in said key reader coupled with said start input, whereby the microcomputer starts running in response to either actuation of the start switch or the occurrence of a clock pulse, a counter coupled with said clock output for accumulating a count corresponding to the number clock pulses, a history buffer in said memory, and means for recording said count in said history buffer each time the lock is unlocked and for simultaneously recording data in the history buffer to identify the key which was used for the unlocking.

23. The invention as defined by claim 22 including:

means for isolating the start switch and the clock output from each other, said start switch being coupled with the interrupt request input of the microcomputer whereby a start signal from the start switch is given precedence over a start signal from the clock output, said clock including a ripple counter for producing said clock pulses, and means for clearing said ripple counter in response to said clock pulse.

24. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein, and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

said memory comprising a read-only memory and a read/write memory accessible to said microcomputer, a function table and a key code register in said read/write memory, a library of routines stored in said read-only memory, each of said routines having a function pointer and being adapted to perform a different lock operating function, means for assigning a function pointer to each of a predetermined number of levels in said function table for designating one of said routines for each level, and for assigning a key code to each of a predetermined number of levels in said key code register, each level in said function table corresponding to one of the levels in the key code register, said control code designating one of said levels in said function table and one of said levels in said key code register, said control program including a main program stored in said read-only memory, the number of routines in said library being greater than the number of said function pointers in said function table, said microcomputer being operative under program control of said main program for reading the control code and the key code from said selected one of said keys and for determining whether the key code on the selected key has a predetermined requisite relationship to the assigned key code at said designated level in said key code register and if it does, said microcomputer being operative under program control of said main program for responding to the function pointer at the level in said table designated by said control code to select and execute the routine designated by the last-mentioned function pointer, said library of routines stored in said read-only memory including an emergency key routine, said read/write memory including a storage register for storing a logical dead bolt flag for inhibiting said output of the microcomputer when the flag is in one of two different logic states and an opening flag for inhibiting said output when it is in one of two different logic states, a locking means detector coupled with an input of said microcomputer for determining when the locking means is actuated to the unlocked condition, an emergency key having a control code for selecting said emergency key routine, said control code of said emergency key including an opening bit in a logic state for placing said opening flag in the other of said states thereof, said microcomputer being operative under program control of the emergency key routine to place said logical dead bolt flag in the other of said states thereof and to energize said actuator independently of the status of said logical dead bolt flag and to clear the logical dead bolt flag when said detector indicates that the locking means is actuated to the unlocked condition.

25. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein, and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

said memory comprising a read-only memory and a read/write memory and accessible to said microcomputer, a function table and a key code register in said read/write memory, a library of routines stored in said read-only memory, each of said routines having a function pointer and being adapted to perform a different lock operating function, means for assigning a function pointer to each of a predetermined number of levels in said function table for designating one of said routines for each level, and for assigning a key code to each of a predetermined number of levels in said key code register, each level in said function table corresponding to one of the levels in the key code register, said control code designating one of said levels in said function table and one of said levels in said key code register, said control program including a main program stored in said read-only memory, the number of routines in said library being greater than the number of said function pointers in said function table, said microcomputer being operative under program control of said main program for reading the control code and the key code from said selected one of said keys and for determining whether the key code on the selected key has a predetermined requisite relationship to the assigned key code at said designated level in said key code register and if it does, said microcomputer being operative under program control of said main program for responding to the function pointer at the level in said table designated by said control code to select and execute the routine designated by the last-mentioned function pointer, said library of routines stored in said read-only memory including a rephase routine, said read/write memory including a storage register for storing a logical dead bolt flag for inhibiting said unlocking output of the microcomputer when the flag is in one of two different logic states and an opening flag for inhibiting said unlocking output of the microcomputer when the flag is in one of two different logic states, a rephase key having a control code for selecting said rephase routine, said control code on said rephase key including an opening bit for placing said opening flag in said one logic state thereof, said microcomputer being operative under program control of said rephase routine to place said logical dead bolt flag in said one logic state thereof and, if another key is read by said key reader, to write the key code therefrom into the key code memory at the location designated by said control code on said rephase key.

26. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein, and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

said memory comprising a read-only memory and a read/write memory accessible to said microcomputer, a function table and a key code register in said read/write memory, a library of routines stored in said read-only memory, each of said routines having a function pointer and being adapted to perform a different lock operating function, means for assigning a function pointer to each of a predetermined number of levels in said function table for designating one of said routines for each level, and for assigning a key code to each of a predetermined number of levels in said key code register, each level in said function table corresponding to one of the levels in the key code register, said control code designating one of said levels in said function table and one of said levels in said key code register, said control program including a main program stored in said read-only memory, the number of routines in said library being greater than the number of said function pointers in said function table, said microcomputer being operative under program control of said main program for reading the control code and the key code from said selected one of said keys and for determining whether the key code on the selected key has a predetermined requisite relationship to the assigned key code at said designated level in said key code register and if it does, said microcomputer being operative under program control of said main program for responding to the function pointer at the level in said table designated by said control code to select and execute the routine designated by the last-mentioned function pointer, said library of routines stored in said read-only memory including a high cell routine stored therein, said read/write memory includes a high cell register for storing a level number corresponding to the different locations in the key code memory, a high cell key having a control code for selecting said high cell routine, said microcomputer being operative under program control of said high cell routine to determine whether the level number stored in the high cell register is equal to the level number assigned to said high cell key in said read-only memory, and, if it is not, to store a level number corresponding to the high cell key in the high cell register, said microcomputer being operative under program control of selected ones of said routines stored in said read/write memory when a selected key is inserted to determine whether the level assigned to the selected key is higher than the level number stored in the high cell register and, if it is, to prevent operation of the locking system in accordance with the function of said selected key.

27. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein, and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

said memory comprising a read-only memory and a read/write memory and accessible to said microcomputer, a function table and a key code register in said read/write memory, a library of routines stored in said read-only memory, each of said routines having a function pointer and being adapted to perform a different lock operating function, means for assigning a function pointer to each of a predetermined number of levels in said function table for designating one of said routines for each level, and for assigning a key code to each of a predetermined number of levels in said key code register, each level in said function table corresponding to one of the levels in the key code register, said control code designating one of said levels in said function table and one of said levels in said key code register, said control program including a main program stored in said read-only memory, the number of routines in said library being greater than the number of said function pointers in said function table, said microcomputer being operative under program control of said main program for reading the control code and the key code from said selected one of said keys and for determining whether the key code on the selected key has a predetermined requisite relationship to the assigned key code at said designated level in said key code register and if it does, said microcomputer being operative under program control of said main program for responding to the function pointer at the level in said table designated by said control code to select and execute the routine designated by the last-mentioned function pointer, said library of routines stored in said read-only memory including a low cell routine, said read/write memory includes a low cell register for storing a level number corresponding to the different locations in the key code memory, a low cell key having a control code for selecting said low cell routine, said microcomputer being operative under program control of said low cell routine to determine whether the level number stored in the low cell register is equal to the level number assigned to said low cell key, and, if it is not, to store a level number corresponding to the low cell key in the low cell register, said microcomputer being operative under program control of selected ones of said routines stored in said read/write memory when a selected key is inserted to determine whether the level assigned to the selected key is lower than the level number stored in the low cell register and, if it is, to prevent operation of the locking system in accordance with the function of said selected key.

28. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein, and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

storage means including a read/write memory in said memory acessible to said microcomputer, a function table and a key code register in said storage means, a library of routines stored in said storage means, each of said routines having a function pointer and being adapted to perform a different lock operating function, means for assigning a function pointer to each of a predetermined number of levels in said function table for designating one of said routines for each level, and for assigning a key code to each of a predetermined number of levels in said key code register, each level in said function table corresponding to one of the levels in the key code register, said control code designating one of said levels in said function table and one of said levels in said key code register, a control code register in said storage means, said microcomputer being operative under program control of said main program in response to code input from said key reader to store said control code in said control code register, said control program including a main program, the number of routines in said library being greater than the number of said function pointers in said function table, said microcomputer being operative under program control of said main program for reading the control code and the key code from said selected one of said keys and for determining whether the key code on the selected key has a predetermined requisite relationship to the assigned key code at said designated level in said key code register and if it does, said microcomputer being operative under program control of said main program for responding to the function pointer at the level in said table designated by said control code to select and execute the routine designated by the last-mentioned function pointer, each of said function pointers pointing to a memory address of one of said routines, the number of function pointers being equal to the number of levels in said key code register, decoding means operable under program control of said main program in conjunction with said control code for pointing to a selected level in said key code register and a selected level in said function table corresponding to said control code, said microcomputer being operative under program control of the selected routine at the memory address pointed to by the function pointer selected by said decoding means, said library of routines including a guest routine and a housekeeper routine, said plurality of keys including a guest key and a housekeeper key, said read/write memory including an inhibit register comprising plural inhibit bits for inhibiting said unlocking output of the microcomputer by a guest routine when the inhibit bit corresponding to said guest routine is set, said read/write memory also including a storage register for storing an opening flag for inhibiting said output of the microcomputer when the flag is reset, a housekeeper key having a control code for selecting said housekeeper routine, said control code of said housekeeper key including an opening bit in a logic state for resetting the opening flag, said microcomputer being operative under program control of said housekeeper routine to set all inhibit bits.

29. In a locking system of the type comprising:

a lock including a locking means to place the lock in a locked or unlocked condition, a microcomputer including a memory, a plurality of keys of different types, each key having a control code and a key code stored thereon, said memory having assigned key codes stored therein, and having a control program stored therein for program control of said microcomputer, a key reader coupled with said microcomputer and being adapted to coact with any selected one of said keys to read the control code and the key code stored thereon into said microcomputer, and an electrically controlled actuator for said locking means coupled with an output of said microcomputer, the improvement comprising:

storage means including a read/write memory in said memory accessible to said microcomputer, a function table and a key code register in said storage means, a library of routines stored in said storage means, each of said routines having a function pointer and being adapted to perform a different lock operating function, means for assigning a function pointer to each of a predetermined number of levels in said function table for designating one of said routines for each level, and for assigning a key code to each of a predetermined number of levels in said key code register, each level in said function table corresponding to one of the levels in the key code register, said control code designating one of said levels in said function table and one of said levels in said key code register, a control code register in said storage means, said microcomputer being operative under program control of said main program in response to code input from said key reader to store said control code in said control code register, said control program including a main program, the number of routines in said library being greater than the number of said function pointers in said function table, said microcomputer being operative under program control of said main program for reading the control code and the key code from said selected one of said keys and for determining whether the key code on the selected key has a predetermined requisite relationship to the assigned key code at said designated level in said key code register and if it does, said microcomputer being operative under program control of said main program for responding to the function pointer at the level in said table designated by said control code to select and execute the routine designated by the last-mentioned function pointer, each of said function pointers pointing to a memory address of one of said routines, the number of function pointers being equal to the number of levels in said key code register, decoding means operable under program control of said main program in conjunction with said control code for pointing to a selected level in said key code register and a selected level in said function table corresponding to said control code, said microcomputer being operative under program control of the selected routine at the memory address pointed to by the function pointer selected by said decoding means, said library of routines including a maid key routine, a battery for supplying electrical power to said microcomputer, a maid key having a control code for selecting said maid key routine, said control code including an opening bit in a logic state for placing said opening flag in one of two different logic states, a battery voltage sensor coupled with said battery and connected with an input of said microcomputer, said read/write memory also having a storage register for storing an opening flag for inhibiting said output of the microcomputer when the flag is in the other of said states and a knob-turned flag for indicating actuation of the locking means, said knob-turned flag being placed in one of two different logic states by actuation of the locking means, and a maid key counter for counting the number of times the knob-turned flag is placed in said one state by use of the maid key, said microcomputer being operative under program control of said maid key routine to increment the maid key counter when the battery voltage sensor indicates a low voltage and to inhibit said output when the count register by the maid key counter exceeds a predetermined number unless the last key used was a maid key, whereby the maid key must be used twice in succession for unlocking when the battery is low if the maid key has been used for door opening more than said predetermined number of times.

30. In a locking system of the type comprising:

a lock having a member movable between a locked position and an unlocked position;

a microcomputer including a read-write memory and a read only memory, said read only memory having a control program stored therein for execution by said microcomputer;

a plurality of keys of different types, each type having a control code associated therewith and each key having a key code and one of said control codes stored thereon;

said read-write memory having a number of memory locations each of which corresponds to a different one of said control codes, said microcomputer being operable under control of said program to utilize said control codes to store and retrieve said key codes at said memory locations;

a key reader coupled to said microcomputer, said key reader being operable to coact with any selected one of said keys to provide said microcomputer with the control code and key code stored thereon; and an electrically controlled actuator coupled to an output of said microcomputer and operable to move said member between said locked and unlocked positions in accordance with a signal on said output of said microcomputer;

the improvement comprising:

a library of routines stored in said read only memory, each of said routines having an address in said read only memory and being operable to perform a different lock operating function;

a data storage member external of said memory for storing data for use in programming said microcomputer for the selective performance of one of said routines, said data including plural function pointers each of which corresponds to one of said control codes and to one of said routines;

said microcomputer being operable under control of said program to identify the addresses of a selected set of said routines in accordance with said function pointers; and said microcomputer being operable under control of said program to determine whether the key code received from said key reader has a predetermined requisite relationship to the key code stored at the location in said read-write memory that corresponds to the control code received by said microcomputer from said key reader and, if it does, said microcomputer being operable under control of said program to execute the one of said routines located at the address identified by the one of said function pointers that corresponds to the control code received by said microcomputer.

31. The invention as defined in claim 30, further comprising a function table in said read-write memory, said function table having a number of levels each of which is associated with a different one of said control codes;

wherein said microcomputer is operable under control of said program to store each of said function pointers at a different one of said levels in said function table such that, for each of said function pointers, the control code associated with the function pointer is the same as the control code associated with the level in said function table at which the function pointer is stored; and wherein the number of routines in said library is greater than the number of levels in said function table, whereby said microcomputer is operable at any one time to utilize less than all of said routines in said library.

32. The invention as defined in claim 30, wherein said data storage member is a programming key, wherein said key reader is operable to coact with said programming key to provide said microcomputer with said function pointers.

* * * * *